US012154735B2

(12) United States Patent
Kim

(10) Patent No.: US 12,154,735 B2
(45) Date of Patent: Nov. 26, 2024

(54) ARC EXTINGUISHING UNIT AND AIR CIRCUIT BREAKER COMPRISING SAME

(71) Applicant: LS ELECTRIC CO., LTD., Anyang-si (KR)

(72) Inventor: Il Hyun Kim, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 157 days.

(21) Appl. No.: 17/911,311

(22) PCT Filed: Mar. 3, 2021

(86) PCT No.: PCT/KR2021/002586
§ 371 (c)(1),
(2) Date: Sep. 13, 2022

(87) PCT Pub. No.: WO2021/182787
PCT Pub. Date: Sep. 16, 2021

(65) Prior Publication Data
US 2023/0110171 A1 Apr. 13, 2023

(30) Foreign Application Priority Data
Mar. 13, 2020 (KR) ........................ 10-2020-0031560

(51) Int. Cl.
*H01H 33/18* (2006.01)
*H01H 31/26* (2006.01)

(52) U.S. Cl.
CPC .......... *H01H 33/182* (2013.01); *H01H 31/26* (2013.01)

(58) Field of Classification Search
CPC .... H01H 33/182; H01H 33/18; H01H 33/187; H01H 31/26; H01H 31/023; H01H 9/342;
(Continued)

(56) References Cited

U.S. PATENT DOCUMENTS 6,809,282 B2 * 10/2004 Fasano .................. H01H 9/443 218/15
8,237,074 B2 * 8/2012 Tetik ..................... H01H 9/362 218/156
(Continued)

FOREIGN PATENT DOCUMENTS

CN 101986415 A 3/2011
JP 2016076310 A 5/2016
(Continued)

OTHER PUBLICATIONS

Translation of JP2016201171 (Original document published Jan. 12, 2016) (Year: 2016).*
(Continued)

*Primary Examiner* — William A Bolton
(74) *Attorney, Agent, or Firm* — K&L Gates LLP

(57) ABSTRACT

An arc extinguishing unit and an air circuit breaker comprising same are disclosed. An arc extinguishing unit, according to an embodiment of the present disclosure, comprises an extinguishing magnet unit that forms a magnetic field inside the arc extinguishing unit. Accordingly, a generated arc receives an electromagnetic force in the direction facing the exterior of the air circuit breaker, and thus can be rapidly moved and extinguished. The extinguishing magnet unit is accommodated in a magnet case. The magnet case can seal the extinguishing magnet unit. Therefore, the extinguishing magnet unit is not damaged by the generated arc.

24 Claims, 36 Drawing Sheets

(58) Field of Classification Search
CPC .......... H01H 9/345; H01H 9/362; H01H 9/44; H01H 9/443; H01H 2009/365; H01H 2009/367; H01H 73/18; H01H 73/04
USPC ........ 218/23, 26, 22, 24, 34, 36, 38, 40, 43, 218/104, 105, 103
See application file for complete search history.

(56) References Cited

U.S. PATENT DOCUMENTS

| | | | | |
|---|---|---|---|---|
| 8,853,586 | B2 * | 10/2014 | Theisen | H01H 9/46 335/14 |
| 8,921,728 | B2 * | 12/2014 | Lang | H01H 77/10 218/33 |
| 9,082,571 | B2 * | 7/2015 | Seo | H01H 9/362 |
| 9,673,004 | B1 * | 6/2017 | Ruempler | H01H 9/36 |
| 2010/0126966 | A1 | 5/2010 | Domejean et al. | |
| 2010/0258531 | A1 * | 10/2010 | Bresciani | H01H 9/36 218/151 |
| 2013/0284702 | A1 * | 10/2013 | Hamada | H01H 9/346 218/26 |
| 2014/0246403 | A1 * | 9/2014 | Engewald | H01H 33/182 218/26 |
| 2017/0309417 | A1 | 10/2017 | Hertzog et al. | |

FOREIGN PATENT DOCUMENTS

| | | | |
|---|---|---|---|
| JP | 2016201171 | A | 12/2016 |
| JP | 6419515 | B2 | 10/2018 |
| KR | 200393296 | Y1 | 8/2005 |
| KR | 20150141866 | A | 12/2015 |
| KR | 20180048151 | A | 5/2018 |

OTHER PUBLICATIONS

Translation of KR20150141866 (Original document published Dec. 21, 2015) (Year: 2015).*

Translation of JP2016076310 (Original document published May 12, 2016) (Year: 2016).*

Notice of Allowance for related Japanese Application No. 2022-554438; action dated Jan. 30, 2024; (3 pages).

International Search Report for related International Application No. PCT/KR2021/002586; report dated Sep. 24, 2021; (5 pages).

Written Opinion for related International Application No. PCT/KR2021/002586; report dated Sep. 24, 2021; (10 pages).

Supplementary European Search report for related European Application No. 21767770.7; action dated Mar. 7, 2024; (8 pages).

Office Action for related Japanese Application No. 2022-554438; action dated Oct. 3, 2023; (4 pages).

* cited by examiner

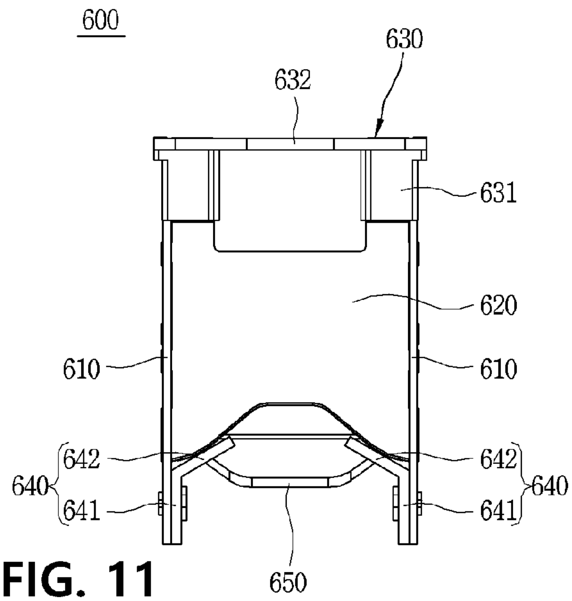
FIG. 11
FIG. 12
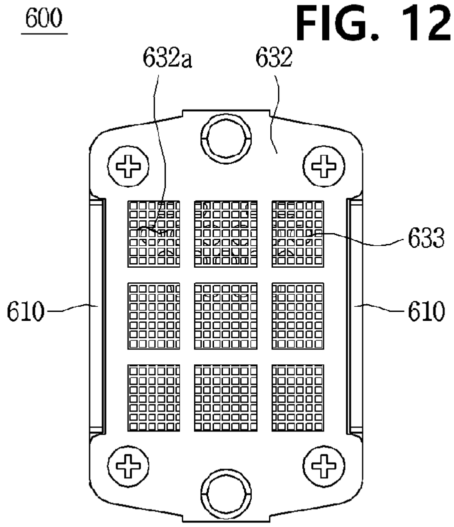

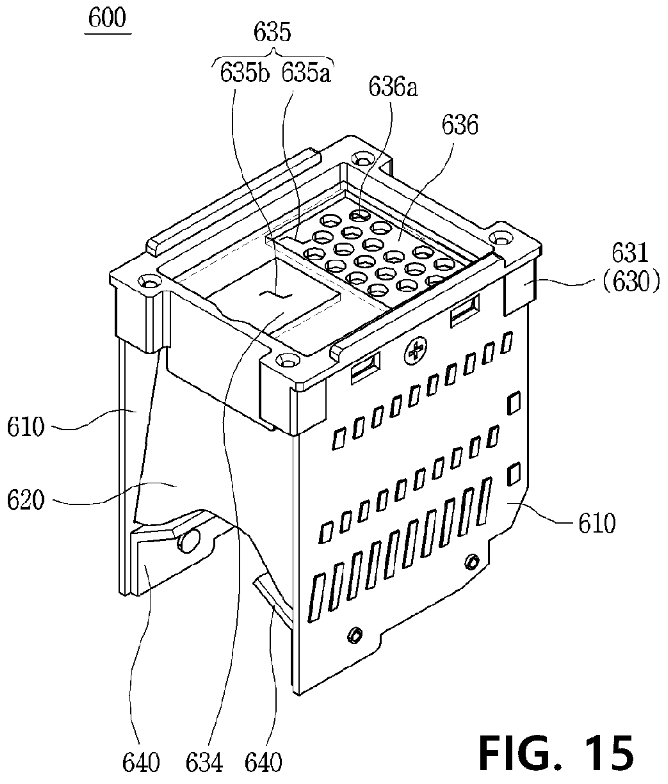
FIG. 15
FIG. 16
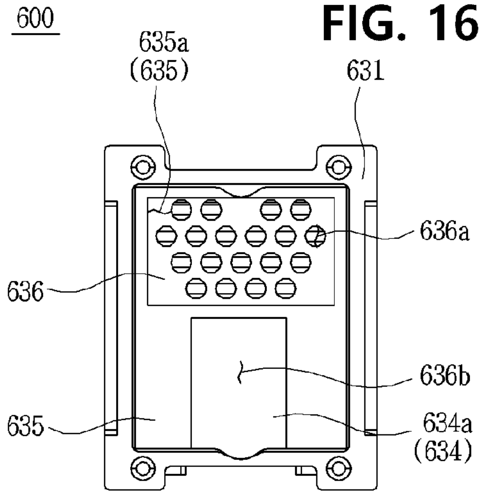

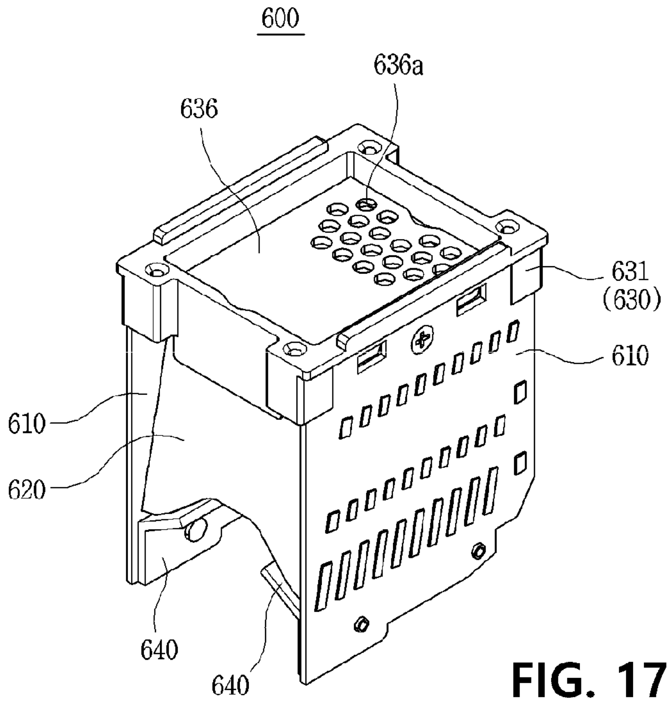
FIG. 17
FIG. 18
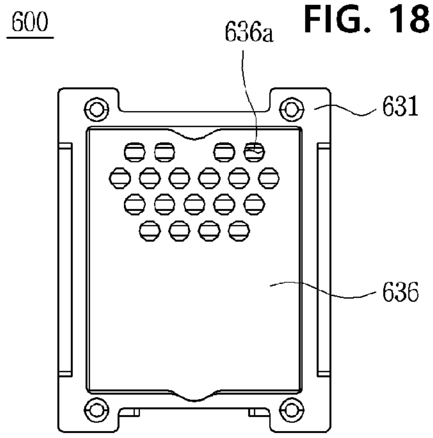

FIG. 19
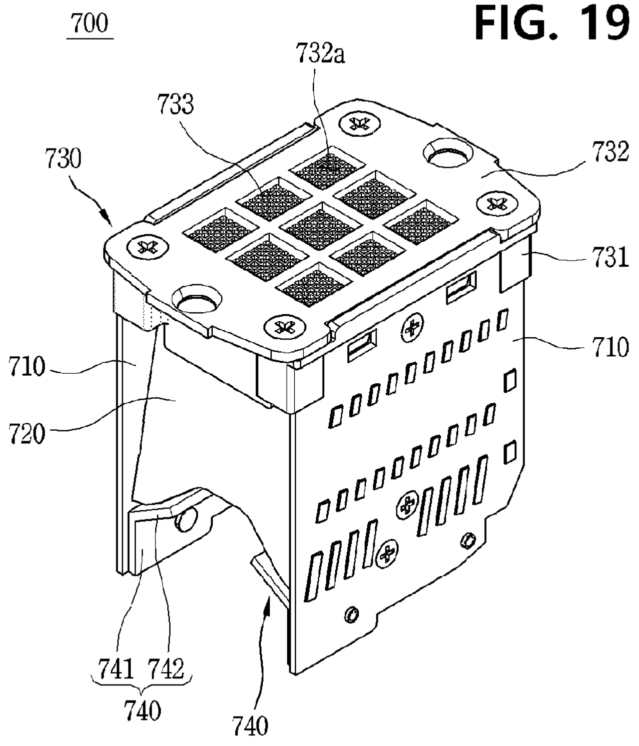
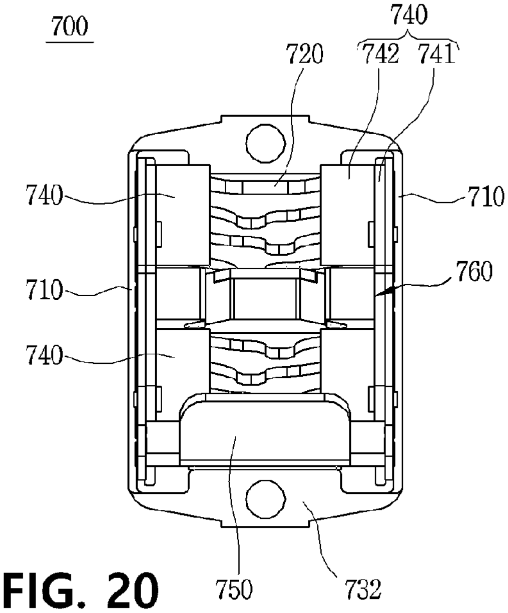
FIG. 20

ARC EXTINGUISHING UNIT AND AIR CIRCUIT BREAKER COMPRISING SAME

CROSS-REFERENCE TO RELATED APPLICATION

The present application is a National Stage of International Application No. PCT/KR2021/002586 filed on Mar. 3, 20211, which claims priority to and the benefit of Korean Utility Model Application No. 10-2020-0031560, filed on Mar. 13, 2020, the disclosure of which is incorporated herein by reference in its entirety.

FIELD

The present disclosure relates to an arc extinguishing unit and an air circuit breaker including the same, and more particularly, to an arc extinguishing unit capable of effectively extinguishing the arc generated by blocking current and an air circuit breaker including the same.

BACKGROUND

A circuit breaker refers to a device that can allow or block energization with an outside by contacting and separating fixed and movable contacts. The fixed contact and movable contact provided in the circuit breaker are respectively connected to an external power source or load to be energized.

The movable contact is movably provided in the circuit breaker. The movable contact may be moved in the direction toward or away from the fixed contact. When the movable contact and the fixed contact are in contact, the circuit breaker may be energized by connecting to an external power source or load.

When an overcurrent or abnormal current flows through the circuit breaker, the movable contact and the fixed contact in contact are separated from each other. Here, the current energized between the movable contact and the fixed contact is not immediately extinguished, but is changed in the form of an arc and is extended along the movable contact.

An arc can be defined as a flow of high temperature and high pressure electrons. Therefore, when the generated arc stays in the space inside the circuit breaker for a long time, there is a risk of damage to each component of the circuit breaker. In addition, when the arc is discharged to the exterior of the circuit breaker without a separate treatment process, there is a risk of injury to a user.

Accordingly, the circuit breaker is generally provided with an extinguishing device for discharging the arc while extinguishing the arc. The generated arc passes through the arc extinguishing device, the arc pressure is increased, the moving speed is increased, and the arc is cooled at the same time and can be discharged to the outside.

Therefore, the generated arc must be quickly induced to the arc extinguishing device.

Korean Patent Laid-Open Publication No. 10-2015-0001499 discloses a circuit breaker of a gas insulated switchgear with improved arc energy utilization. Specifically, it discloses a puffer-type circuit breaker capable of improving arc extinguishing performance by increasing the pressure of the extinguishing gas by using arc energy.

However, this type of circuit breaker is limited in that it can be applied only to the circuit breaker provided with separate gas as a medium for extinguishing the arc. That is, the prior literature is applicable only when sulfur hexafluoride ($SF_6$) is used as a medium for extinguishing the arc, and there is a limitation in that it is difficult to apply to an air circuit breaker using air as a medium.

Korean Utility Model Document No. 20-100000825 discloses a current-limiting structure of an air circuit breaker. Specifically, this document discloses a current-limiting structure of an air circuit breaker including a grid stacked to have a certain gap in an arc chamber and having an induction groove formed so that a contact can be positioned, and a guide plate provided on a sidewall of the induction groove of the grid.

However, this type of circuit breaker can induce the arc toward the grid through the guide plate, but does not provide a way to form a path for the arc that does not flow to the guide plate. That is, the prior literature has a limitation in that there is no consideration for a method for effectively forming an arc path that is not adjacent to the guide plate.

SUMMARY

It is an object of the present disclosure to provide an arc extinguishing unit having a structure capable of solving the above-described problems and an air circuit breaker including the same.

First, an object of the present disclosure is to provide an arc extinguishing unit having a structure capable of rapidly extinguishing and moving the generated arc and an air circuit breaker including the same.

In addition, an object of the present disclosure is to provide an arc extinguishing unit having a structure in which a magnet for forming a magnetic field related to the movement path of the arc is not damaged by the arc, and an air circuit breaker including the same.

In addition, an object of the present disclosure is to provide an arc extinguishing unit having a structure that does not require excessive design changes in order to have a magnet for forming a magnetic field related to the movement path of the arc, and an air circuit breaker including the same.

In addition, an object of the present disclosure is to provide an arc extinguishing unit having a structure that does not excessively increase occupied space even if a magnet for forming a magnetic field related to the movement path of the arc is provided, and an air circuit breaker including the same.

In addition, an object of the present disclosure is to provide an arc extinguishing unit having a structure in which the magnetic field formed by each magnet can be strengthened when a plurality of magnets forming a magnetic field related to the movement path of the arc is provided, and an air circuit breaker including the same.

In addition, an object of the present disclosure is to provide an arc extinguishing unit having a structure in which the extinguishing path of generated arc can be secured even if a magnet is provided, and an air circuit breaker including the same.

In order to achieve the above object, the present disclosure provides an arc extinguishing unit including a plurality of support plates that is spaced apart from each other and is disposed to face each other; a grid that is positioned between the plurality of support plates and is coupled to the plurality of support plates, respectively; a grid cover that is positioned on one side of the grid to cover the grid; a magnet case that is positioned between the plurality of support plates at the other side opposite to the one side of the grid, and is coupled to the plurality of the support plates, respectively; and an extinguishing magnet that is accommodated in the magnet case, wherein the extinguishing magnet forms a magnetic field between the plurality of the support plates.

In addition, the magnet case of the arc extinguishing unit may include a first accommodating part that is positioned on the other side of the grid; a second accommodating part that is coupled to any one of the plurality of support plates; and a third accommodating part that is coupled to the other one of the plurality of support plates.

In addition, the first accommodating part of the arc extinguishing unit may be positioned between the second accommodating part and the third accommodating part.

In addition, in the arc extinguishing unit, a shortest distance between the first accommodating part and the grid cover may be longer than a shortest distance between the second accommodating part and the grid cover or a shortest distance between the third accommodating part and the grid cover.

In addition, in the arc extinguishing unit, a shortest distance between the second accommodating part and the grid cover may be equal to a shortest distance between the third accommodating part and the grid cover.

In addition, the extinguishing magnet of the arc extinguishing unit may include a first extinguishing magnet that is accommodated in the first accommodating part; a second extinguishing magnet that is accommodated in the second accommodating part; and a third extinguishing magnet that is accommodated in the third accommodating part.

In addition, in the arc extinguishing unit, each side of the second extinguishing magnet and the third extinguishing magnet facing each other may be magnetized with the same polarity, and one side of the first extinguishing magnet facing the grid may be magnetized with the same polarity as the each side of the second extinguishing magnet and the third extinguishing magnet facing each other.

In addition, the first accommodating part of the arc extinguishing unit may include a first accommodating groove that is formed by recessing and accommodates the first extinguishing magnet; and a cover that is provided in the first accommodating part to cover the first accommodating groove.

In addition, the second accommodating part of the arc extinguishing unit may be formed by recessing in one side facing the any one of the plurality of the support plates, and may include a second accommodating groove that accommodates the second extinguishing magnet, the any one of the plurality of support plates is coupled to the second accommodating part so as to cover the second accommodating groove.

In addition, the third accommodating part may be formed by recessing in one side facing the other one of the plurality of the support plates, and may include a third accommodating groove that accommodates the third extinguishing magnet, and the other one of the plurality of support plates may be coupled to the third accommodating part so as to cover the third accommodating groove.

In addition, in the arc extinguishing unit, the second accommodating part may be positioned between the any one of the plurality of support plates and the grid, the third accommodating part may be positioned between the other one of the plurality of support plates and the grid.

In addition, in the arc extinguishing unit, a plurality of the grids may be provided and may be spaced apart from each other and be disposed side by side in one direction, and the other ends of any one or more of the plurality of grids may be coupled to the magnet case.

In addition, the magnet case of the arc extinguishing unit may include a grid coupling part that is formed by recessing in one side facing the grid, and extends between the plurality of support plates, and the other ends of the one or more grids facing the magnet case may be inserted and coupled to the grid coupling part.

In addition, in the arc extinguishing unit, both ends of the grid coupling part in the extension direction are through-formed in a direction opposite to the grid, and the other ends of the one or more grids may be through-coupled to the both ends of the grid coupling part.

In addition, in the arc extinguishing unit, wherein widths of the one or more grids may be smaller than widths of the other grids among the plurality of grids.

In addition, in the arc extinguishing unit, lengths of the one or more grids may be shorter than lengths of the other grids among the plurality of grids.

In addition, the present disclosure provides an air circuit breaker including a fixed contact; a movable contact that moves in a direction toward the fixed contact or a direction away from the fixed contact; and an arc extinguishing unit that is positioned adjacent to the fixed contact and the movable contact to extinguish an arc generated by the fixed contact and the movable contact being spaced apart, wherein the arc extinguishing unit includes a pair of support plates that is spaced apart from each other and is disposed to face each other; a grid that is positioned between a plurality of the support plates, and is coupled to the pair of the support plates, respectively; a magnet case that is positioned between the pair of support plates on one side of the grid and is coupled to the plurality of support plates, respectively; and a plurality of extinguishing magnets that is accommodated in the magnet case and is disposed to be spaced apart from each other, wherein the plurality of extinguishing magnets forms a magnetic field between the pair of support plates, respectively.

In addition, the magnet case of the air circuit breaker may include a first accommodating part that is positioned on the one side of the grid; a second accommodating part that extends from one side of the first accommodating part and is coupled to any one of the pair of support plates; and a third accommodating part that extends from the other side of the first accommodating part and is coupled to the other one of the pair of the supporting plates.

In addition, in the air circuit breaker, the second accommodating part and the third accommodating part may be disposed to face each other with the first accommodating part interposed therebetween.

In addition, in air circuit breaker, a shortest distance between the first accommodating part and the fixed contact may be shorter than a shortest distance between the second accommodating part and the fixed contact or a shortest distance between the third accommodating part and the fixed contact.

In addition, the extinguishing magnet of the air circuit breaker may include a first extinguishing magnet that is accommodated in the first accommodating part; a second extinguishing magnet that is accommodated in the second accommodating part; and a third extinguishing magnet that is accommodated in the third accommodating part, wherein each side of the second extinguishing magnet and the third extinguishing magnet facing each other may be magnetized with the same polarity, one side of the first extinguishing magnet facing the grid may be magnetized with the same polarity as each side of the second extinguishing magnet and the third extinguishing magnet facing each other.

In addition, the magnet case of the air circuit breaker may include an arc inlet that is inclinedly recessed with respect to the first accommodating part on one side opposite to the grid, a plurality of the arc inlets may be provided, any one of the plurality of the arc inlets may be positioned between the first accommodating part and the second accommodating part, the other one of the plurality of the arc inlets may be positioned between the first accommodating part and the third accommodating part.

In addition, the magnet case of the air circuit breaker may include a grid coupling part that is recessed in one side facing the grid and extends between the pair of support plates, one end of one side of the grid facing the magnet case may be inserted and coupled to the grid coupling part.

In addition, in air circuit breaker, each end of the grid coupling part in the extending direction may be through-formed in a direction facing the grid and a direction opposite to the grid, one end of the one side of the grid inserted and coupled to the grid coupling part may be through-coupled to the each end of the grid coupling part.

In addition, in the air circuit, a plurality of the grids may be provided, may be spaced apart from each other and may be stacked to face each other, any one or more grids of the plurality of the grids may be coupled to the magnet case, an area of a side of the one or more grids facing an adjacent grid may be narrower than sides of remaining grids among the plurality of grids.

According to an embodiment of the present disclosure, the following effects can be achieved.

First, the arc extinguishing unit is provided with the extinguishing magnet. The extinguishing magnet is disposed on one side of the grid facing the fixed contact and on both sides facing each support plate, respectively, and is spaced apart from each other. Each extinguishing magnet forms a magnetic field in the plurality of grids and the space formed therebetween. The magnetic field formed by each extinguishing magnet may extend to the fixed contact and the movable contact.

The arc generated by the fixed contact and the movable contact being spaced apart receives an electromagnetic force in the direction toward the arc extinguishing unit by the magnetic field formed by each extinguishing magnet. Accordingly, the arc path is formed in the direction in which the arc is discharged to the outside through the arc extinguishing unit in the fixed contact and the movable contact.

Accordingly, the generated arc can be extinguished and moved quickly.

In addition, the arc extinguishing unit is provided with the magnet case. The magnet case may accommodate the extinguishing magnet. The extinguishing magnet accommodated in the magnet case is sealed, and its communication with the outside is blocked.

Specifically, the first extinguishing magnet is accommodated in the first accommodating part. The first accommodating part includes the first accommodating groove accommodating the first extinguishing magnet and the cover covering the first accommodating groove.

The second extinguishing magnet and the third extinguishing magnet are accommodated in the second accommodating groove of the second accommodating part and the third accommodating groove of the third accommodating part, respectively. The second accommodating groove and the third accommodating groove are covered by the support plates facing each other.

Therefore, each extinguishing magnet is not exposed to the inner space of the air circuit breaker through which the arc flows. Accordingly, each extinguishing magnet is not damaged by the heat or pressure of the arc generated.

In addition, the magnet case accommodating each extinguishing magnet is provided in the arc extinguishing unit. Specifically, the magnet case is coupled to the grid and each support plate provided in the arc extinguishing unit.

In addition, the magnet case is positioned on the inner side of the plurality of grids, that is, between a pair of grids positioned the outermost grid. In addition, the first accommodating part protruding toward the fixed contact is disposed to be farther from the fixed contact than one side end of the support plate. In other words, the magnet case does not protrude to the exterior of the arc extinguishing unit.

Therefore, in order to have the extinguishing magnet for forming a magnetic field, the design change of other components and arrangement of the air circuit breaker is not required.

Furthermore, the magnet case is positioned inside the space occupied by the arc extinguishing unit.

Therefore, even if the magnet case is provided, the space occupied by the arc extinguishing unit is not excessively increased.

In addition, each extinguishing magnet forms the sub magnetic field formed by itself and the main magnetic field formed between the respective extinguishing magnets. The main magnetic field is generated in the same direction as the sub magnetic field.

Accordingly, the magnetic field formed by each extinguishing magnet may be strengthened. As a result, the electromagnetic force generated by the magnetic field is also strengthened, so that the arc path can be effectively formed.

In addition, the arc inlet is formed in the magnet case. The arc inlet induces the incoming arc towards the grid not coupled to the magnet case. In addition, the arc inlet induces the arc to the portion of the grid not coupled to the magnet case, among the portions of the grid coupled to the magnet case.

Accordingly, even if the magnet case and the extinguishing magnet are provided, the generated arc can flow toward the grid. Accordingly, the arc path of the generated arc can be secured.

BRIEF DESCRIPTION OF THE DRAWINGS

FIG. 11 is a front view illustrating an embodiment of the arc extinguishing unit illustrated in FIG. 10.

FIG. 12 is a plan view illustrating an embodiment of the arc extinguishing unit illustrated in FIG. 10.

FIG. 15 is a perspective view illustrating a state in which a mesh part is removed from the arc extinguishing unit illustrated in FIG. 14.

FIG. 16 is a plan view illustrating a state in which a mesh part is removed from the arc extinguishing unit illustrated in FIG. 14.

FIG. 17 is a perspective view illustrating a state in which an upper magnet is removed from the arc extinguishing unit illustrated in FIG. 15.

FIG. 18 is a plan view illustrating a state in which an upper magnet is removed from the arc extinguishing unit illustrated in FIG. 15.

FIG. 19 is a perspective view illustrating another embodiment of an arc extinguishing unit provided in the air circuit breaker of FIG. 1.

FIG. 20 is a front view illustrating another embodiment of an arc extinguishing unit provided in the air circuit breaker of FIG. 1.

DETAILED DESCRIPTION

Hereinafter, an arc extinguishing unit and an air circuit breaker including the same according to an embodiment of the present disclosure will be described in detail with reference to the accompanying drawings.

In the following description, in order to clarify the characteristics of the present disclosure, descriptions of some components may be omitted.

1. Definition of Terms

The term "energization" as used in the following description refers that current or electrical signals are transmitted between one or more members.

The term "magnet" used in the following description refers to any object capable of magnetizing a magnetic material or forming a magnetic field. In one embodiment, the magnet may be provided as a permanent magnet or an electromagnet.

The term “air circuit breaker” used in the following description refers to a circuit breaker that extinguishes an arc using air or compressed air. It is assumed that each component described below is applied to the air circuit breaker.

However, each of the components described below may also be applied to an air blast circuit breaker, a compressed air circuit breaker, a gas circuit breaker, an oil circuit breaker, and a vacuum circuit breaker.

The term “main magnetic field” used in the following description refers to a magnetic field formed between a plurality of magnets disposed adjacent to each other. That is, the main magnetic field (M.M.F) refers to a magnetic field formed to face the other magnet from any one of the plurality of magnets.

The term “sub magnetic field” used in the following description refers to a magnetic field formed by any one magnet itself. That is, the sub magnetic field (S.M.F) refers to a magnetic field formed so as to face the other side from one side of any one magnet.

Figure 1:
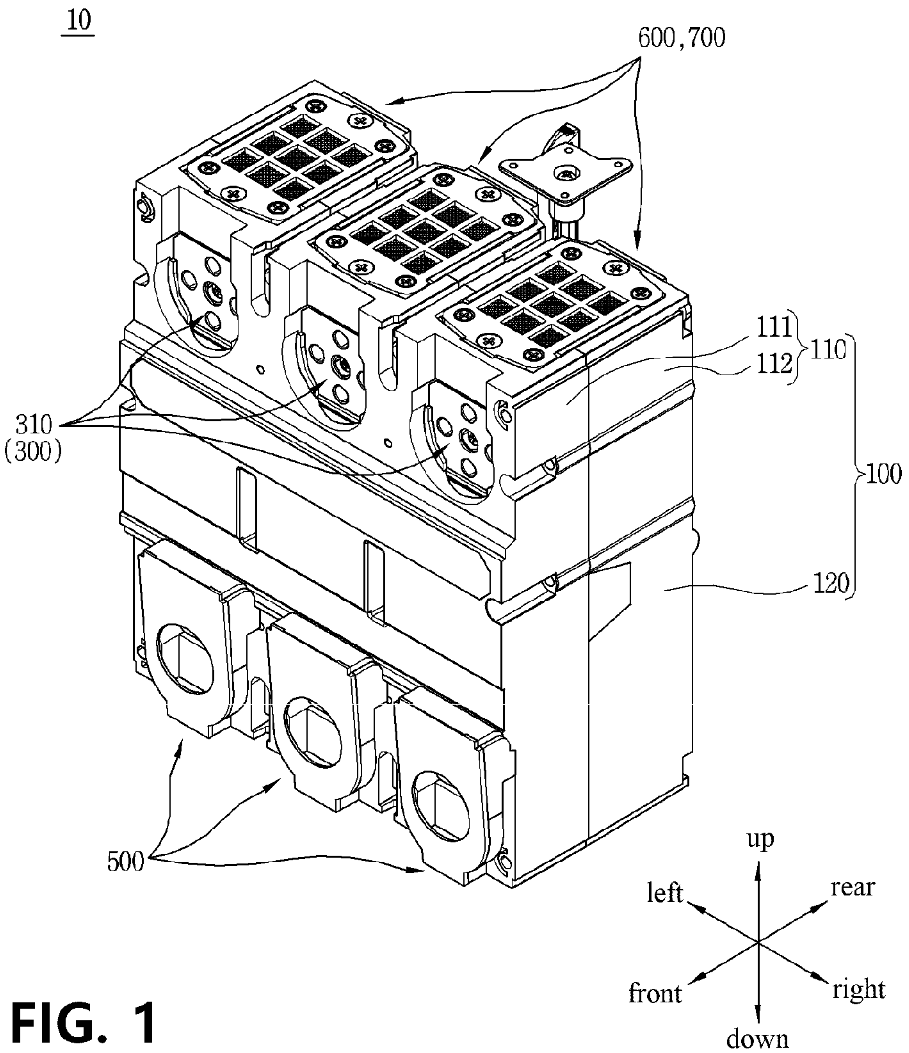
FIG. 1 is a perspective view illustrating an air circuit breaker according to an embodiment of the present disclosure.
Figure 2:
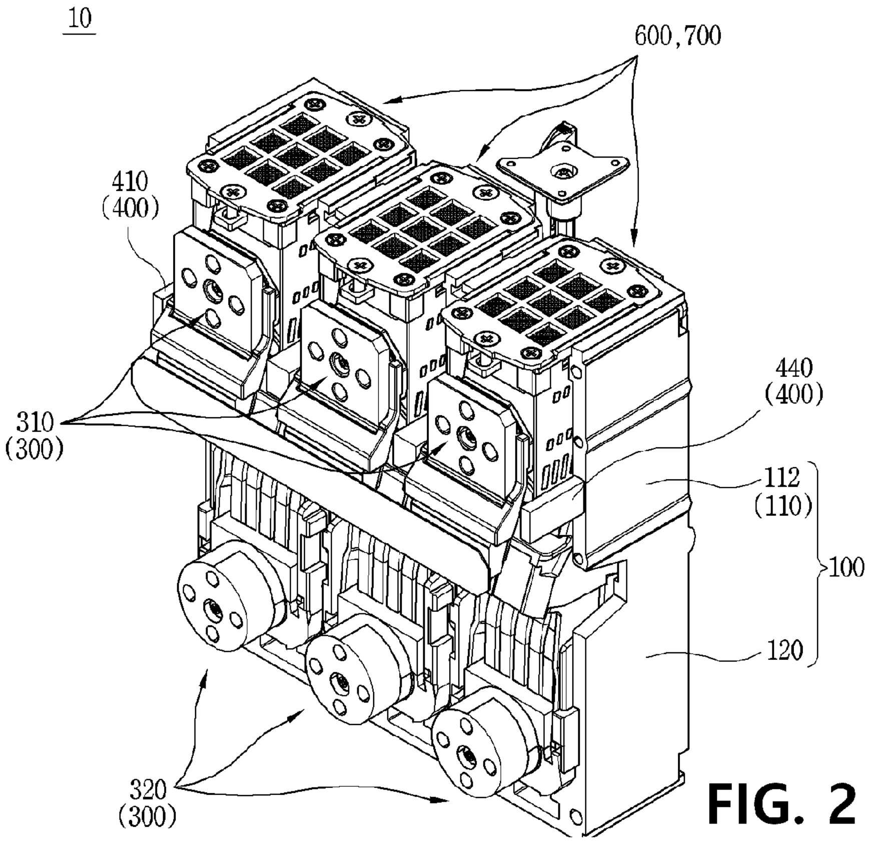
FIG. 2 is a perspective view illustrating a state in which a rear cover is removed from the air circuit breaker of FIG. 1.
Figure 3:
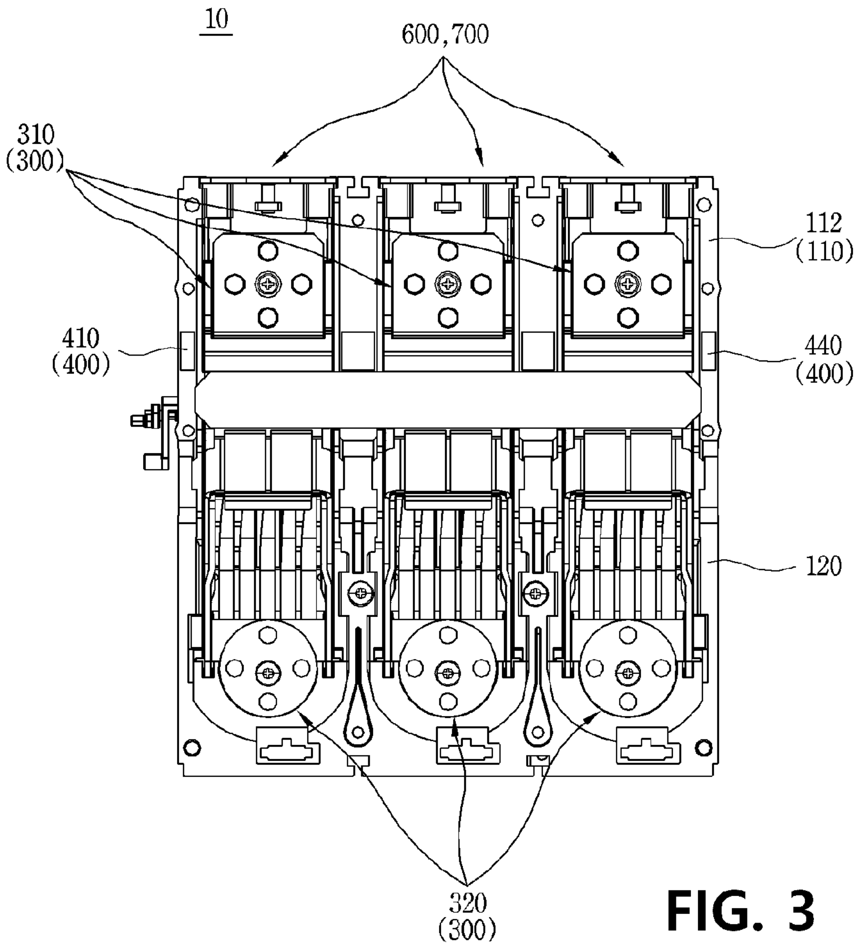
FIG. 3 is a front view illustrating a state in which a rear cover is removed from the air circuit breaker of FIG. 1.
Figure 4:
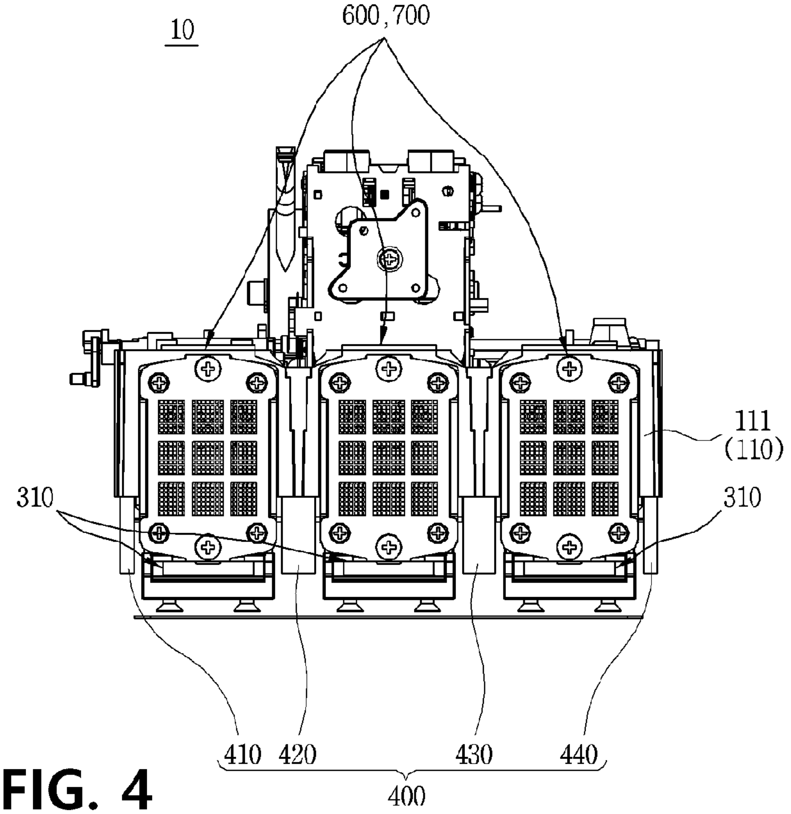
FIG. 4 is a plan view illustrating a state in which a rear cover is removed from the air circuit breaker of FIG. 1.
Figure 5:
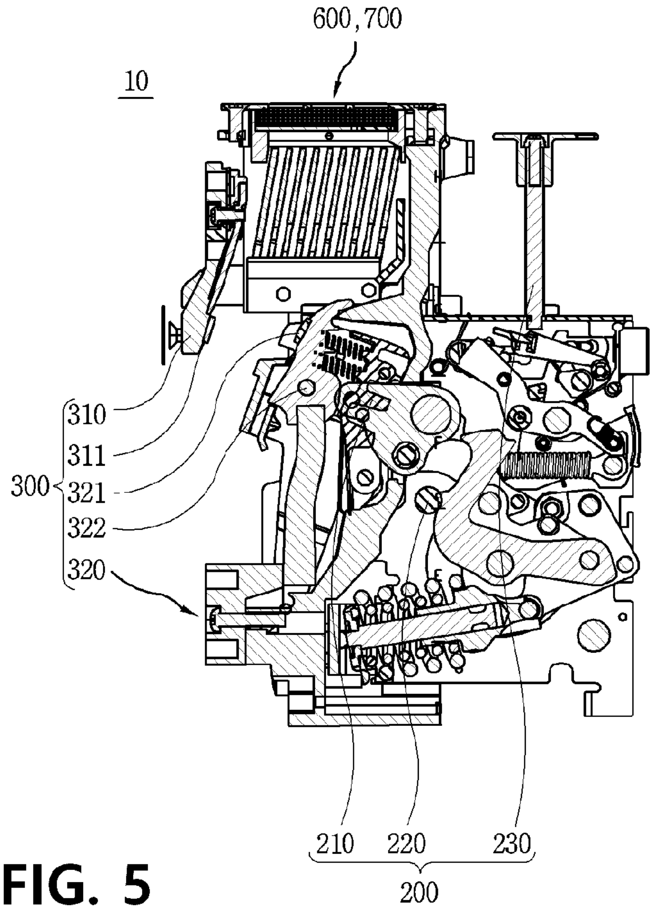
FIG. 5 is a cross-sectional view illustrating a state in which a rear cover is removed from the air circuit breaker of FIG. 1.
Figure 6:
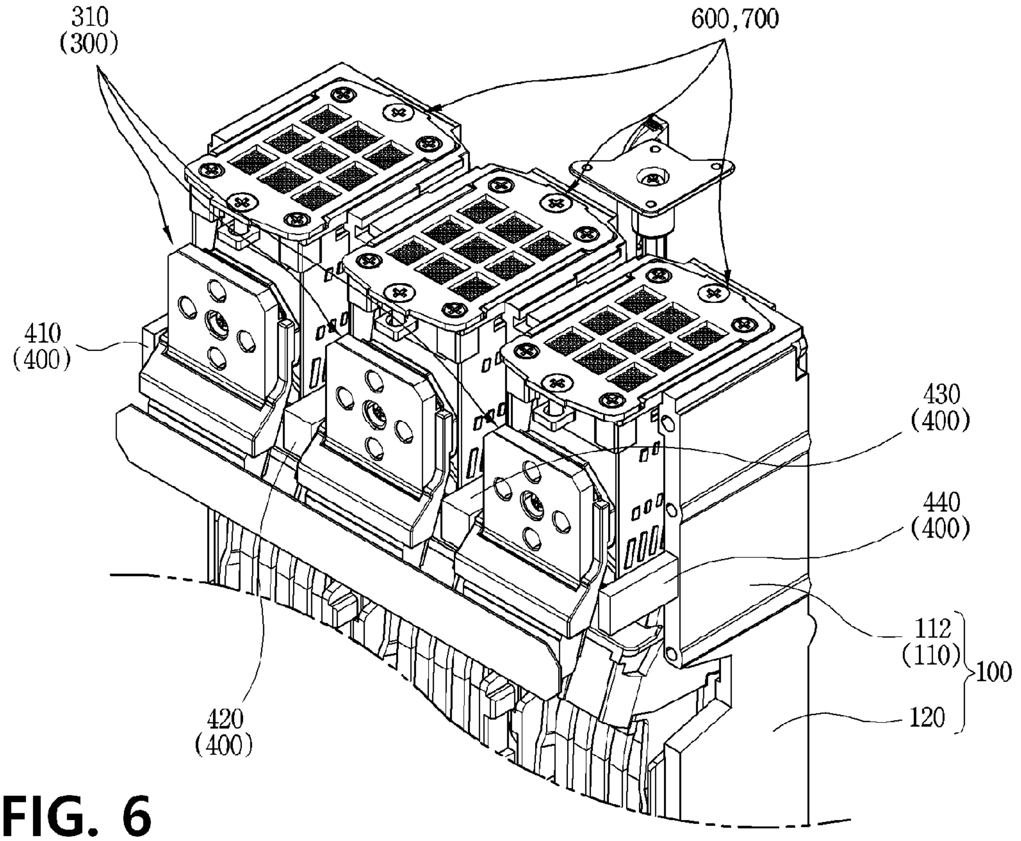
FIG. 6 is a perspective view illustrating a permanent magnet provided in the air circuit breaker of FIG. 1.
Figure 7:
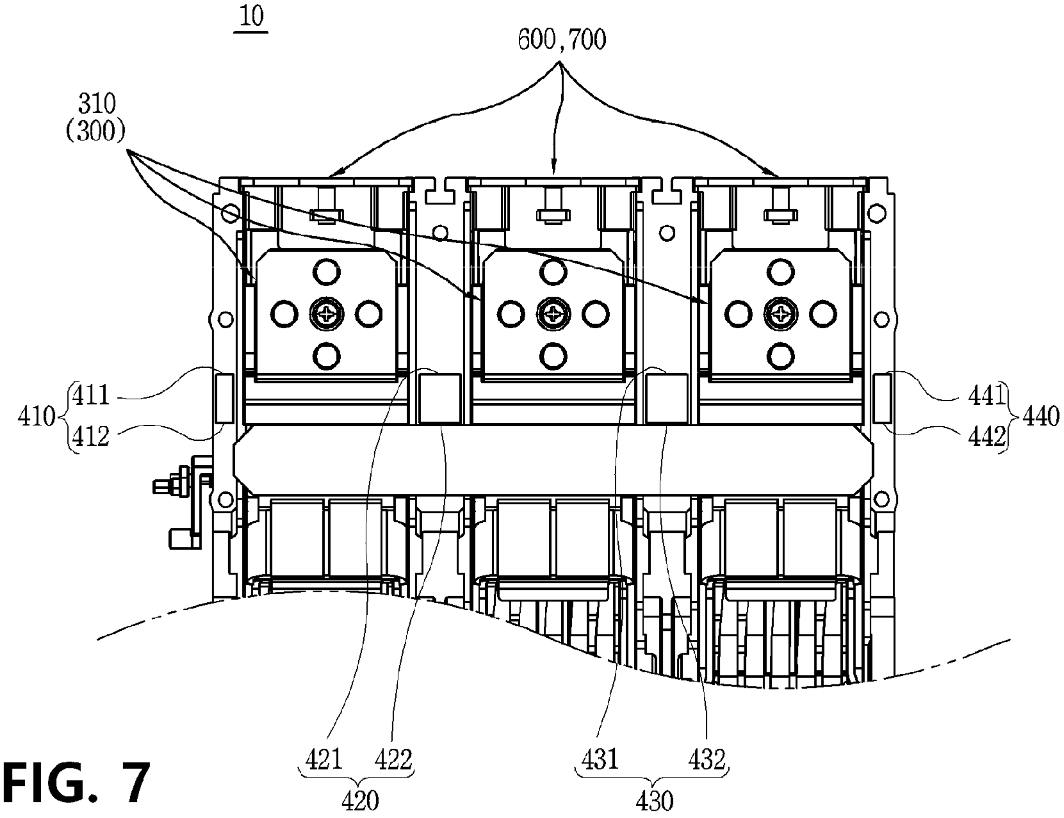
FIG. 7 is a front view illustrating a permanent magnet provided in the air circuit breaker of FIG. 1.
Figure 8:
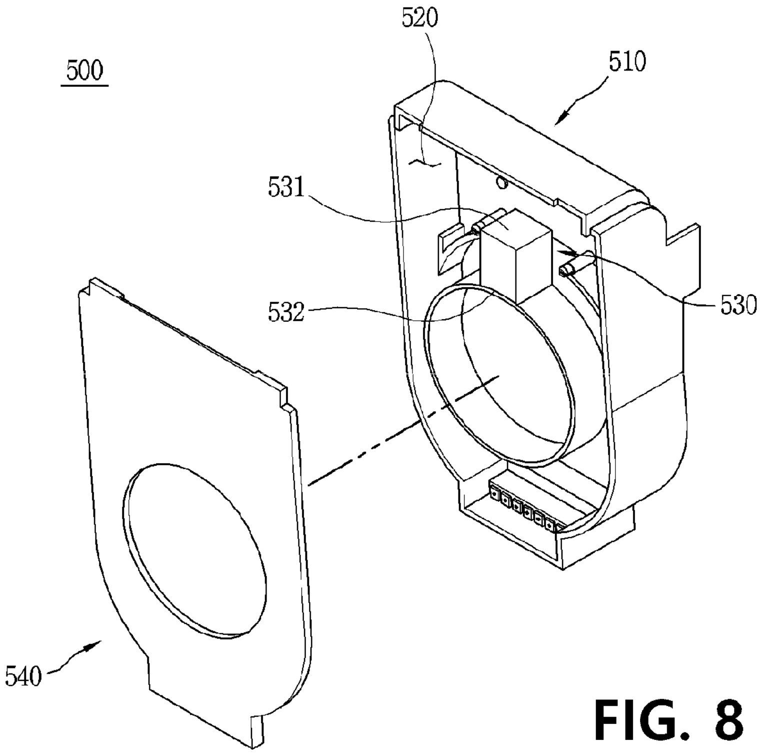
FIG. 8 is an exploded perspective view illustrating a current transformer case provided in the air circuit breaker of FIG. 1.
Figure 9:
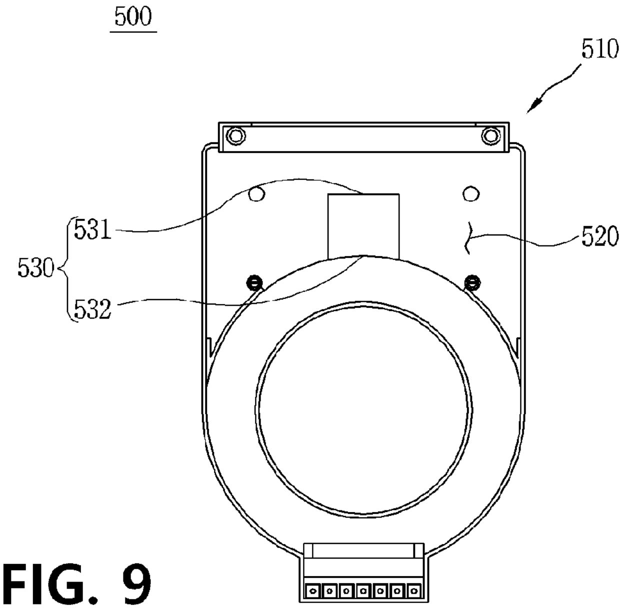
FIG. 9 is a front view illustrating the current transformer case of FIG. 8.
Figure 10:
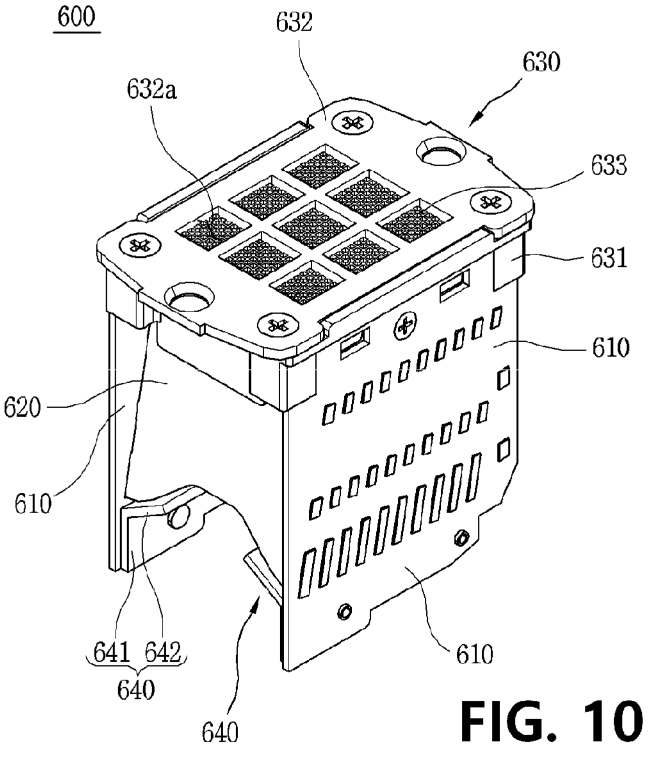
FIG. 10 is a perspective view illustrating an embodiment of an arc extinguishing unit provided in the air circuit breaker of FIG. 1.
Figure 13:
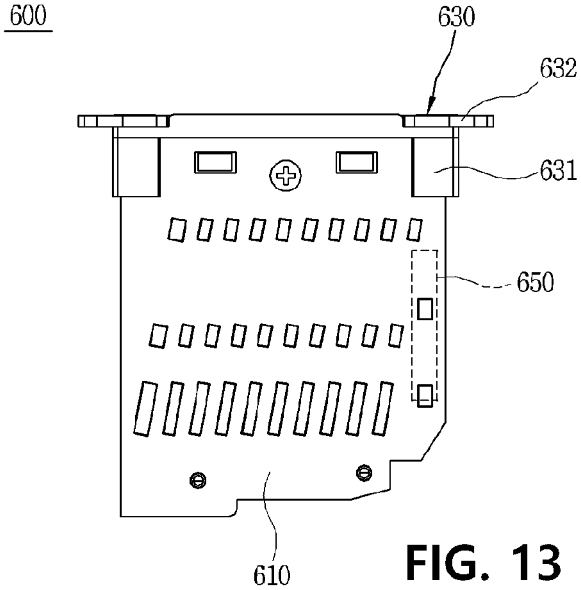
FIG. 13 is a side view illustrating an embodiment of the arc extinguishing unit illustrated in FIG. 10.
Figure 14:
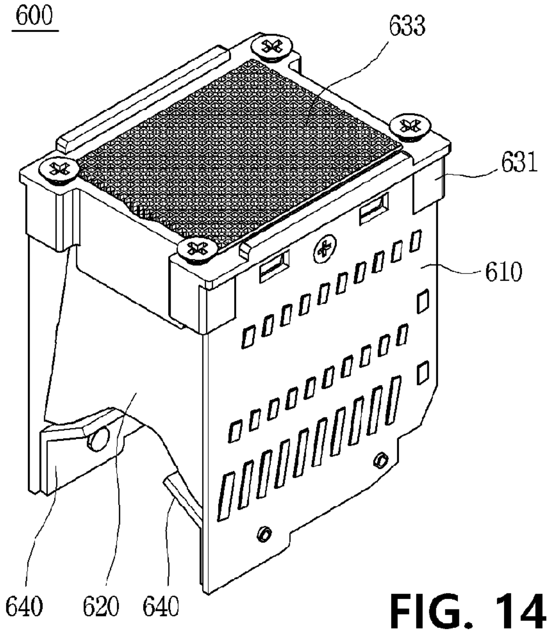
FIG. 14 is a perspective view illustrating a state in which an arc cover is removed from the arc extinguishing unit illustrated in FIG. 10.
Figure 21:
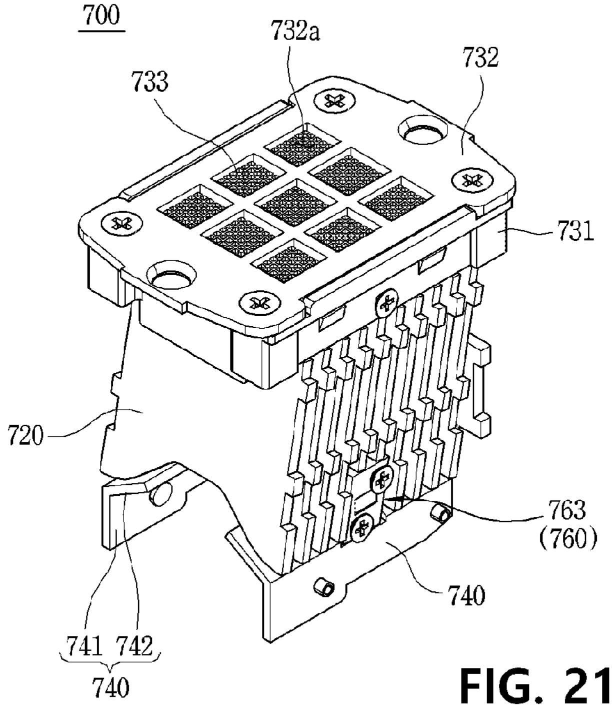
FIG. 21 is a perspective view illustrating a state in which a support plate is removed from the arc extinguishing unit illustrated in FIG. 19.
Figure 22:
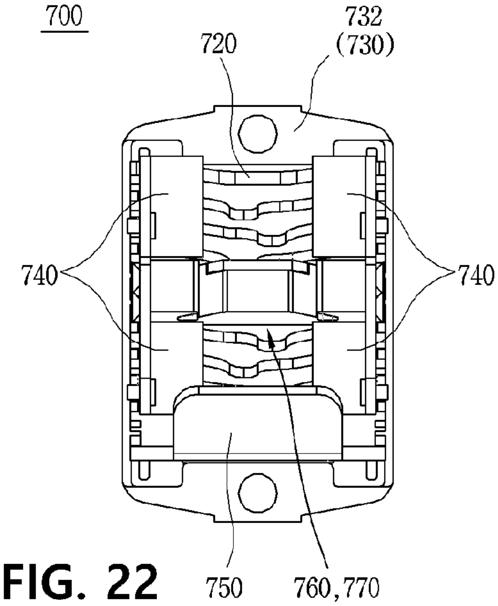
FIG. 22 is a front view illustrating a state in which a support plate is removed from the arc extinguishing unit illustrated in FIG. 19.
Figure 23:
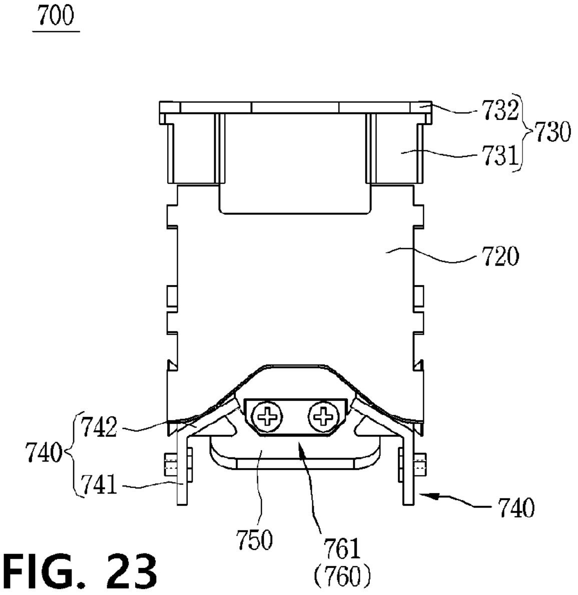
FIG. 23 is a bottom view illustrating a state in which a support plate is removed from the arc extinguishing unit illustrated in FIG. 19.
Figure 24:
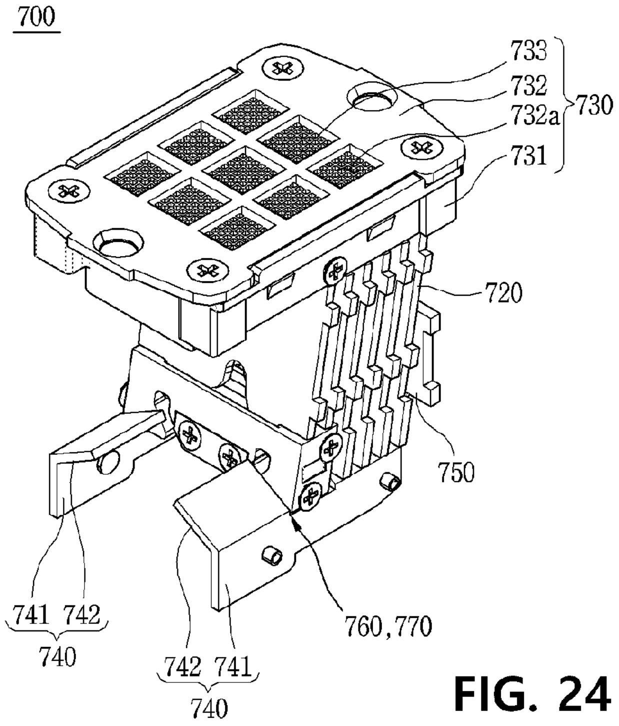
FIG. 24 is a perspective view illustrating a state in which some of grids are removed from the arc extinguishing unit illustrated in FIG. 19.
Figure 25:
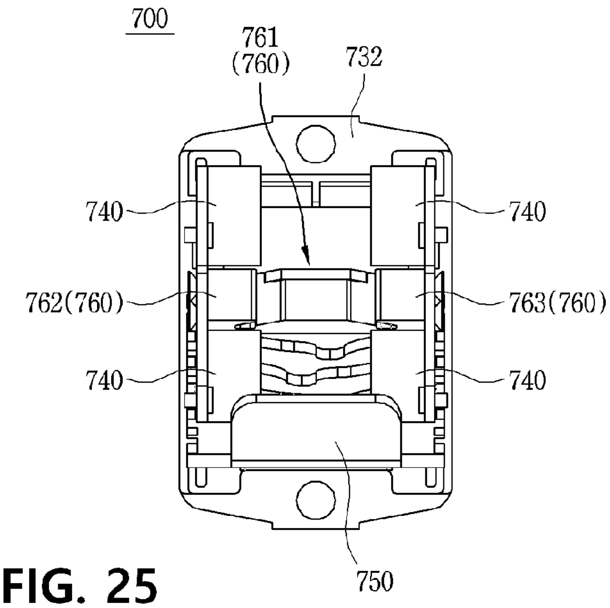
FIG. 25 is a front view illustrating a state in which some of grids are removed from the arc extinguishing unit illustrated in FIG. 19.
Figure 26:
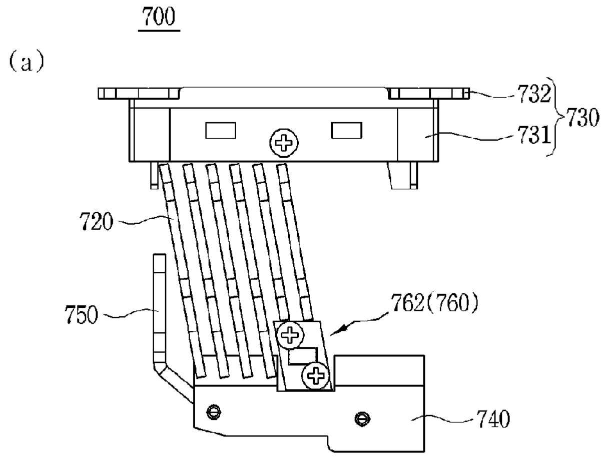
FIG. 26 is a left side view (a) and a right side view (b) illustrating a state in which some of grids are removed from the arc extinguishing unit illustrated in FIG. 19.
Figure 26:
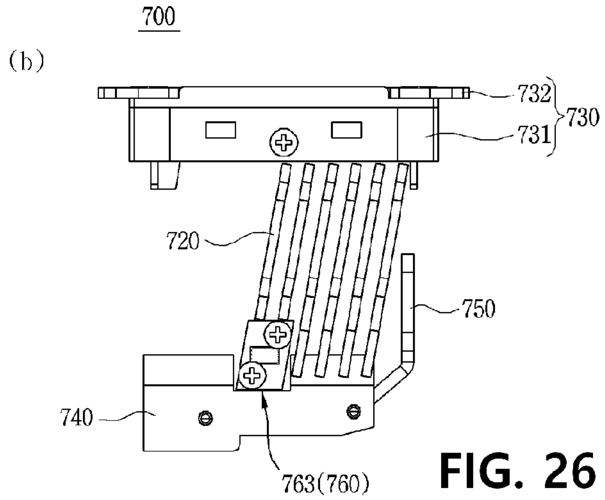
Figure 27:
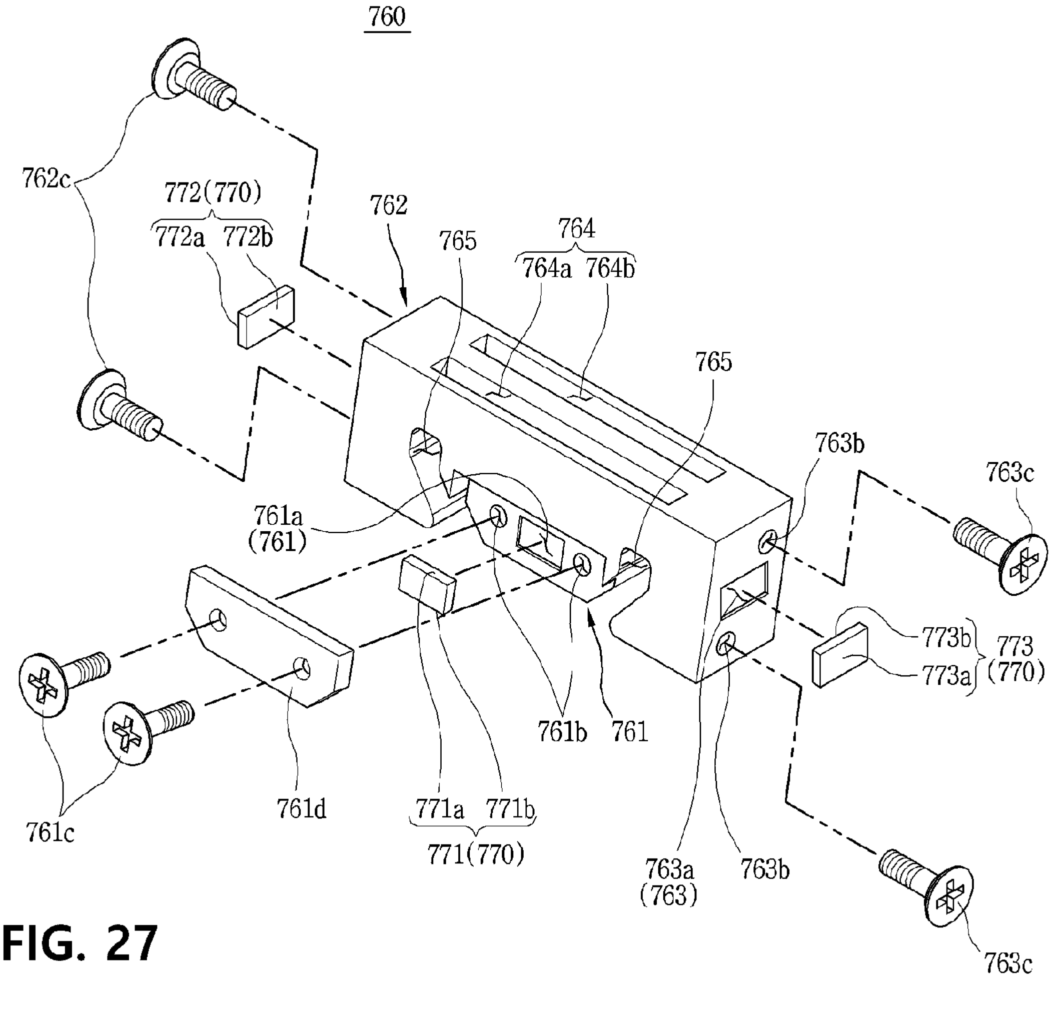
FIG. 27 is an exploded perspective view illustrating an extinguishing magnet provided in the arc extinguishing unit illustrated in FIG. 19.
Figure 28:
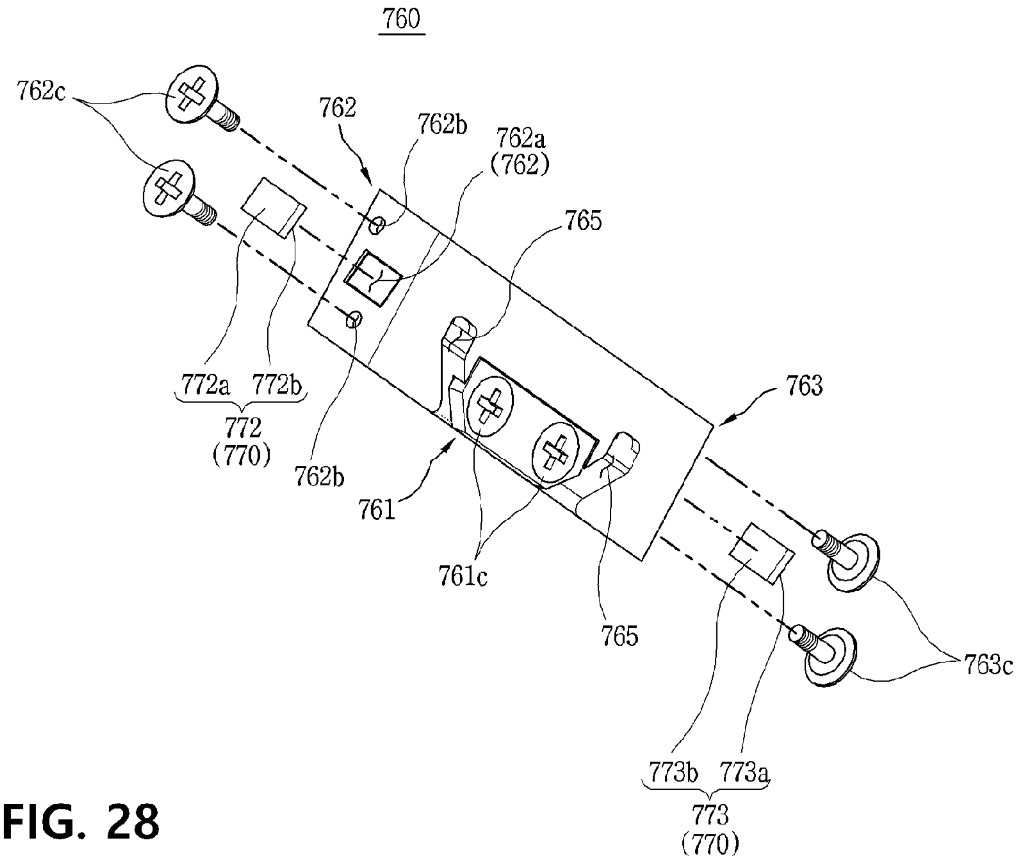
FIG. 28 is an exploded perspective view illustrating an extinguishing magnet provided in the arc extinguishing unit illustrated in FIG. 19 from another angle.
Figure 29:
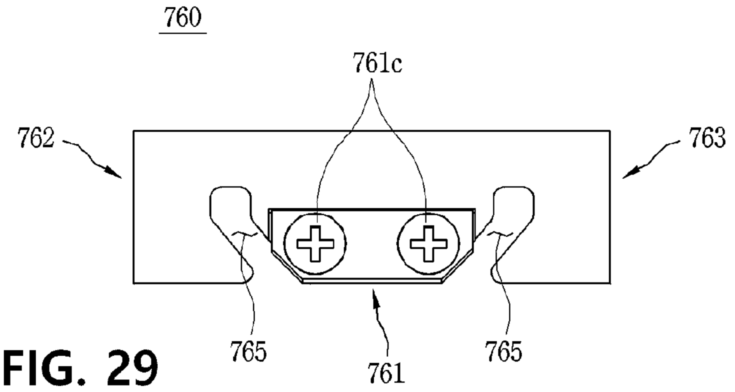
FIG. 29 is a front view illustrating an extinguishing magnet provided in the arc extinguishing unit illustrated in FIG. 19.
Figure 30:
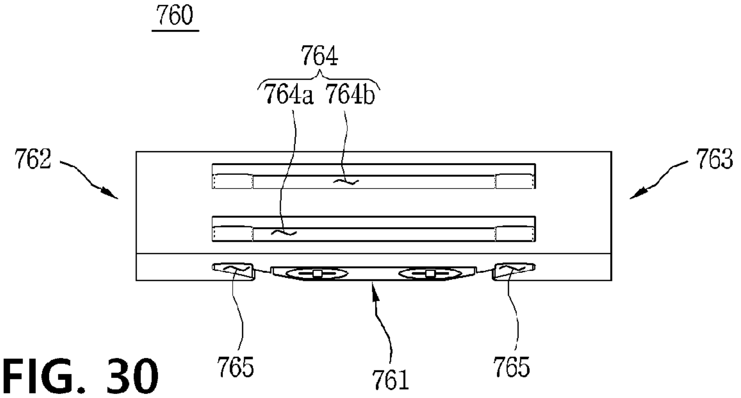
FIG. 30 is a plan view illustrating an extinguishing magnet provided in the arc extinguishing unit illustrated in FIG. 19.

The terms “upper”, “lower”, “right”, “left”, “front” and “rear” used in the following description will be understood with reference to the coordinate system shown in FIG. 1.

2. Description of the Configuration of an Air Circuit Breaker 10 According to an Embodiment of the Present Disclosure With reference to FIGS. 1 to 5, an air circuit breaker 10 according to an embodiment of the present disclosure includes a cover unit 100, a driving unit 200, and a blocking unit 300.

In addition, with reference to FIGS. 6 to 30, the air circuit breaker 10 according to an embodiment of the present disclosure includes a cover magnet unit 400, a current transformer (CT) magnet unit 500 and an arc extinguishing unit 600, 700.

Hereinafter, each component of the air circuit breaker 10 according to an embodiment of the present disclosure will be described with reference to the accompanying drawings, but the cover magnet unit 400, the CT magnet unit 500 and the arc extinguishing unit 600, 700 are described in a separate paragraph.

(1) Description of the Cover Unit 100

With reference to FIGS. 1 to 5, the air circuit breaker 10 according to an embodiment of the present disclosure includes the cover unit 100.

The cover unit 100 forms the outer shape of the air circuit breaker 10. In addition, the cover unit 100 is formed with a space therein, each component for the operation of the air circuit breaker 10 can be mounted in the space.

That is, the cover unit 100 functions as a kind of housing.

The cover unit 100 may be formed of a material having high heat resistance and high rigidity. This is to prevent damage to each component mounted inside the cover unit, and to prevent damage by the arc generated inside the cover unit. In one embodiment, the cover unit 100 may be formed of a synthetic resin or reinforced plastic.

In the illustrated embodiment, the cover unit 100 has a rectangular prism shape with the up-down direction as the height. The shape of the cover unit 100 may be provided in any form capable of mounting the components for the operation of the air circuit breaker 10 therein.

The inner space of the cover unit 100 is energized with the outside. Each component mounted inside the cover unit 100 may be energized by connecting to an external power source or load.

In the illustrated embodiment, the cover unit 100 includes an upper cover 110 and a lower cover 120.

The upper cover 110 forms an upper side of the cover unit 100. The upper cover 110 is positioned above the lower cover 120. In an embodiment, the upper cover 110 and the lower cover 120 may be integrally formed.

A space is formed inside the upper cover 110. Various components provided in the air circuit breaker 10 are mounted in the space. In an embodiment, the blocking unit 300 and the arc extinguishing unit 600, 700 may be mounted in the inner space of the upper cover 110.

The inner space of the upper cover 110 communicates with the inner space of the lower cover 120. Components such as the blocking unit 300 may be accommodated over the inner space of the upper cover 110 and the inner space of the lower cover 120.

The arc extinguishing unit 600, 700 is positioned on one side of the upper cover 110, which in the illustrated embodiment is the upper surface. The arc extinguishing unit 600, 700 may be partially exposed from the upper surface of the upper cover 110. The arc generated in the inner space of the upper cover 110 may pass through the arc extinguishing unit 600, 700 and be extinguished to be discharged to the exterior of the air circuit breaker 10.

A fixed contact stand 310 of the blocking unit 300 is exposed on the other side of the upper cover 110, which in the illustrated embodiment is the front side. The fixed contact stand 310 may be energized by connecting to an external power source or load through the exposed portion.

In the illustrated embodiment, the upper cover 110 includes a first upper cover 111 and a second upper cover 112.

The first upper cover 111 is configured to cover one side of the upper side of the air circuit breaker 10, which in the illustrated embodiment is the front side. The first upper cover 111 is coupled to the second upper cover 112 by any fastening means.

An opening is formed in the first upper cover 111. The fixed contact stand 310 may be exposed to the outside through the opening. In the illustrated embodiment, three openings are formed in the left-right direction.

The cover magnet unit 400 may be disposed on the first upper cover 111. The cover magnet unit 400 may be disposed in the direction in which the plurality of arc extinguishing units 600, 700 is spaced apart from each other.

The second upper cover 112 is configured to cover the other side of the upper side of the air circuit breaker 10, which in the illustrated embodiment is the rear side. The second upper cover 112 is coupled to the first upper cover 111 by any fastening means.

The cover magnet unit 400 may be disposed on the second upper cover 112. As described above, the cover magnet unit 400 may also be disposed on the first upper cover 111. That is, the cover magnet unit 400 may be disposed on any one of the first upper cover 111 and the second upper cover 112.

The lower cover 120 forms a lower side of the cover unit 100. The lower cover 120 is positioned below the upper cover 110.

A space is formed inside the lower cover 120. Various components provided in the air circuit breaker 10 are mounted in the space. In an embodiment, the driving unit 200, the blocking unit 300 and the like may be mounted in the inner space of the lower cover 120.

The inner space of the lower cover 120 communicates with the inner space of the upper cover 110. Components such as the blocking unit 300 may be accommodated over the inner space of the lower cover 120 and the inner space of the upper cover 110.

A movable contact stand 320 of the blocking unit 300 is positioned on one side of the lower cover 120, which in the illustrated embodiment is on the front. The movable contact stand 320 may be exposed to the outside through an opening formed in the lower cover 120. The movable contact stand 320 may be energized by connecting to an external power source or load through the exposed portion.

The CT magnet unit 500 to be described later is coupled to the opening of the lower cover 120, that is, the opening through which the movable contact stand 320 is exposed. A detailed description thereof will be provided later.

(2) Description of the Driving Unit 200

With reference to FIGS. 1 to 5, the air circuit breaker 10 according to an embodiment of the present disclosure includes the driving unit 200.

The driving unit 200 rotates as the fixed contact 311 and movable contact 321 of the blocking unit 300 are spaced apart, thereby performing a trip mechanism. Accordingly, the air circuit breaker 10 can be cut off the energization with the outside, the user can recognize that the operation for cutting off the energization has been performed.

The driving unit 200 is accommodated in the air circuit breaker 10. Specifically, the driving unit 200 is partially accommodated in the space inside the cover unit 100. In addition, the remaining portions of the driving unit 200 are accommodated in a case provided on one side (the rear side in the illustrated embodiment) of the cover unit 100, which is not denoted by reference numerals.

The driving unit 200 is connected to the blocking unit 300. Specifically, a crossbar 220 of the driving unit 200 is configured to rotate together with the rotation of the movable contact stand 320 of the blocking unit 300.

Accordingly, when the movable contact stand 320 of the blocking unit 300 is rotated and moved, the driving unit 200 may be rotated together. The driving unit 200 is rotatably accommodated in the air circuit breaker 10.

In the illustrated embodiment, the driving unit 200 includes a shooter 210, a crossbar 220 and a lever 230.

The shooter 210 is rotated together as the movable contact stand 320 of the blocking unit 300 rotates in the direction of away from the fixed contact stand 310. The shooter 210 is connected to the crossbar 220 and the lever 230.

Specifically, one end of the shooter 210 is constrained by the crossbar 220. An elastic member is provided at the other end of the shooter 210. Accordingly, in a state in which the fixed contact 311 and the movable contact 321 are in contact, the shooter 210 presses the elastic member and stores the restoring force. The external force for the pressing may be provided by a state in which the crossbar 220 is rotated toward the fixed contact stand 310.

When the movable contact 321 is spaced apart from the fixed contact 311, the movable contact stand 320 is rotated in the direction away from the fixed contact stand 310. Accordingly, the crossbar 220 is also rotated and one end of the shooter 210 is released and rotated by the restoring force provided by the elastic member.

The shooter 210 is connected to the lever 230. As the shooter 210 rotates and hits the lever 230, the lever 230 also rotates and the trip mechanism may be performed.

The crossbar 220 is connected to the movable contact stand 320 and rotates together as the movable contact stand 320 rotates. Accordingly, the shooter 210 constrained by the crossbar 220 is released so that the trip mechanism can be performed.

The crossbar 220 may extend between the plurality of blocking units 300. In the illustrated embodiment, a total of three movable contact stands 320 of the blocking unit 300 are provided and are disposed in the left-right direction. The crossbar 220 may be connected through the plurality of movable contact stands 320 disposed in the left-right direction.

The crossbar 220 is in contact with the one end of the shooter 210 to constrain the shooter 210. When the crossbar 220 is rotated together with the movable contact stand 320, the crossbar 220 releases the one end of the shooter 210.

The lever 230 may be rotated by hitting the rotating shooter 210. The lever 230 may be partially exposed to the exterior of the air circuit breaker 10. When the trip mechanism is performed by the blocking unit 300, the lever 230 is rotated in a preset direction.

Accordingly, the user can easily recognize that the trip mechanism has been performed. In addition, the user may adjust the rotational operation of the lever 230 so that the air circuit breaker 10 can be energized again.

Since the process of performing the trip mechanism by the driving unit 200 is a well-known technique, a detailed description thereof will be omitted.

(3) Description of the Blocking Unit 300

With reference to FIGS. 1 to 5, the air circuit breaker 10 according to an embodiment of the present disclosure includes the blocking unit 300.

The blocking unit 300 includes the fixed contact stand 310 and the movable contact stand 320 that are spaced apart or in contact with each other. When the fixed contact stand 310 and the movable contact stand 320 are in contact with each other, the air circuit breaker 10 may be energized with an external power source or load. When the fixed contact stand 310 and the movable contact stand 320 are spaced apart, the energization between the air circuit breaker 10 and an external power source or load is cut off.

The blocking unit 300 is accommodated in the air circuit breaker 10. Specifically, the blocking unit 300 is rotatably accommodated in the inner space of the cover unit 100.

The blocking unit 300 may be energized with the outside. In one embodiment, any one of the fixed contact stand 310 and the movable contact stand 320 may receive current from an external power source or load. In addition, current may flow from the other one of the fixed contact stand 310 and the movable contact stand 320 to an external power source or load.

The blocking unit 300 may be partially exposed to the exterior of the air circuit breaker 10. Accordingly, the blocking unit 300 may be energized by connecting to an external power source or load through a member such as a conducting wire (not shown).

A plurality of the blocking units 300 may be provided. The plurality of blocking units 300 may be disposed to be spaced apart from each other in one direction. A partition wall may be provided between the blocking units 300 to prevent interference between currents energized through each of the blocking units 300.

In the illustrated embodiment, three blocking units 300 are provided. In addition, the three blocking units 300 are disposed spaced apart from each other in the left-right direction of the air circuit breaker 10. This is due to the energization of three-phase currents such as R phase, S phase and T phase or U phase, V phase and W phase to the air circuit breaker 10 according to an embodiment of the present disclosure.

The number of blocking units 300 may be changed according to the number of phases of current energized through the air circuit breaker 10.

In the illustrated embodiment, the blocking unit 300 includes the fixed contact stand 310 and the movable contact stand 320.

The fixed contact stand 310 may be in contact with or spaced apart from the movable contact stand 320. When the movable contact stand 320 is in contact with the fixed contact stand 310, the air circuit breaker 10 may be energized with an external power source or load. When the fixed contact stand 310 and the movable contact stand 320 are spaced apart, the energization between the air circuit breaker 10 and an external power source or load is cut off.

As can be seen from the name, the fixed contact stand 310 is fixedly installed on the cover unit 100. Therefore, the contact and separation of the fixed contact stand 310 and the movable contact stand 320 is achieved by the rotation of the movable contact stand 320.

In the illustrated embodiment, the fixed contact stand 310 is accommodated in the inner space of the upper cover 110.

The fixed contact stand 310 may be partially exposed to the exterior of the air circuit breaker 10. Through the exposed portion, the fixed contact stand 310 may be energized by connecting to an external power source or load.

In the illustrated embodiment, the fixed contact stand 310 is exposed to the outside through an opening formed on the front side of the upper cover 110.

The fixed contact stand 310 may be formed of a material having electrical conductivity. In one embodiment, the fixed contact stand 310 may be formed of copper (Cu), iron (Fe) or an alloy material including these.

In the illustrated embodiment, the fixed contact stand 310 includes the fixed contact 311.

The fixed contact 311 may be in contact with or spaced apart from the movable contact 321. The fixed contact 311 is positioned on one side of the fixed contact stand 310 facing the movable contact stand 320, which in the illustrated embodiment is on the rear side.

The fixed contact 311 is energized with the fixed contact stand 310. In the illustrated embodiment, the fixed contact 311 is positioned on the rear side of the fixed contact stand 310. In an embodiment, the fixed contact 311 may be integrally formed with the fixed contact stand 310.

When the fixed contact 311 and the movable contact 321 are in contact, the air circuit breaker 10 is energized by connecting to an external power source or load. In addition, when the fixed contact 311 is spaced apart from the movable contact 321, the energization between the air circuit breaker 10 and an external power source or load is cut off.

The movable contact stand 320 may be in contact with or spaced apart from the fixed contact stand 310. By the contact and separation of the movable contact stand 320 and the fixed contact stand 310, the air circuit breaker 10 can be energized or cut off with an external power source or load as described above.

The movable contact stand 320 is rotatably installed in the inner space of the cover unit 100. The movable contact stand 320 may be rotated in the direction toward the fixed contact stand 310 and in the direction away from the fixed contact stand 310.

In the illustrated embodiment, the movable contact stand 320 is accommodated in the inner space of the upper cover 110 and lower cover 120. As described above, the respective inner spaces of the upper cover 110 and lower cover 120 may communicate with each other.

The movable contact stand 320 may be partially exposed to the exterior of the air circuit breaker 10. Through the exposed portion, the movable contact stand 320 may be energized by connecting to an external power source or load.

In the illustrated embodiment, the movable contact stand 320 is exposed to the outside through an opening formed on the front side of the lower cover 120.

The opening may be covered by the CT magnet unit 500 to be described later. Accordingly, the opening may be closed, except for a portion in which the movable contact stand 320 is energized with an external power source or load.

The movable contact stand 320 may be formed of a material having electrical conductivity. In one embodiment, the movable contact stand 320 may be formed of copper, iron or an alloy material including these.

The movable contact stand 320 is connected to the driving unit 200. Specifically, the movable contact stand 320 is connected to the crossbar 220 of the driving unit 200. In one embodiment, the crossbar 220 may be coupled through the movable contact stand 320.

When the movable contact stand 320 is rotated, the crossbar 220 may also be rotated. Accordingly, as described above, the driving unit 200 may be operated to perform a trip mechanism.

In the illustrated embodiment, the movable contact stand 320 includes the movable contact 321 and a rotating shaft 322.

The movable contact 321 may be in contact with or spaced apart from the fixed contact 311. The movable contact 321 is positioned on one side of the movable contact stand 320 facing the fixed contact stand 310, which in the illustrated embodiment is the front side.

The movable contact 321 may be rotated together with the movable contact stand 320. When the movable contact stand 320 is rotated toward the fixed contact stand 310, the movable contact 321 may also be rotated toward the fixed contact 311 to be in contact with the fixed contact 311.

In addition, when the movable contact stand 320 is rotated in the direction away from the fixed contact stand 310, the movable contact 321 may also be spaced apart from the fixed contact 311.

The movable contact 321 is energized with the movable contact stand 320. In the illustrated embodiment, the movable contact 321 is positioned on the front side of the movable contact stand 320. In one embodiment, the movable contact 321 may be integrally formed with the movable contact stand 320.

By the contact and separation of the movable contact 321 and the fixed contact 311, the air circuit breaker 10 is energized or cut off with an external power source or load as described above.

In a state in which the fixed contact 311 and the movable contact 321 are in contact with each other and are energized, when the fixed contact 311 and the movable contact 321 are spaced apart, the arc is generated. The air circuit breaker 10 according to an embodiment of the present disclosure includes various components for effectively forming the arc path of the generated arc. A detailed description thereof will be provided later.

The rotating shaft 322 is a component to which the movable contact stand 320 is rotatably coupled to the cover unit 100. The movable contact stand 320 may be rotated about the rotating shaft 322 in the direction toward the fixed contact stand 310 or in the direction away from the fixed contact stand 310.

The rotating shaft 322 is positioned on the other side of the movable contact stand 320 opposite to the fixed contact stand 310, which in the illustrated embodiment is on the rear side.

3. Description of the Cover Magnet Unit 400 According to an Embodiment of the Present Disclosure With reference to FIGS. 6 to 7, the air circuit breaker 10 according to an embodiment of the present disclosure includes the cover magnet unit 400.

The cover magnet unit 400 forms a magnetic field. By the magnetic field, an arc path (A.P), which is a path through which the arc generated in the arc extinguishing unit 600, 700 flows, may be formed.

The cover magnet unit 400 may be provided in any shape capable of forming a magnetic field. In one embodiment, the cover magnet unit 400 may be provided with a permanent magnet or an electromagnet.

The cover magnet unit 400 is coupled to the upper cover 110 of the air circuit breaker 10. The cover magnet unit 400 is positioned between the plurality of arc extinguishing units 600, 700 and the exterior of the plurality of arc extinguishing units 600, 700, respectively.

In the illustrated embodiment, the plurality of arc extinguishing units 600, 700 is respectively positioned adjacent to the plurality of fixed contacts 311.

In an embodiment, the cover magnet unit 400 may be disposed closer to the arc extinguishing unit 600, 700 than the plurality of fixed contacts 311. That is, the cover magnet unit 400 may be positioned between the fixed contact 311 and the arc extinguishing unit 600, 700 in the up-down direction.

In the illustrated embodiment, one side of the cover magnet unit 400 is coupled to the second upper cover 112, and the other side of the cover magnet unit 400 extends toward the first upper cover 111. That is, the cover magnet unit 400 extends in the front-rear direction.

In the above embodiment, an accommodating groove for accommodating the cover magnet unit 400 may be formed by recessing in the first upper cover 111.

Alternatively, the cover magnet unit 400 may be coupled to the first upper cover 111 and extend toward the second upper cover 112. That is, the cover magnet unit 400 may be coupled to any one of the first upper cover 111 and the second upper cover 112.

In the above embodiment, the accommodating groove for accommodating the cover magnet unit 400 may be formed by recessing in the second upper cover 112.

That is, the accommodating grooves for accommodating a portion and remaining portions of the cover magnet unit 400 are respectively formed in the first upper cover 111 and the second upper cover 112.

Accordingly, when the cover magnet unit 400 is coupled to the upper cover 110, the cover magnet unit 400 is not exposed to the outside. Accordingly, the cover magnet unit 400 is not damaged by the generated arc.

A plurality of the cover magnet units 400 may be provided. The plurality of cover magnet units 400 may be disposed to be spaced apart from each other. In the illustrated embodiment, four cover magnet units 400 are provided.

Each cover magnet unit 400 may be respectively disposed on the exterior of the arc extinguishing units 600, 700 disposed in parallel and between the arc extinguishing units 600, 700.

In the illustrated embodiment, the cover magnet unit 400 includes a first cover magnet 410, a second cover magnet 420, a third cover magnet 430, and a fourth cover magnet 440.

The first cover magnet 410 is positioned on the exterior of the plurality of arc extinguishing units 600, 700. In the illustrated embodiment, the plurality of arc extinguishing units 600, 700 is disposed side by side in the left-right direction.

The first cover magnet 410 is positioned on the exterior (i.e., left side) of the arc extinguishing unit 600, 700 positioned on the leftmost side among the plurality of arc extinguishing units 600, 700. The first cover magnet 410 is configured to partially cover the exterior (i.e., left side) of the arc extinguishing unit 600, 700 positioned on the leftmost side among the plurality of arc extinguishing units 600, 700.

The first cover magnet 410 may form a main magnetic field (M.M.F) with the second cover magnet 420. Also, the first cover magnet 410 may form a sub magnetic field (S.M.F) by itself.

The first cover magnet 410 includes a first surface 411 and a second surface 412.

The first surface 411 is defined as one surface facing the grid cover 630, 730 of the arc extinguishing unit 600, 700 among the surfaces of the first cover magnet 410. In the illustrated embodiment, the first surface 411 forms the upper surface of the first cover magnet 410.

The second surface 412 is defined as the other surface opposite to the grid cover 630, 730 of the arc extinguishing unit 600, 700 among the surfaces of the first cover magnet 410. In the illustrated embodiment, the second surface 412 forms the lower surface of the first cover magnet 410.

The first surface 411 and the second surface 412 are disposed to face each other. In other words, the first surface 411 and the second surface 412 are one side and the other side of the first cover magnet 410 facing each other.

The first surface 411 may be magnetized to the S pole. In addition, the second surface 412 may be magnetized to the N pole.

That is, the first surface 411 and the second surface 412 are magnetized with opposite polarities. Accordingly, a sub magnetic field (S.M.F) may be formed between the first surface 411 and the second surface 412.

The second cover magnet 420 is positioned in any one of the spaces between the plurality of arc extinguishing units 600, 700. In the illustrated embodiment, the second cover magnet 420 is positioned between the arc extinguishing unit 600, 700 positioned on the leftmost side and the arc extinguishing unit 600, 700 positioned in the center, among the plurality of arc extinguishing units 600, 700.

The second cover magnet 420 is configured to partially cover one inner side (i.e., right side) of the arc extinguishing unit 600, 700 positioned on the leftmost side and one inner side (i.e., left side) of the arc extinguishing unit 600, 700 positioned in the center, among the plurality of arc extinguishing units 600, 700.

The second cover magnet 420 may form a main magnetic field (M.M.F) with the first cover magnet 410 and the third cover magnet 430. In addition, the second cover magnet 420 may form a sub magnetic field (S.M.F) by itself.

The second cover magnet 420 includes a first surface 421 and a second surface 422.

The first surface 421 is defined as one surface facing the grid cover 630, 730 of the arc extinguishing unit 600, 700 among the surfaces of the second cover magnet 420. In the illustrated embodiment, the first surface 421 forms the upper surface of the second cover magnet 420.

The second surface 422 is defined as the other surface opposite to the grid cover 630, 730 of the arc extinguishing unit 600, 700 among the surfaces of the second cover magnet 420. In the illustrated embodiment, the second surface 422 forms the lower surface of the second cover magnet 420.

The first surface 421 and the second surface 422 are disposed to face each other. In other words, the first surface 421 and the second surface 422 are one side and the other side of the second cover magnet 420 facing each other.

The first surface 421 may be magnetized to the S pole. In addition, the second surface 422 may be magnetized to the N pole. That is, the first surface 421 and the second surface 422 are magnetized with opposite polarities. Accordingly, a sub magnetic field (S.M.F) may be formed between the first surface 421 and the second surface 422.

The third cover magnet 430 is positioned any one of the spaces between the plurality of arc extinguishing units 600, 700. Specifically, the third cover magnet 430 is positioned between the arc extinguishing unit 600, 700 positioned in the center and the arc extinguishing unit 600, 700 positioned on the rightmost side, among the plurality of arc extinguishing units 600, 700.

The third cover magnet 430 is configured to partially cover the other inner side (i.e., the right side) of the arc extinguishing unit 600, 700 positioned in the center, and an inner side (i.e., left side) of the arc extinguishing unit 600, 700 positioned on the leftmost side, among the arc extinguishing units 600, 700.

The third cover magnet 430 may form a main magnetic field (M.M.F) with the second cover magnet 420 and the fourth cover magnet 440. Also, the third cover magnet 430 may form a sub magnetic field (S.M.F) by itself.

The third cover magnet 430 includes a first surface 431 and a second surface 432.

The first surface 431 is defined as one surface facing the grid cover 630, 730 of the arc extinguishing unit 600, 700 among the surfaces of the third cover magnet 430. In the illustrated embodiment, the first surface 431 forms the upper surface of the third cover magnet 430.

The second surface 432 is defined as the other surface opposite to the grid cover 630, 730 of the arc extinguishing unit 600, 700 among the surfaces of the third cover magnet 430. In the illustrated embodiment, the second surface 432 forms the lower surface of the third cover magnet 430.

The first surface 431 and the second surface 432 are disposed to face each other. In other words, the first surface 431 and the second surface 432 are one side and the other side of the third cover magnet 430 facing each other.

The first surface 431 may be magnetized to the S pole. In addition, the second surface 432 may be magnetized to the N pole. That is, the first surface 431 and the second surface 432 are magnetized with opposite polarities. Accordingly, a sub magnetic field (S.M.F) may be formed between the first surface 431 and the second surface 432.

The fourth cover magnet 440 is positioned on the exterior (i.e., right side) of the arc extinguishing unit 600, 700 positioned on the rightmost side among the plurality of arc extinguishing units 600, 700. The fourth cover magnet 440 is configured to partially cover the exterior (i.e., right side) of the arc extinguishing unit 600, 700 positioned on the rightmost side among the plurality of arc extinguishing units 600, 700.

The fourth cover magnet 440 may form a main magnetic field (M.M.F) with the third cover magnet 430. In addition, the fourth cover magnet 440 may form a sub magnetic field (S.M.F) by itself.

The fourth cover magnet 440 includes a first surface 441 and a second surface 442.

The first surface 441 is defined as one surface facing the grid cover 630, 730 of the arc extinguishing units 600, 700 among the surfaces of the fourth cover magnet 440. In the illustrated embodiment, the first surface 441 forms the upper surface of the fourth cover magnet 440.

The second surface 442 is defined as the other surface opposite to the grid cover 630, 730 of the arc extinguishing unit 600, 700 among the surfaces of the fourth cover magnet 440. In the illustrated embodiment, the second surface 442 forms the lower surface of the fourth cover magnet 440.

The first surface 441 and the second surface 442 are disposed to face each other. In other words, the first surface 441 and the second surface 442 are one side and the other side of the fourth cover magnet 440 facing each other.

The first surface 441 may be magnetized to the S pole. In addition, the second surface 442 may be magnetized to the N pole. That is, the first surface 441 and the second surface 442 are magnetized with opposite polarities. Accordingly, a sub magnetic field (S.M.F) may be formed between the first surface 441 and the second surface 442.

The second cover magnet 420 may be formed to have a greater thickness than that of the first cover magnet 410 and the fourth cover magnet 440. As described above, the second cover magnet 420 can form a main magnetic field (M.M.F) with the first cover magnet 410 and the third cover magnet 430 to secure sufficient magnetic force.

Similarly, the third cover magnet 430 may also be formed to have a greater thickness than that of the first cover magnet 410 and the fourth cover magnet 440. As described above, the third cover magnet 430 can form a main magnetic field (M.M.F) with the second cover magnet 420 and the fourth cover magnet 440 to secure sufficient magnetic force.

In one embodiment, the third cover magnet 430 and the second cover magnet 420 may be formed to have the same thickness. Also, the first cover magnet 410 and the fourth cover magnet 440 may be formed to have the same thickness.

In this embodiment, the cover magnet unit 400 is directly coupled to the upper cover 110. Accordingly, the convenience of assembly of the air circuit breaker 10 can be improved.

In addition, as the cover magnet unit 400 according to the present embodiment is provided, the generated arc may effectively flow toward the arc extinguishing unit 600, 700. This is achieved by the main magnetic field (M.M.F) and sub magnetic field (S.M.F) formed by the cover magnet unit 400. A detailed description thereof will be provided later.

4. Description of the CT (Current Transformer) Magnet Unit 500 According to an Embodiment of the Present Disclosure With reference to FIGS. 1, 8 and 9, the air circuit breaker 10 according to an embodiment of the present disclosure includes the CT magnet unit 500.

The CT magnet unit 500 may be detachably coupled to the lower cover 120 so as to cover the opening of the lower cover 120 through which the movable contact stand 320 is partially exposed.

In addition, the CT magnet unit 500 includes a CT magnet 530 therein to form a magnetic field for forming the arc path (A.P).

A plurality of CT magnet units 500 may be provided. In the illustrated embodiment, three openings of the movable contact stand 320 and lower cover 120 are provided. Accordingly, three CT magnet units 500 may also be provided.

A space is formed inside the CT magnet unit 500. The CT magnet 530 may be accommodated in the space. When the current energized through the air circuit breaker 10 is alternating current, various components for current transformer may be mounted in the space.

Hereinafter, it will be described on the assumption that direct current is energized through the air circuit breaker 10 according to an embodiment of the present disclosure.

In the illustrated embodiment, the CT magnet unit 500 includes a case 510, a space part 520, a CT magnet 530, and a cover 540.

The case 510 forms the outer shape of the CT magnet unit 500. The case 510 is detachably coupled to the lower cover 120 and is configured to cover the opening of the lower cover 120.

The space part 520 is formed inside the case 510. The CT magnet 530 may be accommodated in the space part 520. As described above, in an embodiment in which alternating current is energized to the air circuit breaker 10, various components for current transformation may be mounted in the space part 520.

On the other hand, in the embodiment in which direct current is energized to the air circuit breaker 10, a component for current transformation is not required. Accordingly, it will be understood that the embodiment in which the CT magnet 530 is accommodated in the space part 520 is a case in which direct current is energized to the air circuit breaker 10.

An opening is formed inside the case 510. The opening communicates with the opening of the lower cover 120. Through the opening, the movable contact stand 320 may be exposed to the outside.

The space part 520 is a space formed inside the case 510. The space part 520 may be defined as a space surrounded by the outer and inner surfaces of the case 510.

The CT magnet 530 is accommodated in the space part 520. As described above, the embodiment is a case in which alternating current is energized in the air circuit breaker 10.

The space part 520 includes an opening formed open. The opening is formed on one side of the space part 520 opposite to the cover unit 100, which in the illustrated embodiment is the front side. The opening may be closed by the cover unit 540.

In the illustrated embodiment, the space part 520 surrounds the opening formed inside the case 510 and is defined as a space surrounded by the outer surface of the case 510.

A fastening member (not shown) for coupling the case 510 to the cover unit 100 may be accommodated in the space part 520. In addition, a fastening member for coupling the cover unit 540 to the case 510 may be accommodated in the space part 520.

The CT magnet 530 forms a magnetic field. By the magnetic field, an arc path (A.P), which is a path through which the arc generated in the arc extinguishing unit 600, 700 flows, may be formed.

Specifically, the CT magnet 530 forms a magnetic field in the direction from the arc extinguishing unit 600, 700 to the CT magnet 530 or a magnetic field in the direction from the CT magnet 530 to the arc extinguishing unit 600, 700.

Accordingly, the generated arc receives electromagnetic force in the direction toward both sides of the grid 720 provided in the arc extinguishing unit 600, 700. Accordingly, the arc path (A.P) is formed to face the peaks formed on both sides of the grid 720, so that the arc can effectively flow to the arc extinguishing unit 600, 700.

The CT magnet 530 may be provided in any shape capable of forming a magnetic field. In one embodiment, the CT magnet 530 may be provided as a permanent magnet or an electromagnet.

The CT magnet 530 is coupled to the case 510. Specifically, the CT magnet 530 is accommodated in the space part 520 formed inside the case 510. The CT magnet 530 is coupled to one side of the case 510 facing the cover unit 100, which in the illustrated embodiment is the rear side.

In one embodiment, the CT magnet 530 may also be coupled to a surface surrounding the opening of the case 510. In the above embodiment, the CT magnet 530 may be more stably coupled to the case 510.

In the illustrated embodiment, the CT magnet 530 is positioned above the opening of the case 510. In other words, the CT magnet 530 is positioned between the opening of the case 510 and the arc extinguishing unit 600, 700.

Alternatively, the CT magnet 530 may be positioned below the opening of the case 510. That is, the CT magnet 530 may be disposed such that the opening of the case 510 is positioned between the CT magnet 530 and the arc extinguishing unit 600, 700. In this case, since the distance between the CT magnet 530 and the arc extinguishing unit 600, 700 is increased, the magnetic force of the CT magnet 530 is preferably increased.

A fixing member (not shown) such as a screw or a frame may be provided to prevent the random separation and swinging of the coupled CT magnet 530.

The CT magnet 530 includes a first surface 531 and a second surface 532.

The first surface 531 may be defined as one surface facing the arc extinguishing unit 600, 700 among the surfaces of the CT magnet 530. In the illustrated embodiment, arc extinguishing unit 600, 700 is positioned above the CT magnet 530.

Accordingly, the first surface 531 may be defined as the upper surface of the CT magnet 530.

The second surface 532 may be defined as one side opposite to the arc extinguishing unit 600, 700 among the surfaces of the CT magnet 530. In other words, the second surface 532 may be defined as the lower surface of the CT magnet 530.

The first surface 531 and the second surface 532 are disposed to face each other. In other words, the first surface 531 and the second surface 532 are one side and the other side of the CT magnet 530 that face each other.

The first surface 531 may be magnetized to any one of the N pole and the S pole. In addition, the second surface 532 may be magnetized to the other polarity of the N pole and the S pole. That is, the first surface 531 and the second surface 532 are magnetized with opposite polarities. Accordingly, a sub magnetic field (S.M.F) may be formed between the first surface 531 and the second surface 532.

As will be described later, an extinguishing magnet 634 may be provided in the arc extinguishing unit 600 according to an embodiment of the present disclosure. In the above embodiment, a main magnetic field (M.M.F) may be formed between the first surface 531 and the first surface 633*a* of the extinguishing magnet 634.

As described above, in the embodiment in which direct current is energized to the air circuit breaker 10, a component for current transformation is not required.

Accordingly, in the present embodiment, when the direct current is energized through the air circuit breaker 10, the CT magnet unit 500 is provided with the CT magnet 530. The CT magnet 530 forms a sub magnetic field (S.M.F) by itself, and forms a main magnetic field (M.M.F) together with the extinguishing magnet 634 of the arc extinguishing unit 600.

Accordingly, the generated arc passes through the arc extinguishing unit 600 and can be effectively extinguished. A detailed description thereof will be provided later.

5. Description of the Arc Extinguishing Unit 600 According to an Embodiment of the Present Disclosure With reference to FIGS. 10 to 18, the air circuit breaker 10 according to an embodiment of the present disclosure includes the arc extinguishing unit 600.

The arc extinguishing unit 600 is configured to extinguish the arc generated by the fixed contact 311 and the movable contact 321 being spaced apart. The generated arc passes through the arc extinguishing unit 600 and may be discharged to the exterior of the air circuit breaker 10 after being extinguished and cooled.

The arc extinguishing unit 600 is coupled to the cover unit 100. One side of the arc extinguishing unit 600 for discharging the arc may be exposed to the exterior of the cover unit 100. In the illustrated embodiment, the arc extinguishing unit 600 has an upper side exposed to the exterior of the cover unit 100.

The arc extinguishing unit 600 is partially accommodated in the cover unit 100. The arc extinguishing unit 600 may be accommodated in the inner space of the cover unit 100 except for a portion exposed to the outside. In the illustrated embodiment, the arc extinguishing unit 600 is partially accommodated in the upper side of the upper cover 110.

The arrangement may be changed according to the positions of the fixed contact 311 and movable contact 321. That is, the arc extinguishing unit 600 may be positioned adjacent to the fixed contact 311 and the movable contact 321. Accordingly, the arc generated by extending along the movable contact 321 rotated away from the fixed contact 311 can be easily entered into the arc extinguishing unit 600.

A plurality of arc extinguishing units 600 may be provided. The plurality of arc extinguishing units 600 may be physically and electrically spaced apart from each other. In the illustrated embodiment, the arc extinguishing units 600 are provided with three. This is due to the three-phase current energized through the air circuit breaker 10 according to the embodiment of the present disclosure, as described above.

That is, each arc extinguishing unit 600 is positioned adjacent to each of the fixed contact 311 and the movable contact 321. In the illustrated embodiment, each arc extinguishing unit 600 is positioned adjacent to the upper side of each of the fixed contact 311 and the movable contact 321.

It will be understood that each arc extinguishing unit 600 is configured to extinguish the arc generated by blocking the current of each phase energized in each blocking unit 300.

The arc extinguishing units 600 may be disposed adjacent to each other. In the illustrated embodiment, three arc extinguishing units 600 are disposed side by side in the left-right direction of the air circuit breaker 10.

In this embodiment, the arc extinguishing unit 600 includes the extinguishing magnet 634. The extinguishing magnet 634 forms a main magnetic field (M.M.F) and a sub magnetic field (S.M.F) to form an arc path (A.P) for the generated arc to effectively flow toward the arc extinguishing unit 600. A detailed description thereof will be provided later.

In the illustrated embodiment, the arc extinguishing unit 600 includes a support plate 610, a grid 620, a grid cover 630, an arc guide 640, and an arc runner 650.

The support plate 610 forms both sides of the arc extinguishing unit 600, which in the illustrated embodiment are the right and left sides. The support plate 610 is coupled to each component of the arc extinguishing unit 600 to support the components.

Specifically, the support plate 610 is coupled to the grid 620, the grid cover 630, the arc guide 640, and the arc runner 650.

A plurality of support plates 610 is provided. The plurality of support plates 610 may be spaced apart from each other and disposed to face each other. In the illustrated embodiment, two support plates 610 are provided to form the right and left sides of the arc extinguishing unit 600, respectively.

The support plate 610 may be formed of an insulating material. This is to prevent the generated arc from flowing toward the support plate 610.

The support plate 610 may be formed of a heat-resistant material. This is to prevent damage or deformation of the shape by the generated arc.

A plurality of through-holes is formed in the support plate 610. The grid 620 and the arc runner 650 may be inserted and coupled to some of the through-holes. In addition, a fastening member for fastening the grid cover 630 and the arc guide 640 to the support plate 610 may be through-coupled to some other through-holes.

In the illustrated embodiment, the support plate 610 is provided in the form of a plate having a plurality of corners formed at the vertices. The support plate 610 forms both sides of the arc extinguishing unit 600 and may be provided in any shape capable of supporting each component of the arc extinguishing unit 600.

The support plate 610 is coupled to the grid 620. Specifically, the insertion protrusions provided on both sides of the grid 620, which are on the right and left ends in the illustrated embodiment, are inserted and coupled to some of the through-holes of the support plate 610.

The support plate 610 is coupled to the grid cover 630. Specifically, the grid cover 630 is coupled to the upper side of the support plate 610. The coupling may be achieved as a fitting coupling between the support plate 610 and the grid cover 630 or as a separate fastening member.

The support plate 610 is coupled to the arc guide 640. Specifically, the arc guide 640 is coupled to the lower side of the support plate 610, that is, to one side opposite to the grid cover 630. The coupling may be achieved by a separate fastening member.

The support plate 610 is coupled to the arc runner 650. Specifically, the arc runner 650 is coupled to the rear side of the support plate 610, that is, to one side opposite to the fixed contact 311. The coupling may be achieved by a separate fastening member.

The grid 620 induces the arc generated by the fixed contact 311 and the movable contact 321 being spaced apart to the arc extinguishing unit 600.

The induction may be achieved by the magnetic force generated by the grid 620. In addition, the induction may be achieved by the extinguishing magnet 634 provided in the arc extinguishing unit 600.

The grid 620 may be formed of a magnetic material. This is to apply an attractive force to the arc, which is a flow of electrons.

A plurality of grids 620 may be provided. A plurality of grids 620 may be stacked spaced apart from each other. In the illustrated embodiment, nine grids 620 are provided and stacked in the front-rear direction.

The number of grids 620 may be changed. Specifically, the number of grids 620 may be changed according to the size and performance of the arc extinguishing unit 600 or the rated capacity of the air circuit breaker 10 provided with the arc extinguishing unit 600.

Through the space formed by the plurality of grids 620 spaced apart from each other, the incoming arc may be subdivided and flowed. Accordingly, the pressure of the arc is increased, and the moving speed and extinguishing speed of the arc can be increased.

The arc runner 650 is positioned adjacent to the grid 620 furthest from the fixed contact 311, which in the illustrated embodiment is the grid 620 on the rear side, among the plurality of grids 620.

The grid 620 may be formed to protrude in the width direction, which in the illustrated embodiment is the direction in which the ends in the left-right direction face the fixed contact 311, that is, downward. That is, the grid 620 is formed in a peak shape in which the ends in the left-right direction face downward.

Accordingly, the generated arc effectively proceeds toward the end of the grid 620 in the left-right direction, so that it can easily flow to the arc extinguishing unit 600.

The arc guide 640 is positioned on the exterior of the ends in the left-right direction of the grid 620, which in the illustrated embodiment is the lower side.

The grid 620 is coupled to the support plate 610. Specifically, at the edge of the grid 620 in the width direction, which in the illustrated embodiment is the left-right direction, a plurality of coupling protrusions is formed in the extending direction thereof, which in the illustrated embodiment is the up-down direction. The coupling protrusion of the grid 620 is inserted and coupled to the through-hole formed in the support plate 610.

One side of the grid 620 facing the grid cover 630, which in the illustrated embodiment is the upper end, may be positioned adjacent to the grid cover 630. The arc flowing along the grid 620 may be discharged to the outside through the grid cover 630.

The grid cover 630 forms an upper side of the arc extinguishing unit 600. The grid cover 630 is configured to cover the upper end of the grid 620. The arc passing through the space formed by the plurality of grids 620 spaced apart from each other may be discharged to the exterior of the air circuit breaker 10 through the grid cover 630.

The grid cover 630 is coupled to the support plate 610. At the edge in the width direction of the grid cover 630, which in the illustrated embodiment is the left-right direction, the protrusion inserted into the through-hole of the support plate 610 may be formed. In addition, the grid cover 630 and the support plate 610 may be coupled by a separate fastening member.

The grid cover 630 is formed to extend in one direction, which in the illustrated embodiment is the front-rear direction. It will be understood that the direction is the same as the direction in which the plurality of grids 620 is stacked.

The length of the other direction of the grid cover 630, which in the illustrated embodiment is the width direction, may be determined according to the lengths of the plurality of grids 620 in the width direction.

In the illustrated embodiment, the grid cover 630 includes a cover body 631, an upper frame 632, a mesh part 633, the extinguishing magnet 634, a magnet cover 635, and a blocking plate 636.

The cover body 631 forms the outer shape of the grid cover 630. The cover body 631 is coupled to the support plate 610. In addition, the upper frame 632 is coupled to the cover body 631.

A predetermined space is formed inside the cover body 631. The space may be covered by the upper frame 632. The mesh part 633, the extinguishing magnet 634, the magnet cover 635, and the blocking plate 636 are accommodated in the space. Accordingly, the space may be referred to as "accommodating space".

The accommodating space communicates with the space formed by the grids 620 spaced apart. As a result, the accommodating space communicates with the inner space of the cover unit 100. Accordingly, the generated arc may pass through the space formed by the grids 620 spaced apart and may flow into the accommodating space of the cover body 631.

An upper end of the grid 620 may be in contact with one side of the cover body 631 facing the grid 620, which in the illustrated embodiment is the lower side. In an embodiment, the cover body 631 may support the upper end of the grid 620.

The cover body 631 may be formed of an insulating material. This is to prevent the magnetic field for forming the arc path (A.P) from being distorted.

The cover body 631 may be formed of a heat-resistant material. This is to prevent damage or deformation of the shape by the generated arc.

In the illustrated embodiment, the length of the cover body 631 in the front-rear direction is longer than the length in the left-right direction. The shape of the cover body 631 may be changed according to the shape of the support plate 610 and the shapes and number of the grids 620.

The upper frame 632 is coupled to one side of the cover body 631 opposite to the grid 620, which in the illustrated embodiment is the upper side.

The upper frame 632 is coupled to the upper side of the cover body 631. The upper frame 632 is configured to cover the accommodating space formed in the cover body 631 and the mesh part 633, extinguishing magnet 634, magnet cover 635 and blocking plate 636 accommodated in the accommodating space.

In the illustrated embodiment, the upper frame 632 is formed to have a length in the front-rear direction longer than the length in the left-right direction. The upper frame 632 may be stably coupled to the upper side of the cover body 631 to have any shape capable of covering the accommodating space and the components accommodated in the accommodating space.

A plurality of through-holes is formed in the upper frame 632. Through the through-holes, the arc passed between the grids 620 and extinguished may be discharged. In the illustrated embodiment, the through-holes are provided in three rows in the front-rear direction, three in the left-right direction, so that a total of nine are formed. The number of through-holes may be changed.

The through-holes are spaced apart from each other. A kind of rib is formed between the through-holes. The rib may press the mesh part 633, extinguishing magnet 634, magnet cover 635, and blocking plate 636 accommodated in the space of the cover body 631 from the upper side.

Accordingly, even if the arc is generated, the mesh part 633, the extinguishing magnet 634, the magnet cover 635, and the blocking plate 636 are not randomly separated from the accommodating space of the cover body 631.

The upper frame 632 may be fixedly coupled to the upper side of the cover body 631. In the illustrated embodiment, the upper frame 632 is fixedly coupled to the upper side of the cover body 631 by a fastening member.

Between the upper frame 632 and the cover body 631, that is, at the lower side of the upper frame 632, the mesh part 633, the extinguishing magnet 634, the magnet cover 635, and the blocking plate 636 are positioned in the accommodating space of the cover body 631.

In other words, the mesh part 633, the extinguishing magnet 634, the magnet cover 635, and the blocking plate 636 are stacked from the top to the bottom in the accommodating space of the cover body 631.

The mesh part 633 passes through the space formed between the grids 620 and serves to filter the impurities remaining in the extinguished arc. The extinguished arc passes through the mesh part 633 and may be discharged to the outside after the remaining impurities are removed.

That is, the mesh part 633 functions as a kind of filter.

The mesh part 633 includes a plurality of through-holes. The size of the through-hole, that is, the diameter is preferably formed smaller than the diameter of the particles of impurities remaining in the arc. In addition, the diameter of the through-hole is preferably formed large enough so that the gas included in the arc can pass.

A plurality of mesh parts 633 may be provided. The plurality of mesh parts 633 may be stacked in the up-down direction. Accordingly, the impurities remaining in the arc passing through the mesh part 633 may be effectively removed.

The mesh part 633 is accommodated in the accommodating space formed inside the cover body 631. The shape of the mesh part 633 may be determined according to the shape of the accommodating space.

The mesh part 633 is positioned below the upper frame 632. The plurality of through-holes formed in the mesh part 633 communicates with the plurality of through-holes formed in the upper frame 632. Accordingly, the arc passing through the mesh part 633 may pass through the upper frame 632 to be discharged to the outside.

The plurality of through-holes formed in the mesh part 633 communicates with the space formed by the grids 620 spaced apart. As a result, the plurality of through-holes formed in the mesh part 633 communicates with the inner space of the cover unit 100.

The extinguishing magnet 634, the magnet cover 635, and the blocking plate 636 are positioned below the mesh part 633.

The extinguishing magnet 634 forms a magnetic field that forms an electromagnetic force for the generated arc to flow toward the arc extinguishing unit 600. The extinguishing magnet 634 is accommodated in the accommodating space of the cover body 631.

The extinguishing magnet 634 is positioned below the mesh part 633. In addition, the extinguishing magnet 634 is positioned above the blocking plate 636. In an embodiment, the extinguishing magnet 634 may be seated on the blocking plate 636.

The extinguishing magnet 634 may be provided in any shape capable of forming a magnetic field. In one embodiment, the extinguishing magnet 634 may be provided as a permanent magnet or an electromagnet.

The extinguishing magnet 634 may have a predetermined size. Specifically, as will be described later, a plurality of through-holes **636*a* is formed in the blocking plate 636. The extinguishing magnet 634 is preferably formed in a size not to cover the through-hole 636*a* formed in the blocking plate 636**.

In the illustrated embodiment, the extinguishing magnet 634 is provided in a rectangular shape. The extinguishing magnet 634 is formed to be less than half the length of the blocking plate 636 in the front-rear direction. In addition, the extinguishing magnet 634 is formed to be smaller than the length in the width direction of the blocking plate 636.

The extinguishing magnet 634 may have any size and shape that does not cover the through-hole **636*a*. For example, the extinguishing magnet 634 may be formed to have the same width as the widthwise length of the blocking plate 636**.

In the illustrated embodiment, the extinguishing magnet 634 is positioned on the front side of the accommodating space of the cover body 631. In other words, the extinguishing magnet 634 is positioned to be opposite to the position where the plurality of through-holes **636*a* is formed in the accommodating space of the cover body 631**.

The extinguishing magnet 634 may be disposed at any position that may not cover the plurality of through-holes **636*a***.

The extinguishing magnet 634 is supported by the magnet cover 635. Specifically, the extinguishing magnet 634 is inserted into the second opening **635*b* formed in the magnet cover 635**.

Accordingly, the swinging of the extinguishing magnet 634 in the up-down direction is limited by the upper frame 632, the mesh part 633, and the blocking plate 636. Further, the swinging of the extinguishing magnet 634 in the front-rear direction and in the left-right direction is limited by the magnet cover 635.

The extinguishing magnet 634 includes a first surface **634*a* and a second surface 634*b***.

The first surface **634*a* forms one side of the extinguishing magnet 634 facing the mesh part 633. In other words, the first surface 634*a* forms one side of the extinguishing magnet 634 opposite to the grid 620. In the illustrated embodiment, the first surface 634*a* may be defined as the upper surface of the extinguishing magnet 634**.

The second surface **634*b* forms the other surface of the extinguishing magnet 634 facing the blocking plate 636. In other words, the second surface 634*b* forms the other surface of the extinguishing magnet 634 facing the grid 620. In the illustrated embodiment, the second surface 634*b* may be defined as a lower surface of the extinguishing magnet 634**.

The first surface **634*a* and the second surface 634*b* are disposed to face each other. In other words, the first surface 634*a* and the second surface 634*b* are one side and the other side of the extinguishing magnet 634** facing each other.

The first surface **634*a* may be magnetized to either the N pole or the S pole. In addition, the second surface 634*b* may be magnetized to the other of the N pole and the S pole. That is, the first surface 634*a* and the second surface 634*b* are magnetized with opposite polarities. Accordingly, a sub magnetic field (S.M.F) may be formed between the first surface 634*a* and the second surface 634*b***.

As described above, the CT magnet unit 500 according to an embodiment of the present disclosure includes the CT magnet 530. In the above embodiment, a main magnetic field (M.M.F) may be formed between the second surface 634*b* and the first surface 531 of the CT magnet unit 500.

A detailed description of the process in which the main magnetic field (M.M.F) and the sub magnetic field (S.M.F) are formed by the extinguishing magnet 634 will be described later.

The magnet cover 635 supports the extinguishing magnet 634 so that the extinguishing magnet 634 seated on the blocking plate 636 does not randomly swing on the blocking plate 636.

The magnet cover 635 is positioned below the mesh part 633. Also, the magnet cover 635 is positioned above the blocking plate 636. The magnet cover 635 may be seated on the blocking plate 636.

As described above, the extinguishing magnet 634 may also be seated on the blocking plate 636. That is, the magnet cover 635 may be positioned on the same plane as the extinguishing magnet 634.

The magnet cover 635 includes a plurality of openings. In the illustrated embodiment, the magnet cover 635 includes a first opening 635*a* formed on the rear side and a second opening 635*b* formed on the front side.

Any one of the first and second openings 635*a* and 635*b* of the magnet cover 635, which in the illustrated embodiment is the first opening 635*a* formed on the rear side, communicates with the through-hole 636*a* formed in the blocking plate 636. The arc passing through the through hole 636*a* may pass through the blocking plate 636 through the first opening 635*a* to flow to the mesh part 633.

The extinguishing magnet 634 is positioned in the other one of the first and second openings 635*a* and 635*b* of the magnet cover 635, which in the illustrated embodiment is the second opening 635*b* formed on the front side. Each edge of the magnet cover 635 surrounding the second opening 635*b* formed on the front side of the magnet cover 635 surrounds the extinguishing magnet 634.

The second opening 635*b* formed on the front side of the magnet cover 635 may have a shape corresponding to the shape of the extinguishing magnet 634. In the illustrated embodiment, the extinguishing magnet 634 has a rectangular cross-section extending in the front-rear direction and the left-right direction.

Accordingly, the second opening 635*b* formed on the front side of the magnet cover 635 may also be formed to have a rectangular cross-section extending in the front-rear direction and the left-right direction.

Due to the magnet cover 635, the extinguishing magnet 634 is prevented from swinging in the front-rear direction or left-right direction while seated on the blocking plate 636. At the same time, the arc that has passed through the through-hole 636*a* of the blocking plate 636 through the opening formed in the magnet cover 635 may flow to the mesh part 633.

The magnet cover 635 may be formed of a heat-resistant material. This is to prevent damage or deformation of the shape by the arc passing through the through-hole 636*a* of the blocking plate 636.

The magnet cover 635 may be formed of an insulating material. This is to prevent the magnetic field formed by the extinguishing magnet 634 from interfering or to prevent the flowing arc from being attracted by the magnet cover 635.

In one embodiment, the magnet cover 635 may be formed of a material such as reinforced plastic or acrylic.

The blocking plate 636 is positioned below the magnet cover 635.

The blocking plate 636 supports the extinguishing magnet 634 and the magnet cover 635 from the lower side. Accordingly, the extinguishing magnet 634 accommodated in the inner space of the cover body 631 is not exposed to the generated arc. Accordingly, the damage to the extinguishing magnet 634 by the arc can be prevented.

In addition, the blocking plate 636 provides a passage for the arc that has passed through the space formed between the grids 620 to flow toward the mesh part 633.

The blocking plate 636 is accommodated in the accommodating space of the cover body 631. The blocking plate 636 is positioned on the lowermost side in the accommodating space of the cover body 631.

In the illustrated embodiment, the blocking plate 636 is formed to have a rectangular cross-section in which the length in the front-rear direction is longer than the length in the left-right direction. The shape of the blocking plate 636 may be changed according to the shape of the cross-section of the accommodating space of the cover body 631.

The grid 620 is positioned below the blocking plate 636. In an embodiment, an upper end of the grid 620, that is, one end of the grid 620 facing the blocking plate 636 may contact the blocking plate 636.

The blocking plate 636 includes the through-hole 636*a*.

The through-hole 636*a* is a passage through which the arc passing through the space formed by the plurality of grids 620 spaced apart from each other flows into the accommodating space of the cover body 631. The through-hole 636*a* is formed to penetrate in the direction perpendicular to the blocking plate 636, which in the illustrated embodiment is the up-down direction.

A plurality of through-holes 636*a* may be formed. The plurality of through-holes 636*a* may be disposed to be spaced apart from each other.

The through-hole 636*a* may be biased toward one side of the blocking plate 636. In the illustrated embodiment, the through-hole 636*a* is positioned in the direction opposite to the extinguishing magnet 634, that is, on the rear side of the blocking plate 636.

The through-hole 636*a* is not blocked by the extinguishing magnet 634 and may be disposed at any position capable of communicating with the first opening 635*a* formed in the magnet cover 635. The through-hole 636*a* communicates with the first opening 635*a*.

The arc guide 640 induces the arc so that the generated arc flows towards the grid 620. By the arc guide 640, the generated arc flows toward the support plate 610 to prevent the support plate 610 from being damaged.

The arc guide 640 is positioned on one side of the support plate 610 facing the fixed contact 311 and the movable contact 321. In the illustrated embodiment, the arc guide 640 is positioned below the support plate 610.

A plurality of arc guides 640 may be provided. The plurality of arc guides 640 may be coupled to each support plate 610. In the illustrated embodiment, two arc guides 640 are provided and are respectively coupled to the respective support plates 610. The two arc guides 640 are disposed to face each other.

The arc guide 640 is coupled to the support plate 610. The coupling may be achieved by a separate fastening member.

The arc guide 640 may be formed of a heat-resistant material. This is to prevent damage and shape deformation due to the generated arc. In an embodiment, the arc guide 640 may be formed of a ceramic material.

The arc guide 640 is disposed so as to partially surround the peak portions formed at both sides of the grid 620, which in the illustrated embodiment are the ends in the left-right direction. Accordingly, the arc guided by the arc guide 640 may not be concentrated on any one portion of the grid 620.

The arc guide 640 may extend in the extending direction of the support plate 610, which in the illustrated embodiment is the front-rear direction. That is, the arc guide 640 may extend between the grid 620 positioned on the most front side and the grid 620 positioned on the rearmost side.

The arc guide 640 includes a first extension 641 and a second extension 642.

The first extension 641 is a portion at which the arc guide 640 is coupled to the support plate 610. The first extension 641 is positioned on one side of the support plate 610 facing the fixed contact stand 310, which in the illustrated embodiment is the lower side. The first extension 641 may be coupled to the support plate 610 by a fastening member.

The first extension 641 extends in the direction toward the grid 620, which in the illustrated embodiment is the upper side. In an embodiment, the first extension 641 may extend in contact with the support plate 610. In another embodiment, the first extension 641 may extend parallel to the support plate 610.

The second extension 642 extends from an end of the first extension 641.

The second extension 642 is formed to partially surround the peak portion formed at the end of the grid 620 in the left-right direction. The second extension 642 extends to form a predetermined angle with the first extension 641. In an embodiment, the second extension 642 may extend at an obtuse angle with the first extension 641.

In another embodiment, the second extension 642 may extend in parallel with the peak portion formed at the end of the grid 620 in the left-right direction.

The arc runner 650 induces the arc so that the generated arc flows towards the grid 620. By the arc guide 640, it is possible to prevent the generated arc from proceeding to one wall of the cover unit 100 beyond the grid 620. Accordingly, it is possible to prevent the cover unit 100 from being damaged by the generated arc.

The arc runner 650 is positioned on one side of the support plate 610 facing the fixed contact 311 and the movable contact 321. In the illustrated embodiment, the arc runner 650 is positioned below the support plate 610.

The arc runner 650 is positioned on the other side of the support plate 610 opposite to the fixed contact 311. Specifically, the arc runner 650 is positioned on the rear side from the lower side of the support plate 610 so as to be opposed to the fixed contact 311 positioned on the front side of the support plate 610.

The arc runner 650 is coupled to the support plate 610. The coupling may be formed by inserting the protrusions formed at the end of the arc runner 650 in the left-right direction into the through-holes formed in the support plate 610.

The arc runner 650 may be formed of a conductive material. This is to effectively induce the arc by applying an attractive force to the flowing arc. In an embodiment, the arc runner 650 may be formed of copper, iron, or an alloy including these.

The arc runner 650 extends toward the grid 620 by a predetermined length. In one embodiment, the arc runner 650 is to be disposed to cover the grid 620 positioned furthest from the fixed contact 311, which in the illustrated embodiment is the grid 620 positioned on the rearmost side, from the rear side.

Accordingly, the arc does not extend beyond the grid 620 positioned on the rearmost side, and damage to the cover unit 100 can be prevented. Also, the generated arc can be effectively induced towards the grid 620.

6. Description of the Arc Extinguishing Unit 700 According to Another Embodiment of the Present Disclosure With reference to FIGS. 19 to 30, the air circuit breaker 10 according to another embodiment of the present disclosure includes the arc extinguishing unit 700.

The arc extinguishing unit 700 is configured to extinguish the arc generated by the fixed contact 311 and the movable contact 321 being spaced apart. The generated arc passes through the arc extinguishing unit 700 and may be discharged to the exterior of the air circuit breaker 10 after being extinguished and cooled.

The arc extinguishing unit 700 is coupled to the cover unit 100. One side of the arc extinguishing unit 700 for discharging the arc may be exposed to the exterior of the cover unit 100. In the illustrated embodiment, the arc extinguishing unit 700 has an upper side exposed to the exterior of the cover unit 100.

The arc extinguishing unit 700 is partially accommodated in the cover unit 100. The arc extinguishing unit 700 may be accommodated in the inner space of the cover unit 100 except for a portion exposed to the outside. In the illustrated embodiment, the arc extinguishing unit 700 is partially accommodated in the upper side of the upper cover 110.

The arrangement may be changed according to the positions of the fixed contact 311 and the movable contact 321. That is, the arc extinguishing unit 700 may be positioned adjacent to the fixed contact 311 and the movable contact 321. Accordingly, the arc extending along the movable contact 321 rotated away from the fixed contact 311 can be easily entered into the arc extinguishing unit 700.

A plurality of arc extinguishing units 700 may be provided. The plurality of arc extinguishing units 700 may be physically and electrically spaced apart from each other. In the illustrated embodiment, three arc extinguishing units 700 are provided. This is due to the three-phase current energized through the air circuit breaker 10 according to the embodiment of the present disclosure, as described above.

That is, each arc extinguishing unit 700 is positioned adjacent to each of the fixed contact 311 and the movable contact 321. In the illustrated embodiment, each arc extinguishing unit 700 is positioned adjacent to the upper side of each of the fixed contact 311 and the movable contact 321.

It will be understood that each arc extinguishing unit 700 is configured to extinguish the arc generated by blocking the current of each phase energized in each blocking unit 300.

The arc extinguishing units 700 may be disposed adjacent to each other. In the illustrated embodiment, three arc extinguishing units 700 are disposed side by side in the left-right direction of the air circuit breaker 10.

In the present embodiment, the arc extinguishing unit 700 includes first to third extinguishing magnets 771, 772, and 773. The first to third extinguishing magnets 771, 772, and 773 form a main magnetic field (M.M.F) and a sub magnetic field (S.M.F), so that the arc path (A.P) in which the generated arc effectively flows toward the arc extinguishing unit 700 is formed. A detailed description thereof will be provided later.

In the illustrated embodiment, the arc extinguishing unit 700 includes a support plate 710, a grid 720, a grid cover 730, an arc guide 740, an arc runner 750, a magnet case 760 and an extinguishing magnet 770.

The support plate 710 forms both sides of the arc extinguishing unit 700, which in the illustrated embodiment are the right side and the left side. The support plate 710 is coupled to each component of the arc extinguishing unit 700 to support the components.

Specifically, the support plate 710 is coupled to the grid 720, the grid cover 730, the arc guide 740 and the arc runner 750. In addition, the support plate 710 is coupled to the magnet case 760.

A plurality of support plates 710 is provided. The plurality of support plates 710 may be spaced apart from each other and disposed to face each other. In the illustrated embodiment, two support plates 710 are provided to form the right and left sides of the arc extinguishing unit 700, respectively.

The support plate 710 may be formed of an insulating material. This is to prevent the generated arc from flowing toward the support plate 710.

The support plate 710 may be formed of a heat-resistant material. This is to prevent damage or deformation of the shape by the generated arc.

A plurality of through-holes is formed in the support plate 710. The grid 720 and the arc runner 750 may be inserted and coupled to some of the through-holes.

In addition, a fastening member for fastening the grid cover 730 and the arc guide 740 to the support plate 710 may be through-coupled to some other the through-holes.

Furthermore, fastening members 762*c*, 763*c* for fastening the second to third extinguishing magnets 772, 773 to the support plate 710 may be through-coupled to some other through-holes.

In the illustrated embodiment, the support plate 710 is provided in a plate shape in which a plurality of edges is formed at a vertex. The support plate 710 forms both sides of the arc extinguishing unit 700, and may be provided in any shape capable of supporting each component of the arc extinguishing unit 700.

The support plate 710 is coupled to the grid 720. Specifically, the insertion protrusions provided at both ends, which in the illustrated embodiment are the right and left ends, are inserted and coupled into some of the through-holes of the support plate 710.

The support plate 710 is coupled to the grid cover 730. Specifically, the grid cover 730 is coupled to the upper side of the support plate 710. The coupling may be achieved as fitting coupling between the support plate 710 and the grid cover 730 or as a separate fastening member.

The support plate 710 is coupled to the arc guide 740. Specifically, the arc guide 740 is coupled to the lower side of the support plate 710, that is, to one side opposite to the grid cover 730. The coupling may be achieved by a separate fastening member.

The support plate 710 is coupled to the arc runner 750. Specifically, the arc runner 750 is coupled to the rear side of the support plate 710, that is, to one side opposite to the fixed contact 311. The coupling may be achieved by a separate fastening member.

The support plate 710 is coupled to the magnet case 760. Specifically, the support plate 710 may be coupled to the second and third accommodating parts 762, 763 of the magnet case 760 by second and third fastening members 762*c*, 763*c*.

The grid 720 induces the arc generated by the fixed contact 311 and the movable contact 321 being spaced apart to the arc extinguishing unit 700.

The induction may be achieved by the magnetic force generated by the grid 720. In addition, the induction may be achieved by the extinguishing magnet 770 provided in the arc extinguishing unit 700.

The grid 720 may be formed of a magnetic material. This is to apply an attractive force to the arc, which is a flow of electrons.

A plurality of grids 720 may be provided. The plurality of grids 720 may be stacked spaced apart from each other. In the illustrated embodiment, ten grids 720 are provided and stacked in the front-rear direction.

Through a space formed by the plurality of grids 720 spaced apart from each other, the incoming arc may be subdivided and flowed. Accordingly, the pressure of the arc is increased, and the moving speed and extinguishing speed of the arc can be increased.

Among the plurality of grids 720, the arc runner 750 is positioned adjacent to the grid 720 furthest from the fixed contact 311, which in the illustrated embodiment is the grid 720 on the rear side.

The grid 720 may be formed to protrude in the width direction, which in the illustrated embodiment is the direction in which the ends in the left-right direction face the fixed contact 311, that is, downward. That is, the grid 720 is formed in a peak shape in which the ends in the left-right direction face downward.

Accordingly, the generated arc effectively proceeds toward the end of the grid 720 in the left-right direction, so that it can easily flow to the arc extinguishing unit 700.

The arc guide 740 is positioned on the exterior of the end of the grid 720 in the left-right direction, which in the illustrated embodiment is the lower side.

The grid 720 is coupled to the support plate 710. Specifically, a plurality of coupling protrusions is formed at the edges in the width direction, which in the illustrated embodiment is the left-right direction, in the extending direction thereof, which in the illustrated embodiment is the up-down direction. The coupling protrusion of the grid 720 is inserted and coupled to the through-hole formed in the support plate 710.

Some of the plurality of grids 720 are inserted and coupled to the grid coupling part 764 of the magnet case 760.

Specifically, one side of some of the plurality of grids 720, which in the illustrated embodiment is the lower side, is inserted and coupled to the grid coupling part 764 of the magnet case 760.

As described above, since the grid 720 is positioned above the fixed contact 311, it may be said that one side of the grid 720 that faces the fixed contact 311, among each side of some grids 720, is inserted into the grid coupling part 764.

A magnet case 760 accommodating the extinguishing magnet 770 for forming an arc path may be coupled to one or more of the plurality of grids 720. Specifically, the lower end of one or more of the plurality of grids 720 may be inserted and coupled to the grid coupling part 764 formed in the magnet case 760.

In the illustrated embodiment, the lower ends of the two grids 720 positioned in the center of the front-rear direction, that is, two grids 720 positioned fifth and sixth from the front side are inserted and coupled to the grid coupling part 764.

In addition, the second accommodating part 762 and the third accommodating part 763 are coupled to both sides of the two grids 720, which in the illustrated embodiment is the left-right direction.

That is, in the illustrated embodiment, the second accommodating part 762 is coupled to the left side between two grids 720 positioned in the center of the front-rear direction, that is, between two grids 720 positioned fifth and sixth from the front side. In addition, the third accommodating part 763 is coupled to the right side between the two grids 720.

One side of the grid 720 facing the grid cover 730, which in the illustrated embodiment is an upper end, may be positioned adjacent to the grid cover 730. The arc flowing along the grid 720 may pass through the grid cover 730 and be discharged to the outside.

The grid cover 730 forms the upper side of the arc extinguishing unit 700. The grid cover 730 is configured to cover the upper end of the grid 720. The arc passing through the space formed by the plurality of grids 720 spaced apart from each other may be discharged to the exterior of the air circuit breaker 10 through the grid cover 730.

The grid cover 730 is coupled to the support plate 710. A protrusion to be inserted into the through-hole of the support plate 710 may be formed at the edge of the grid cover 730 in the width direction, which in the illustrated embodiment is the left-right direction. In addition, the grid cover 730 and the support plate 710 may be coupled by a separate fastening member.

The grid cover 730 is formed to extend in one direction, which in the illustrated embodiment is the front-rear direction. It will be understood that the direction is the same as the direction in which the plurality of grids 720 is stacked.

The length in the other direction of the grid cover 730, which in the illustrated embodiment is the width direction, may be determined according to the lengths of the plurality of grids 720 in the width direction.

In the illustrated embodiment, the grid cover 730 includes a cover body 731, an upper frame 732, and a mesh part 733.

The cover body 731 forms the outer shape of the grid cover 730. The cover body 731 is coupled to the support plate 710. In addition, the upper frame 732 is coupled to the cover body 731.

A predetermined space is formed inside the cover body 731. The space may be covered by the upper frame 732. The mesh part 733 is accommodated in the space. Accordingly, the space may be referred to as "accommodating space".

The accommodating space communicates with the space formed by the grids 720 spaced apart. As a result, the accommodating space communicates with the inner space of the cover unit 100. Accordingly, the generated arc may pass through the space formed by the grids 720 spaced apart, and flow to the accommodating space of the cover body 731.

An upper end of the grid 720 may be in contact with one side of the cover body 731 facing the grid 720, which in the illustrated embodiment is the lower side. In one embodiment, the cover body 731 may support the upper end of the grid 720.

The cover body 731 may be formed of an insulating material. This is to prevent the magnetic field forming the arc path (A.P) from being distorted.

The cover body 731 may be formed of a heat-resistant material. This is to prevent damage or deformation of the shape by the generated arc.

In the illustrated embodiment, the cover body 731 is formed to have a length in the front-rear direction longer than a length in the left-right direction. The shape of the cover body 731 may be changed according to the shape of the support plate 710 and the shapes and number of the grids 720.

An upper frame 732 is coupled to one side of the cover body 731 opposite to the grid 720, which in the illustrated embodiment is the upper side.

The upper frame 732 is coupled to the upper side of the cover body 731. The upper frame 732 is configured to cover the accommodating space formed in the cover body 731 and the mesh part 733 accommodated in the accommodating space.

In the illustrated embodiment, the upper frame 732 is formed to have a length in the front-rear direction longer than the length in the left-right direction. The upper frame 732 may be stably coupled to the upper side of the cover body 731 to have any shape capable of covering the accommodating space and the components accommodated in the accommodating space.

A plurality of through-holes is formed in the upper frame 732. Through the through-holes, the arc that passes between the grids 720 and is extinguished may be discharged. In the illustrated embodiment, the through-holes are provided in three rows in the front-rear direction, three in the left-right direction, so that a total of nine are formed. The number of through-holes may be changed.

The through-holes are spaced apart from each other. A kind of rib is formed between the through-holes. The rib may press the mesh part 733 accommodated in the space of the cover body 731 from the upper side.

Accordingly, even if the arc is generated, the mesh part 733 is not randomly separated from the accommodating space of the cover body 731.

The upper frame 732 may be fixedly coupled to the upper side of the cover body 731. In the illustrated embodiment, the upper frame 732 is fixedly coupled to the upper side of the cover body 731 by a fastening member.

The mesh part 733 is positioned between the upper frame 732 and the cover body 731, that is, in the accommodating space of the cover body 731 at the lower side of the upper frame 732.

The mesh part 733 passes through the space formed between the grids 720 and serves to filter the impurities remaining in the extinguished arc. The extinguished arc passes through the mesh part 733 and may be discharged to the outside after the remaining impurities are removed.

That is, the mesh part 733 functions as a kind of filter.

The mesh part 733 includes a plurality of through-holes. The size of the through-hole, that is, the diameter is preferably formed smaller than the diameter of the particles of the impurities remaining in the arc. In addition, the diameter of the through-hole is preferably formed large enough so that the gas included in the arc can pass.

A plurality of mesh parts 733 may be provided. The plurality of mesh parts 733 may be stacked in the up-down direction. Accordingly, the impurities remaining in the arc passing through the mesh part 733 may be effectively removed.

The mesh part 733 is accommodated in the accommodating space formed inside the cover body 731. The shape of the mesh part 733 may be determined according to the shape of the accommodating space.

The mesh part 733 is positioned below the upper frame 732. The plurality of through-holes formed in the mesh part 733 communicates with the plurality of through-holes formed in the upper frame 732. Accordingly, the arc passing through the mesh part 733 may pass through the upper frame 732 to be discharged to the outside.

The plurality of through-holes formed in the mesh part 733 communicates with the space formed by the grids 720 spaced apart. As a result, the plurality of through-holes formed in the mesh part 733 communicates with the inner space of the cover unit 100.

Although not shown, a blocking plate (not shown) may be positioned below the mesh part 733. A plurality of through-holes (not shown) may be formed in the blocking plate (not shown), so that the inner space of the cover unit 100 and the mesh part 733 may communicate with each other.

The arc guide 740 induces the arc so that the generated arc flows towards the grid 720. By the arc guide 740, the generated arc flows toward the support plate 710 to prevent the support plate 710 from being damaged.

The arc guide 740 is positioned on one side of the support plate 710 facing the fixed contact 311 and the movable contact 321. In the illustrated embodiment, the arc guide 740 is positioned below the support plate 710.

A plurality of arc guides 740 may be provided. The plurality of arc guides 740 may be coupled to each support plate 710. In the illustrated embodiment, two arc guides 740 are provided, and coupled to each support plate 710, respectively. The two arc guides 740 are disposed to face each other.

The arc guide 740 is coupled to the support plate 710. The coupling may be achieved by a separate fastening member.

The arc guide 740 may be formed of a heat-resistant material. This is to prevent damage and shape deformation due to the generated arc. In an embodiment, the arc guide 740 may be formed of a ceramic material.

The arc guide 740 is disposed so as to partially surround the peak portions formed at both sides of the grid 720, which in the illustrated embodiment is the ends in the left-right direction. Accordingly, the arc guided by the arc guide 740 may not be concentrated on any one portion of the grid 720.

The arc guide 740 may extend in the extending direction of the support plate 710, which in the illustrated embodiment is the front-rear direction. That is, the arc guide 740 may extend between the grid 720 positioned on the most front side and the grid 720 positioned on the rearmost side.

The arc guide 740 includes a first extension 741 and a second extension 742.

The first extension 741 is a portion to which the arc guide 740 is coupled to the support plate 710. The first extension 741 is positioned on one side of the support plate 710 facing the fixed contact stand 310, which in the illustrated embodiment is the lower side. The first extension 741 may be coupled to the support plate 710 by a fastening member.

The first extension 741 extends in the direction toward the grid 720, which in the illustrated embodiment is the upper side. In an embodiment, the first extension 741 may be in contact with the support plate 710 and may extend. In another embodiment, the first extension 741 may extend parallel to the support plate 710.

A second extension 742 extends from an end of the first extension 741.

The second extension 742 is formed to partially surround the peak portion formed at the end of the grid 720 in the left-right direction. The second extension 742 extends at a predetermined angle with the first extension 741. In an embodiment, the second extension 742 may extend at an obtuse angle with the first extension 741.

In another embodiment, the second extension 742 may extend in parallel with the peak portion formed at the end of the grid 720 in the left-right direction.

The arc runner 750 induces the arc so that the generated arc flows towards the grid 720. By the arc guide 740, it is possible to prevent the generated arc from proceeding to one wall of the cover unit 100 beyond the grid 720. Accordingly, it is possible to prevent the cover unit 100 from being damaged by the generated arc.

The arc runner 750 is positioned on one side of the support plate 710 facing the fixed contact 311 and the movable contact 321. In the illustrated embodiment, the arc runner 750 is positioned below the support plate 710.

The arc runner 750 is positioned on the other side of the support plate 710 opposite to the fixed contact 311. Specifically, the arc runner 750 is positioned on the rear side from the lower side of the support plate 710 so as to be opposed to the fixed contact 311 positioned on the front side of the support plate 710.

The arc runner 750 is coupled to the support plate 710. The coupling may be formed by inserting a protrusion formed at an end of the arc runner 750 in the left-right direction into a through-hole formed in the support plate 710.

The arc runner 750 may be formed of a conductive material. This is to effectively induce the arc by applying an attractive force to the flowing arc. In an embodiment, the arc runner 750 may be formed of copper, iron, or an alloy including these.

The arc runner 750 extends toward the grid 720 by a predetermined length. In one embodiment, the arc runner 750 is to be disposed to cover the grid 720 positioned farthest from the fixed contact 311, which in the illustrated embodiment is the grid 720 positioned on the rearmost side from the rear side.

Accordingly, the arc does not extend beyond the grid 720 positioned on the rearmost side, and damage to the cover unit 100 can be prevented. Also, the generated arc can be effectively induced towards the grid 720.

The magnet case 760 accommodates the extinguishing magnet 770 forming a main magnetic field (M.M.F) and a sub magnetic field (S.M.F) in the arc extinguishing unit 700.

In addition, the magnet case 760 is coupled to the support plate 710 or the grid 720, so that the extinguishing magnet 770 can be stably coupled to the arc extinguishing unit 700.

The magnet case 760 extends in one direction, which in the illustrated embodiment is the left-right direction. The length in which the magnet case 760 extends may be determined according to the length in which the grid 720 extends in the width direction, that is, in the left-right direction.

In one embodiment, the magnet case 760 may extend so that one end and the other end in the extending direction are in contact with each support plate 710 facing each other. That is, the magnet case 760 extends between the respective support plates 710 facing each other.

The magnet case 760 may be formed of an insulating material. This is to prevent the main magnetic field (M.M.F) and sub magnetic field (S.M.F) formed by the extinguishing magnet 770 from receiving magnetic interference.

The magnet case 760 may be formed of a heat-resistant material. This is to prevent the magnet case 760 from being damaged by the arc of high temperature and high pressure.

In one embodiment, the magnet case 760 may be formed of synthetic resin or reinforced plastic.

In the illustrated embodiment, the magnet case 760 includes a first accommodating part 761, a second accommodating part 762, a third accommodating part 763, a grid coupling part 764, and an arc inlet 765.

The first accommodating part 761 accommodates the first extinguishing magnet 771 of the extinguishing magnet 770.

The first accommodating part 761 forms one side of the magnet case 760, which in the illustrated embodiment is the lower side. In other words, the first accommodating part 761 is formed on one side of the magnet case 760 facing the fixed contact 311.

The first accommodating part 761 is formed to protrude in the direction away from the grid 720, which in the illustrated embodiment is downward. The protrusion length of the first accommodating part 761 may be determined according to the position of the lower end of the support plate 710. That is, the lower end of the first accommodating part 761 may be positioned to be more spaced apart from the fixed contact 311 than the lower end of the support plate 710.

The first accommodating part 761 may be positioned on a central portion in the direction in which the magnet case 760 is extended, which in the illustrated embodiment is the left-right direction. In other words, the first accommodating part 761 may be positioned between the second accommodating part 762 and the third accommodating part 763.

The first accommodating part 761 may be positioned below the grid 720. Specifically, the first accommodating part 761 is positioned on one side of the grid 720 facing the fixed contact 311, which in the illustrated embodiment is the lower side.

The grid coupling part 764 is formed on one side of the first accommodating part 761 facing the grid 720, which in the illustrated embodiment is the upper side. In addition, the arc inlet 765 is formed on both sides of the first accommodating part 761, which in the illustrated embodiment are the right and left sides.

The first accommodating part 761 includes a first accommodating groove 761*a*, a first fastening hole 761*b*, a first fastening member 761*c*, and a cover 761*d*.

The first accommodating groove 761*a* is a space in which the first extinguishing magnet 771 of the extinguishing magnet 770 is accommodated. The first accommodating groove 761*a* is recessed in one side of the first accommodating part 761 opposite to the arc runner 750, which in the illustrated embodiment is the front side.

The first accommodating groove 761*a* may be formed at any position capable of accommodating the first extinguishing magnet 771. For example, the first accommodating groove 761*a* may be formed at any position, such as a rear side or a lower side of the first accommodating part 761, where it can be recessed to form a space.

An opening is formed in the one side of the first accommodating groove 761*a*, which in the illustrated embodiment is the front side. The first extinguishing magnet 771 may be accommodated in the first accommodating groove 761*a* through the opening.

As described above, the first accommodating groove 761*a* may be formed at another position of the first accommodating part 761. Also in this case, an opening may be formed on the exterior of the first accommodating groove 761*a* to function as a passage through which the first extinguishing magnet 771 is accommodated in the first accommodating groove 761*a*. In the illustrated embodiment, the first accommodating groove 761*a* is formed to have a rectangular cross-section. The shape of the first accommodating groove 761*a* may be changed according to the shape of the first extinguishing magnet 771.

After the first extinguishing magnet 771 is accommodated in the first accommodating groove 761*a*, the first accommodating groove 761*a* may be covered by the cover 761*d*. Accordingly, the swinging and random separation of the first extinguishing magnet 771 accommodated in the first accommodating groove 761*a* may be prevented.

The first fastening hole 761*b* is a space into which the first fastening member 761*c* for fixing the cover 761*d* to the first accommodating part 761 is inserted. The first fastening hole 761*b* is formed by recessing in the first accommodating part 761. In an embodiment, the first fastening hole 761*b* may be formed through the first accommodating part 761.

The first fastening hole 761*b* is positioned adjacent to the first accommodating groove 761*a*. In the illustrated embodiment, two first fastening holes 761*b* are formed, and each of the first fastening holes 761*b* is positioned on the right and left sides of the first accommodating groove 761*a*, respectively.

The number and positions of the first fastening holes 761*b* may be changed according to the number and positions of the fastening holes formed in the cover 761*d*.

The first fastening member 761*c* fastens the first accommodating part 761 and the cover 761*d*.

The first fastening member 761*c* is coupled through the cover 761*d*. In addition, the first fastening member 761*c* is inserted or through-coupled to the first accommodating part 761. Accordingly, the first accommodating part 761 and the cover 761*d* may be stably coupled.

The first fastening member 761*c* may be provided in any shape capable of fastening two or more members. In one embodiment, the first fastening member 761*c* may be provided as a screw member or a rivet member.

A plurality of first fastening members 761*c* may be provided. In the illustrated embodiment, two first fastening members 761*c* are provided. The number of first fastening members 761*c* may be determined according to the number of first fastening holes 761*b* of the first accommodating part 761 and the number of through-holes formed in the cover 761*d*.

The cover 761*d* is coupled to the first accommodating part 761. After the first extinguishing magnet 771 is accommodated in the first accommodating groove 761*a*, the cover 761*d* may cover the first accommodating groove 761*a*. Accordingly, any swinging and separation of the first extinguishing magnet 771 may be prevented.

The cover 761*d* may be formed in a shape corresponding to the first accommodating part 761. In an embodiment, the cover 761*d* may be formed to have the same shape as a cross-section of the first accommodating part 761.

In the illustrated embodiment, the cross-section of the first accommodating part 761 and the cross-section of the cover 761*d* have a trapezoidal shape in which the upper and lower edges are the bottom and upper surfaces, but the shape may be changed.

A through-hole is formed in the cover 761*d*. The first fastening member 761*c* is through-coupled to the through-hole. Accordingly, the cover 761*d* and the first accommodating part 761 may be stably coupled.

A plurality of through-holes may be formed. The plurality of through-holes may be disposed to be spaced apart from each other. In the illustrated embodiment, two through-holes are formed and are respectively disposed to be spaced apart from each other in the left-right direction of the cover 761*d*.

The number and position of the through-holes may be changed according to the number and position of the first fastening holes 761*b* of the first accommodating part 761.

One side of the first accommodating part 761, which in the illustrated embodiment is the left side, the second accommodating part 762 is positioned. The first accommodating part 761 and the second accommodating part 762 are continuous.

The second accommodating part 762 accommodates the second extinguishing magnet 772 of the extinguishing magnet 770.

The second accommodating part 762 forms the other side of the magnet case 760, which in the illustrated embodiment is the left side. In other words, the second accommodating part 762 is positioned adjacent to any one of the support plates 710 facing each other, which in the illustrated embodiment is the support plate 710 positioned on the left side.

The second accommodating part 762 is positioned on one side of the first accommodating part 761, which in the illustrated embodiment is the left side. The second accommodating part 762 extends in the direction away from the first accommodating part 761.

In other words, the second receiving part 762 extends toward the left edge of the support plate 710 or the grid 720. The end of the second accommodating part 762 may be in contact with the support plate 710.

The second accommodating part 762 is disposed to face the third accommodating part 763 with the first accommodating part 761 interposed therebetween. In an embodiment, the second accommodating part 762 and the third accommodating part 763 may be formed to be symmetrical to each other.

The second accommodating part 762 may be positioned on one side of the grid 720. Specifically, the second accommodating part 762 is positioned on one side of the grid 720 facing the support plate 710 positioned on the left side, among the support plates 710, that is, on the left side in the illustrated embodiment.

The grid coupling part 764 is formed between the second accommodating part 762 and the third accommodating part 763. In addition, the arc inlet 765 is formed between the second accommodating part 762 and the third accommodating part 763.

The second accommodating part 762 includes a second accommodating groove 762*a*, a second fastening hole 762*b*, and a second fastening member 762*c*.

The second accommodating groove 762*a* is a space in which the second extinguishing magnet 772 of the extinguishing magnet 770 is accommodated. The second accommodating groove 762*a* is formed by recessing in the surface of the end of the second accommodating part 762, which in the illustrated embodiment is the left surface.

In other words, the second accommodating groove 762*a* is formed by recessing in one side of the second accommodating part 762 facing the support plate 710, which in the illustrated embodiment is the left side.

An opening is formed on the one side of the second accommodating groove 762*a*, which in the illustrated embodiment is the left side. The second extinguishing magnet 772 may be accommodated in the second accommodating groove 762*a* through the opening.

In the illustrated embodiment, the second accommodating groove 762*a* is formed to have a rectangular cross-section. The shape of the second accommodating groove 762*a* may be changed according to the shape of the second extinguishing magnet 772.

After the second extinguishing magnet 772 is accommodated in the second accommodating groove 762*a*, the second accommodating groove 762*a* may be covered by the support plate 710. Accordingly, the swinging and random separation of the second extinguishing magnet 772 accommodated in the second accommodating groove 762*a* may be prevented.

The second fastening hole 762*b* is a space into which the second fastening member 762*c* for fixing the support plate 710 to the second accommodating part 762 is inserted. The second fastening hole 762*b* is formed by recessing in the second accommodating part 762. In an embodiment, the second fastening hole 762*b* may be formed through the second accommodating part 762.

The second fastening hole 762*b* is positioned adjacent to the second accommodating groove 762*a*. In the illustrated embodiment, two second fastening holes 762*b* are formed, so that each of the second fastening holes 762*b* is positioned above and below the second accommodating groove 762*a*, respectively.

The number and positions of the second fastening holes 762*b* may be changed according to the number and positions of the fastening holes formed in the support plate 710.

The second fastening member 762*c* fastens the second accommodating part 762 and the support plate 710.

The second fastening member 762*c* is through-coupled to the support plate 710. In addition, the second fastening member 762*c* is inserted or through-coupled to the second accommodating part 762. Accordingly, the second accommodating part 762 and the support plate 710 may be stably coupled.

The second fastening member 762*c* may be provided in any shape capable of fastening two or more members. In an embodiment, the second fastening member 762*c* may be provided as a screw member or a rivet member.

A plurality of second fastening members 762*c* may be provided. In the illustrated embodiment, two second fastening members 762*c* are provided. The number of the second fastening members 762*c* may be determined according to the number of second fastening holes 762*b* of the second accommodating part 762 and the number of through-holes formed in the support plate 710.

The third accommodating part 763 accommodates the third extinguishing magnet 773 of the extinguishing magnet 770.

The third accommodating part 763 forms the other side of the magnet case 760, which in the illustrated embodiment is the right side. In other words, the third accommodating part 763 is positioned adjacent to the other one of the support plates 710 facing each other, which in the illustrated embodiment is the support plate 710 positioned on the right side.

The third accommodating part 763 is positioned on the other side of the first accommodating part 761, which in the illustrated embodiment is the right side. The third accommodating part 763 extends in the direction away from the first accommodating part 761.

In other words, the third accommodating part 763 extends toward the right edge of the support plate 710 or the grid 720. The end of the third accommodating part 763 may be in contact with the support plate 710.

The third accommodating part 763 is disposed to face the second accommodating part 762 with the first accommodating part 761 interposed therebetween. In an embodiment, the third accommodating part 763 and the second accommodating part 762 may be formed to be symmetrical to each other.

The third accommodating part 763 may be positioned on one side of the grid 720. Specifically, the third accommodating part 763 is positioned on one side of the grid 720 facing the support plate 710 positioned on the right side, which in the illustrated embodiment is the right side, among the support plates 710.

The grid coupling part 764 is formed between the third accommodating part 763 and the second accommodating part 762. In addition, the arc inlet 765 is formed between the third accommodating part 763 and the second accommodating part 762.

The third accommodating part 763 includes a third accommodating groove 763*a*, a third fastening hole 763*b*, and a third fastening member 763*c*.

The third accommodating groove 763*a* is a space in which the third extinguishing magnet 773 of the extinguishing magnet 770 is accommodated. The third accommodating groove 763*a* is formed by recessing in the surface of the end of the third accommodating part 763, which in the illustrated embodiment is the right side.

In other words, the third accommodating groove 763*a* is formed by recessing in one side of the third accommodating part 763 facing the support plate 710, which in the illustrated embodiment is the right side.

An opening is formed on one side of the third accommodating groove 763*a*, which in the illustrated embodiment is the right side. The third extinguishing magnet 773 may be accommodated in the third accommodating groove 763*a* through the opening.

In the illustrated embodiment, the third accommodating groove 763*a* is formed to have a rectangular cross-section. The shape of the third accommodating groove 763*a* may be changed according to the shape of the third extinguishing magnet 773.

After the third extinguishing magnet 773 is accommodated in the third accommodating groove 763*a*, the third accommodating groove 763*a* may be covered by the support plate 710. Accordingly, the swinging and random separation of the third extinguishing magnet 773 accommodated in the third accommodating groove 763*a* may be prevented.

The third fastening hole 763*b* is a space into which the third fastening member 763*c* for fixing the support plate 710 to the third accommodating part 763 is inserted. The third fastening hole 763*b* is formed by recessing in the third accommodating part 763. In an embodiment, the third fastening hole 763*b* may be formed through the third accommodating part 763.

The third fastening hole 763*b* is positioned adjacent to the third accommodating groove 763*a*. In the illustrated embodiment, two third fastening holes 763*b* are formed, and each of the third fastening holes 763*b* is positioned above and below the third accommodating groove 763*a*, respectively.

The number and positions of the third fastening holes 763*b* may be changed according to the number and positions of the fastening holes formed in the support plate 710.

The third fastening member 763*c* fastens the third accommodating part 763 and the support plate 710.

The third fastening member 763*c* is through-coupled to the support plate 710. In addition, the third fastening member 763*c* is inserted or through-coupled to the third accommodating part 763. Accordingly, the third accommodating part 763 and the support plate 710 may be stably coupled.

The third fastening member 763*c* may be provided in any shape capable of fastening two or more members. In an embodiment, the third fastening member 763*c* may be provided as a screw member or a rivet member.

A plurality of third fastening members 763*c* may be provided. In the illustrated embodiment, two third fastening members 763*c* are provided. The number of the third fastening members 763*c* may be determined according to the number of third fastening holes 763*b* of the third accommodating part 763 and the number of through-holes formed in the support plate 710.

The first accommodating part 761, the second accommodating part 762, and the third accommodating part 763 may be positioned on a predetermined height based on the up-down direction, respectively.

Specifically, the first accommodating part 761 may be positioned relatively lower than the second accommodating part 762 and the third accommodating part 763.

That is, the distance between the first accommodating part 761 and the grid cover 730 may be formed longer than the distance between the second accommodating part 762 and the grid cover 730 or the distance between the third accommodating part 763 and the grid cover 730. In an embodiment, the distance may be a shortest distance, that is, a vertical distance.

In other words, the distance between the first accommodating part 761 and the fixed contact 311 may be shorter than the distance between the second accommodating part 762 and the fixed contact 311 or the distance between the third accommodating part 763 and the fixed contact 311. In an embodiment, the distance may be the shortest distance, that is, the vertical distance.

Also, the second accommodating part 762 and the third accommodating part 763 may be positioned on the same height in the up-down direction.

That is, the distance between the second accommodating part 762 and the grid cover 730 may be formed to be equal to the distance between the third accommodating part 763 and the grid cover 730. In an embodiment, the distance may be the shortest distance, that is, the vertical distance.

In other words, the distance between the second accommodating part 762 and the fixed contact 311 may be formed to be equal to the distance between the third accommodating part 763 and the fixed contact 311. In an embodiment, the distance may be the shortest distance, that is, the vertical distance.

Accordingly, the arc generated and extended from the fixed contact 311 may be induced to the arc extinguishing unit 700 by the magnetic field formed by the first extinguishing magnet 771 accommodated in the first accommodating part 761.

In addition, the induced arc is induced by the magnetic field formed by the second extinguishing magnet 772 and the third extinguishing magnet 773 accommodated in the second accommodating part 762 and the third accommodating part 763, respectively, so that the arc passes through the grid 720 and can be extinguished.

The grid coupling part 764 is a portion in which the magnet case 760 is coupled to the grid 720. Specifically, the grid 720 is inserted and coupled to the grid coupling part 764.

The grid coupling part 764 is formed by recessing in the other side of the magnet case 760. Specifically, the grid coupling part 764 is formed by recessing in the other side opposite to one side of the magnet case 760 in which the first accommodating part 761 is formed, which in the illustrated embodiment is the upper side.

The grid coupling part 764 is formed by recessing by a predetermined length. The grid coupling part 764 is preferably recessed sufficiently deep enough to partially accommodate the lower side of the grid 720.

The grid coupling part 764 extends between the second accommodating part 762 and the third accommodating part 763. In the illustrated embodiment, the grid coupling part 764 is formed to extend in the left-right direction. It will be understood that the direction in which the grid coupling part 764 extends is the same as the direction in which the grid 720 extends between the respective support plates 710.

The grid coupling part 764 extends by a predetermined length. In the illustrated embodiment, the left end of the grid coupling part 764 is positioned adjacent to the left end of the arc inlet 765 formed on the left side in the left-right direction. In addition, the right end of the grid coupling part 764 is positioned adjacent to the right end of the arc inlet 765 formed on the right side in the left-right direction.

The extended length of the grid coupling part 764 is preferably formed to be a length in which one side of the grid 720 facing the fixed contact 311, which in the illustrated embodiment is the lower side, can be partially accommodated.

A step may be formed inside the grid coupling part 764. In the illustrated embodiment, each end in the left-right direction, which is the direction in which the grid coupling part 764 extends, is recessed to have a shorter length than the length of the rest. In an embodiment, each end of the grid coupling part 764 may be formed through the magnet case 760 in the up-down direction.

Accordingly, the end of the grid 720 in the left-right direction to be inserted into the grid coupling part 764 may be through-coupled to the grid coupling part 764.

In this case, the grid 720 coupled to the grid coupling part 764 may have a different shape from the shapes of other grids 720 not coupled to the grid coupling part 764.

For example, the length of the grid 720 coupled to the grid coupling part 764, that is, the length in the up-down direction, may be shorter than the length of other grids 720 not coupled to the grid coupling part 764.

In addition, the width of the end of the grid 720 coupled to the grid coupling part 764, that is, the length in the left-right direction may be formed to be shorter than the width of the end of the other grid 720 not coupled to the grid coupling part 764.

In this case, the width of the portion in which the grid 720 coupled to the grid coupling part 764 is coupled to the support plate 710 may be formed to be the same as the width of the portion in which the other grid 720 not coupled to the grid coupling part 764 is coupled to the support plate 710.

That is, when the grid 720 coupled with the magnet case 760 has the same shape as the other grid 720 not coupled with the magnet case 760, the structure of the arc extinguishing unit 700 should be excessively changed to include the magnet case 760.

Accordingly, the arc extinguishing unit 700 according to the present embodiment may minimize the structural change of the arc extinguishing unit 700 by changing the shape of some grids 720 coupled to the magnet case 760.

The step formed inside the grid coupling part 764 may be determined according to the shape of the lower end of the grid 720 inserted and coupled to the grid coupling part 764.

A plurality of grid coupling parts 764 may be provided. The plurality of grid coupling parts 764 may be formed to be spaced apart from each other.

In the illustrated embodiment, the grid coupling part 764 is formed of two including a first grid coupling part 764*a* positioned in the direction toward the fixed contact 311, that is, the front side, and a second grid coupling part 764*b* positioned in the direction toward the arc runner 750, that is, the rear side.

Each of the grid coupling parts 764*a*, 764*b* is formed to be spaced apart from each other on one side of the magnet case 760 facing the grid 720, which in the illustrated embodiment is the upper surface in the front-rear direction.

The lower sides of different grids 720 may be inserted into the respective grid coupling parts 764. In the illustrated embodiment, the grid 720 disposed fifth from the front side is inserted and coupled to the first grid coupling part 764*a* positioned on the front side. In addition, the grid 720 disposed adjacent to the rear side of the grid 720 is inserted and coupled to the second grid coupling part 764*b* positioned on the rear side.

It will be understood that the grid 720 inserted and coupled to the second grid coupling part 764*b* is the grid 720 disposed sixth from the front side.

The arc inlet 765 forms a passage through which the arc flowing through the arc extinguishing unit 700 flows toward the grid 720.

Specifically, the arc path (A.P) is formed by the main magnetic field (M.M.F) and the sub magnetic field (S.M.F) formed by the extinguishing magnet 770 accommodated in the magnet case 760. Accordingly, the arc path (A.P) flows towards the grid 720.

In this case, each end of the grid 720 in the width direction, which in the illustrated embodiment is the left-right direction, is formed in a peak shape. Accordingly, the flowed arc may proceed toward both ends of the grid 720.

However, as described above, the magnet case 760 is inserted and coupled to some of the plurality of grids 720. Accordingly, the flowing arc may proceed toward both ends of the grid 720 in which the magnetic case 760 is inserted.

Accordingly, the arc inlet 765 functions as a passage through which the incoming arc can flow toward the other grid 720 adjacent to the grid 720 inserted into the magnet case 760.

That is, in the illustrated embodiment, the arc inlet 765 may induce the incoming arc to flow toward another grid 720 positioned adjacent to the front side or rear side of the grid 720 inserted into the magnet case 760.

The arc inlet 765 is formed by recessing in one side of the magnet case 760 facing the fixed contact 311, which in the illustrated embodiment is the lower side. In an embodiment, the arc inlet 765 may be formed by recessing in one surface passing through the lower end of the first accommodating part 761.

The arc inlet 765 may extend by a predetermined length. In the illustrated embodiment, the arc inlet 765 includes a first portion extending inclinedly upward and a second portion communicating with the first portion and extending vertically upward.

The extending length of the arc inlet 765 may be formed to be sufficient for the flowing arc to flow toward the adjacent grid 720.

A plurality of arc inlets 765 may be formed. The plurality of arc inlets 765 may be disposed on both sides of the first accommodating part 761. In an embodiment, the plurality of arc inlets 765 may be disposed to surround both sides of the first accommodating part 761.

In the illustrated embodiment, the arc inlet 765 is formed to surround the first accommodating part 761 in both directions in which the magnet case 760 extends, that is, the right and left sides.

Accordingly, the arc flowing to the grid 720 to which the magnet case 760 is coupled, among the plurality of grids 720, may flow to the adjacent grid 720 through the arc inlet 765.

Accordingly, the generated arc is effectively extinguished and can pass through the arc extinguishing unit 700.

The extinguishing magnet 770 forms a magnetic field for forming the arc path (A.P). The arc flowing in the magnetic field formed by the extinguishing magnet 770 receives an electromagnetic force defined as Lorentz force. Accordingly, the arc path (A.P) is formed so that the generated arc is directed in a predetermined direction.

The extinguishing magnet 770 is accommodated in the magnet case 760. That is, the extinguishing magnet 770 is not exposed to the outside. Accordingly, the extinguishing magnet 770 is not damaged by the generated arc and dust included in the arc.

The extinguishing magnet 770 may be provided in any shape capable of forming a magnetic field. In an embodiment, the extinguishing magnet 770 may be provided as a permanent magnet or an electromagnet.

A plurality of extinguishing magnets 770 may be provided. The plurality of extinguishing magnets 770 may form a main magnetic field (M.M.F), which is a magnetic field formed between each other. In addition, the plurality of extinguishing magnets 770 may form a sub magnetic field (S.M.F), which is a magnetic field formed by each extinguishing magnet 770.

In the illustrated embodiment, the extinguishing magnet 770 includes three extinguishing magnets including a first extinguishing magnet 771, a second extinguishing magnet 772, and a third extinguishing magnet 773. The number of extinguishing magnets 770 may be changed.

The first extinguishing magnet 771 forms a magnetic field for forming the arc path (A.P).

The first extinguishing magnet 771 may form a sub magnetic field (S.M.F) by itself. Also, the first extinguishing magnet 771 may form the main magnetic field (M.M.F) together with the second extinguishing magnet 772 and the third extinguishing magnet 773.

The first extinguishing magnet 771 may be formed to have a predetermined shape. In the illustrated embodiment, the first extinguishing magnet 771 is formed to have a cross-section of a rectangle in which the length in the left-right direction is longer than the length in the up-down direction.

The shape of the first extinguishing magnet 771 may be any shape that can be accommodated in the first accommodating groove 761*a* and sealed by the cover 761*d*. That is, the shape of the first extinguishing magnet 771 may be determined according to the shape of the first accommodating groove 761*a*.

Accordingly, the first extinguishing magnet 771 is not exposed to the outside. As a result, the first extinguishing magnet 771 is not damaged by the generated arc.

The first extinguishing magnet 771 includes a first surface 771*a* and a second surface 771*b*.

The first surface 771*a* forms one side of the first extinguishing magnet 771 facing the grid 720. In other words, the first surface 771*a* forms one side of the first extinguishing magnet 771 opposite to the fixed contact 311. In the illustrated embodiment, the first surface 771*a* may be defined as an upper surface of the first extinguishing magnet 771.

The second surface 771*b* forms the other surface of the first extinguishing magnet 771 facing the fixed contact 331. In other words, the second surface 771*b* forms the other surface of the first extinguishing magnet 771 opposite to the grid 720. In the illustrated embodiment, the second surface 771*b* may be defined as a lower surface of the first extinguishing magnet 771.

The first surface 771*a* and the second surface 771*b* are disposed to face each other. That is, the first surface 771*a* and the second surface 771*b* are one side and the other side of the first extinguishing magnet 771 facing each other.

The first surface 771*a* may be magnetized to any one of the N pole and the S pole. In addition, the second surface 771*b* may be magnetized to the other polarity of the N pole and the S pole. That is, the first surface 771*a* and the second surface 771*b* are magnetized with opposite polarities. Accordingly, a sub magnetic field (S.M.F) may be formed between the first surface 771*a* and the second surface 771*b*.

The second extinguishing magnet 772 forms a magnetic field for forming the arc path (A.P).

The second extinguishing magnet 772 may form a sub magnetic field (S.M.F) by itself. In addition, the second extinguishing magnet 772 may form a main magnetic field (M.M.F) together with the first extinguishing magnet 771 and the third extinguishing magnet 773.

The second extinguishing magnet 772 may be formed to have a predetermined shape. In the illustrated embodiment, the second extinguishing magnet 772 is formed to have a rectangular cross-section in which the length in the front-rear direction is longer than the length in the up-down direction.

The shape of the second extinguishing magnet 772 may be any shape that can be accommodated in the second accommodating groove 762*a* and sealed by the support plate 710. That is, the shape of the second extinguishing magnet 772 may be determined according to the shape of the second accommodating groove 762*a*.

Accordingly, the second extinguishing magnet 772 is not exposed to the outside. As a result, the second extinguishing magnet 772 is not damaged by the generated arc.

The second extinguishing magnet 772 includes a first surface 772*a* and a second surface 772*b*.

The first surface 772*a* forms one side of the second extinguishing magnet 772 facing the support plate 710. In other words, the first surface 772*a* forms one side of the second extinguishing magnet 772 opposite to the grid 720. In the illustrated embodiment, the first surface 772*a* may be defined as the left or outer surface of the second extinguishing magnet 772.

The second surface 772*b* forms the other surface of the second extinguishing magnet 772 facing the grid 720. In other words, the second surface 772*b* forms the other surface of the second extinguishing magnet 772 opposite to the support plate 710. In the illustrated embodiment, the second surface 772*b* may be defined as the right or inner surface of the second extinguishing magnet 772.

The first surface 772*a* and the second surface 772*b* are disposed to face each other. In other words, the first surface 772*a* and the second surface 772*b* are one side and the other side of the second extinguishing magnet 772 facing each other.

The first surface 772*a* may be magnetized to any one of the N pole and the S pole. In addition, the second surface 772*b* may be magnetized to the other polarity of the N pole or the S pole. That is, the first surface 772*a* and the second surface 772*b* are magnetized with opposite polarities. Accordingly, a sub magnetic field (S.M.F) may be formed between the first surface 772*a* and the second surface 772*b*.

The third extinguishing magnet 773 forms a magnetic field for forming the arc path (A.P).

The third extinguishing magnet 773 may form a sub magnetic field (S.M.F) by itself. In addition, the third extinguishing magnet 773 may form the main magnetic field (M.M.F) together with the first extinguishing magnet 771 and the second extinguishing magnet 772.

The third extinguishing magnet 773 may be provided in any shape capable of forming a magnetic field. In an embodiment, the third extinguishing magnet 773 may be provided as a permanent magnet or an electromagnet.

The third extinguishing magnet 773 may be formed to have a predetermined shape. In the illustrated embodiment, the third extinguishing magnet 773 is formed to have a rectangular cross-section in which the length in the left-right direction is longer than the length in the up-down direction.

The shape of the third extinguishing magnet 773 may be any shape that can be accommodated in the third accommodating groove 763*a* and sealed by the support plate 710. That is, the shape of the third extinguishing magnet 773 may be determined according to the shape of the third accommodating groove 763*a*.

The third extinguishing magnet 773 includes a first surface 773*a* and a second surface 773*b*.

The first surface 773*a* forms one side of the third extinguishing magnet 773 facing the support plate 710. In other words, the first surface 773*a* forms one side of the third extinguishing magnet 773 opposite to the grid 720. In the illustrated embodiment, the first surface 773*a* may be defined as the right or outer surface of the third extinguishing magnet 773.

The second surface 773*b* forms the other surface of the third extinguishing magnet 773 facing the grid 720. In other words, the second surface 773*b* forms the other surface of the third extinguishing magnet 773 opposite to the support plate 710. In the illustrated embodiment, the second surface 773*b* may be defined as the left or inner surface of the third extinguishing magnet 773.

The first surface 773*a* and the second surface 773*b* are disposed to face each other. In other words, the first surface 773*a* and the second surface 773*b* are one side and the other side of the third extinguishing magnet 773 facing each other.

In addition, the second surface 773*b* is disposed to face the second surface 772*b* of the second extinguishing magnet 772.

The first surface 773*a* may be magnetized to any one of the N pole and the S pole. In addition, the second surface 773*b* may be magnetized to the other polarity of the N pole and the S pole. That is, the first surface 773*a* and the second surface 773*b* are magnetized with opposite polarities. Accordingly, a sub magnetic field (S.M.F) may be formed between the first surface 773*a* and the second surface 773*b*.

A detailed description of a process in which the main magnetic field (M.M.F) and the sub magnetic field (S.M.F) are formed by each of the extinguishing magnets 771, 772, and 773 will be described later.

7. Description of the Path (A.P) of the Arc Generated in the Air Circuit Breaker 10 According to Each Embodiment of the Present Disclosure As described above, the air circuit breaker 10 according to an embodiment of the present disclosure includes the fixed contact 311 and the movable contact 321. When the fixed contact 311 and the movable contact 321 are spaced apart, the arc is generated by the current being energized.

The air circuit breaker 10 according to an embodiment of the present disclosure includes various components for forming the arc path (AP) in which the generated arc flows toward the arc extinguishing unit 600, 700.

Hereinafter, with reference to FIGS. 31 to 44, a process in which the arc path (A.P) is formed in the air circuit breaker 10 according to an embodiment of the present disclosure will be described in detail.

Various embodiments described below may form the arc path (A.P) independently, or two or more embodiments may be combined to form the arc path (A.P).

In the following description, the portion marked with "⊙" means the flow in the direction in which the current flows out of the paper. The portion marked with "⊗" means the flow in the direction in which the current enters the paper.

It will be understood that the portion marked with the symbol is a portion in which the fixed contact 311 and the movable contact 321 are in contact, and the air circuit breaker 10 is energized with an external power source or load.

(1) Description of the Process in which the Arc Path (A.P) is Formed by the Cover Magnet Unit 400 According to the Embodiment of the Present Disclosure A process in which the arc path (A.P) is formed by the cover magnet unit 400 according to an embodiment of the present disclosure will be described in detail with reference to FIGS. 31 to 32.

Figure 31:
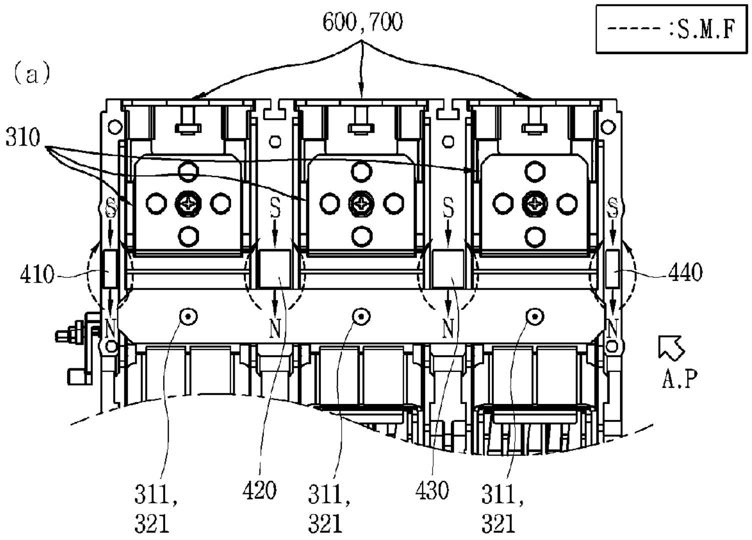
FIG. 31 is a front view illustrating an example of a magnetic field formed in a frame according to an embodiment of the present disclosure and an arc path formed accordingly.
Figure 31:
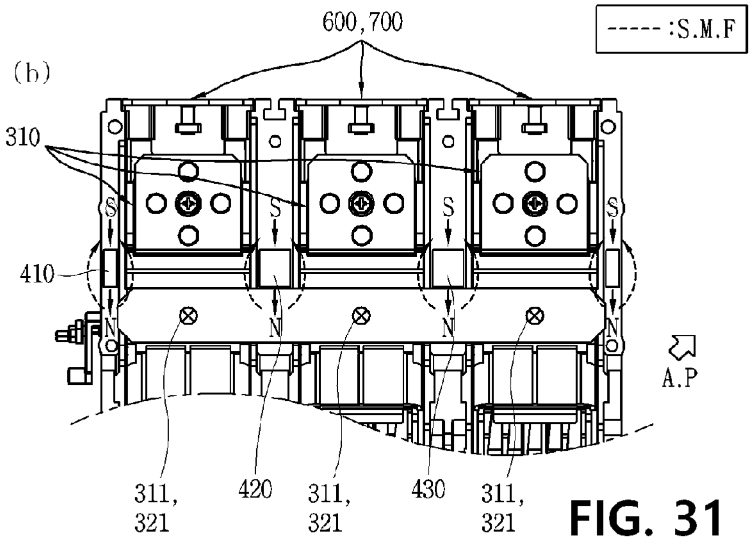

With reference to FIG. 31, the front side of the air circuit breaker 10 including the cover magnet unit 400 according to an embodiment of the present disclosure is illustrated. In addition, with reference to FIG. 32, the plane of the air circuit breaker 10 including the cover magnet unit 400 according to an embodiment of the present disclosure is illustrated.

For convenience of understanding, illustration of the upper cover 110 is omitted.

In the illustrated embodiment, the first to fourth cover magnets 410, 420, 430, 440 of the cover magnet unit 400 are positioned so that the respective fixed contact stands 310 are interposed therebetween.

In this case, each upper surface of each cover magnet 410, 420, 430, 440, that is, each first surface 411, 421, 431, 441 is formed to have the S pole. In addition, each lower surface of each cover magnet 410, 420, 430, 440, that is, each second surface 412, 422, 432, 442 is formed to have the N pole.

Each cover magnet 410, 420, 430, 440 forms a sub magnetic field (S.M.F), which is the magnetic field formed by itself.

Although not shown, the respective cover magnets 410, 420, 430, 440 positioned adjacent to each other may form a main magnetic field (M.M.F).

In (a) of FIG. 31, the current energized in each blocking unit 300 is directed in the direction coming out of the paper, that is, the direction in which the current flowing in the air circuit breaker 10 is transmitted to an external power source or load through the fixed contact stand 310.

In addition, the sub magnetic field (S.M.F) formed by each of the cover magnets 410, 420, 430, 440 is directed from each second surface 412, 422, 432, 442 to each first surface 411, 421, 431, 441, that is, the direction from the lower side to the upper side in the illustrated embodiment.

If Ampere's left hand rule is applied at the position where each fixed contact 311 and each movable contact 321 are in contact, the arc path (A.P) can be predicted. That is, the electromagnetic force formed by the sub magnetic field (S.M.F) and the current being energized is formed in one edge of the arc extinguishing unit 600, 700, which in the illustrated embodiment is the direction toward the upper left side.

Accordingly, in the embodiment illustrated in (a) of FIG. 31, the generated arc proceeds toward one side (i.e., left side) edge of the grid 620, 720. Accordingly, the generated arc can flow quickly and be extinguished.

In (b) of FIG. 31, the current energized in each blocking unit 300 is directed entering the paper, that is, the direction in which the current flowing in an external power source or load is transmitted to the air circuit breaker 10 through the fixed contact stand 310.

In addition, the sub magnetic field (S.M.F) formed by each of the cover magnets 410, 420, 430, 440 is directed from each second surface 412, 422, 432, 442 to each first surface 411, 421, 431, 441, that is, the direction from the lower side to the upper side in the illustrated embodiment.

If Ampere's left hand rule is applied at the position where each fixed contact 311 and each movable contact 321 are in contact, the arc path (A.P) can be predicted. That is, the electromagnetic force formed by the sub magnetic field (S.M.F) and the current being energized is formed in one edge of the arc extinguishing unit 600, 700, which in the illustrated embodiment is the direction toward the upper right side.

Accordingly, in the embodiment shown in (b) of FIG. 31, the generated arc proceeds toward the other (i.e., right) edge of the grid 620, 720. Accordingly, the generated arc can flow quickly and be extinguished.

Figure 32:
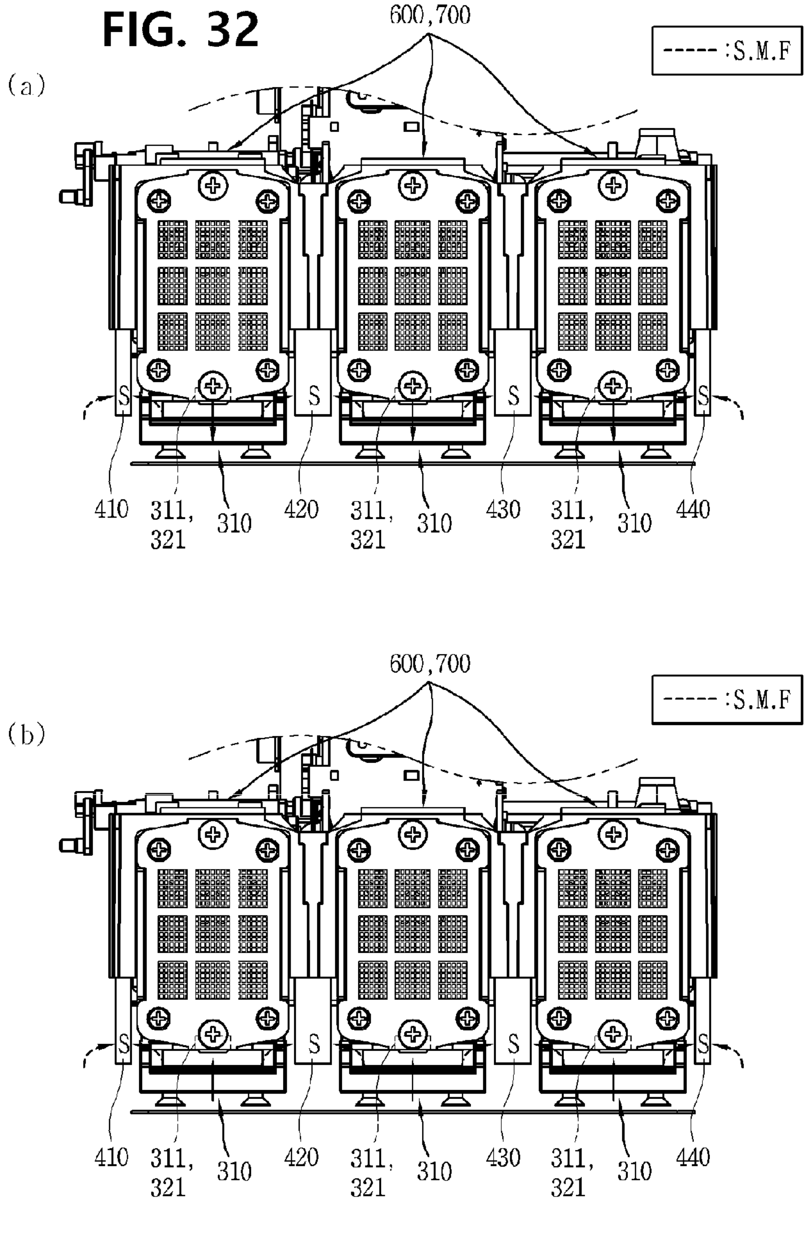
FIG. 32 is a plan view illustrating an example of a magnetic field formed in a frame according to an embodiment of the present disclosure and an arc path formed accordingly.

With reference to FIG. 32, a plan view of the example illustrated in FIG. 31 as viewed from above is illustrated.

In (a) of FIG. 32, the current energized in each blocking unit 300 is directed in the direction in which the current flowing in the air circuit breaker 10 is transmitted to an external power source or load through the fixed contact stand 310. It will be understood that the direction of the current is the same as in the embodiment illustrated in (a) of FIG. 31.

As described above, the sub magnetic field (S.M.F) formed by each of the cover magnets 410, 420, 430, 440 is formed in the direction from each second surface 412, 422, 432, 442 to each first surface 411, 421, 431, 441, that is, the direction toward the arc extinguishing unit 600, 700.

If Ampere's left hand rule is applied at the position where each fixed contact 311 and each movable contact 321 are in contact, the arc path (A.P) can be predicted. That is, the electromagnetic force formed by the sub magnetic field (S.M.F) and the current being energized is formed in one edge of the arc extinguishing unit 600, 700, which in the illustrated embodiment is the direction toward the upper left side.

Accordingly, in the embodiment illustrated in (a) of FIG. 32, the generated arc proceeds toward one side (i.e., left side) edge of the grid 620, 720. Accordingly, the generated arc can flow quickly and be extinguished.

In (b) of FIG. 32, the current energized in each blocking unit 300 is directed in the direction in which the current flowing through an external power source or load is transmitted to the air circuit breaker 10 through the fixed contact stand 310. It will be understood that the direction of the current is the same as in the embodiment illustrated in (b) of FIG. 31.

As described above, the sub magnetic field (S.M.F) formed by each of the cover magnets 410, 420, 430, 440 is formed in the direction from each second surface 412, 422, 432, 442 to each first surface 411, 421, 431, 441, that is, the direction toward the arc extinguishing unit 600, 700.

If Ampere's left hand rule is applied at the position where each fixed contact 311 and each movable contact 321 are in contact, the arc path (A.P) can be predicted. That is, the electromagnetic force formed by the sub magnetic field (S.M.F) and the current being energized is formed in one edge of the arc extinguishing unit 600, 700, which in the illustrated embodiment is the direction toward the upper right side.

Accordingly, in the embodiment shown in (b) of FIG. 32, the generated arc proceeds toward the other (i.e., right) edge of the grid 620, 720. Accordingly, the generated arc can flow quickly and be extinguished.

In this embodiment, the respective first surfaces 411, 421, 431, 441 of the respective cover magnets 410, 420, 430, 440 may be magnetized with the same polarity (i.e., S pole). Similarly, the respective second surfaces 412, 422, 432, 442 of the respective cover magnets 410, 420, 430, 440 may be magnetized with the same polarity (i.e., N pole).

In this embodiment, even if the direction of the current energized in each contact 311, 321 is changed, the arc path (A.P) is formed to face the end of the grid 620, 720 and the grid cover 630, 730.

Therefore, regardless of the direction of the current being energized, the generated arc can be quickly moved and extinguished along the arc path (A.P).

(2) Description of the Process in which the Arc Path (A.P) is Formed by the Arc Extinguishing Unit 600 According to an Embodiment of the Present Disclosure A process in which the arc path (A.P) is formed by the arc extinguishing unit 600 according to an embodiment of the present disclosure will be described in detail with reference to FIGS. 33 to 36.

In the illustrated embodiment, any one arc extinguishing unit 600 of the plurality of arc extinguishing units 600 is illustrated for convenience of understanding. It will be understood that the other arc extinguishing unit 600 not illustrated also forms the arc path (A.P) in accordance with the following description.

Figure 33:
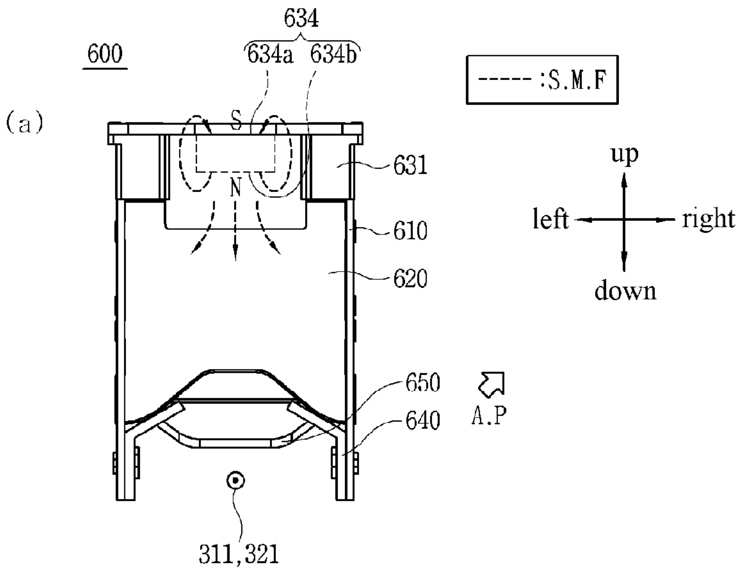
FIG. 33 is a front view illustrating an example of a magnetic field formed in the arc extinguishing unit according to the embodiment of FIG. 10 and an arc path formed accordingly.
Figure 33:
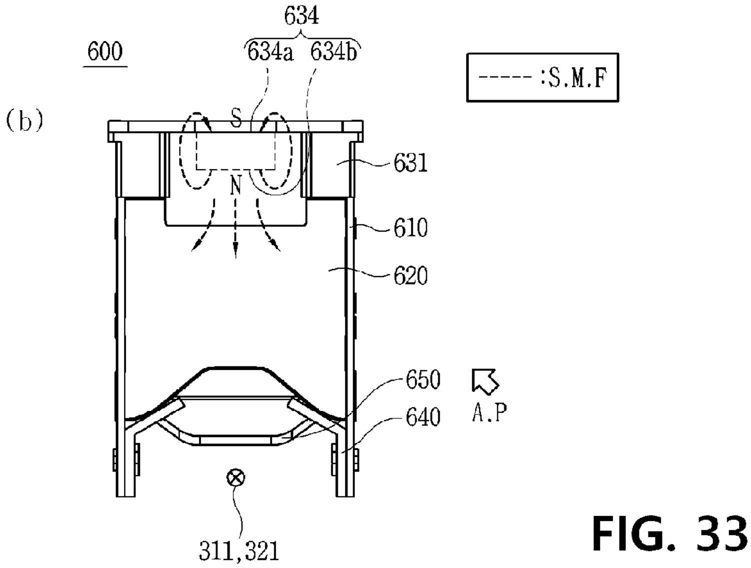

With reference to FIG. 33, the front of the arc extinguishing unit 600 according to an embodiment of the present disclosure is illustrated. In addition, with reference to FIG. 34, a side cross-section of the arc extinguishing unit 600 according to an embodiment of the present disclosure is illustrated.

As described above, the arc extinguishing unit 600 according to the present embodiment includes the extinguishing magnet 634 accommodated in the cover body 631.

The first surface 634*a* of the extinguishing magnet 634, that is, one side surface opposite to the grid 620 is magnetized to the S pole. Accordingly, the second surface 634*b* of the extinguishing magnet 634, that is, the other surface facing the grid 620 is magnetized to the N pole.

The extinguishing magnet 634 forms a sub magnetic field (S.M.F), which is a magnetic field formed by the magnet itself. The sub magnetic field (S.M.F) formed by the extinguishing magnet 634 is directed toward the grid 620, that is, the direction from the upper side to the lower side in the illustrated embodiment.

In (a) of FIG. 33, the current energized in each contact 311, 321 is directed in the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in one edge of the grid 620, which in the illustrated embodiment is the direction toward the right of the upper side.

In (b) of FIG. 33, the current energized in each contact 311, 321 is directed entering the paper, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction toward the other edge of the grid 620, which in the illustrated embodiment is the direction toward the upper left side.

As described above, the end of the grid 620 in the left-right direction may be formed in a peak shape. Accordingly, the arc may flow along the arc path (A.P) of the generated arc and enter the end of the grid 620.

In addition, the arc path (A.P) is formed to face the grid cover 630 positioned above the grid 620. The grid cover 630 is provided with the vent 632*a* of the upper frame 632 communicating with the outside, the mesh part 633, and the through-hole 636*a* of the blocking plate 636.

Accordingly, the generated arc can be rapidly moved and extinguished along the arc path (A.P) of the generated arc and discharged to the outside.

Figure 34:
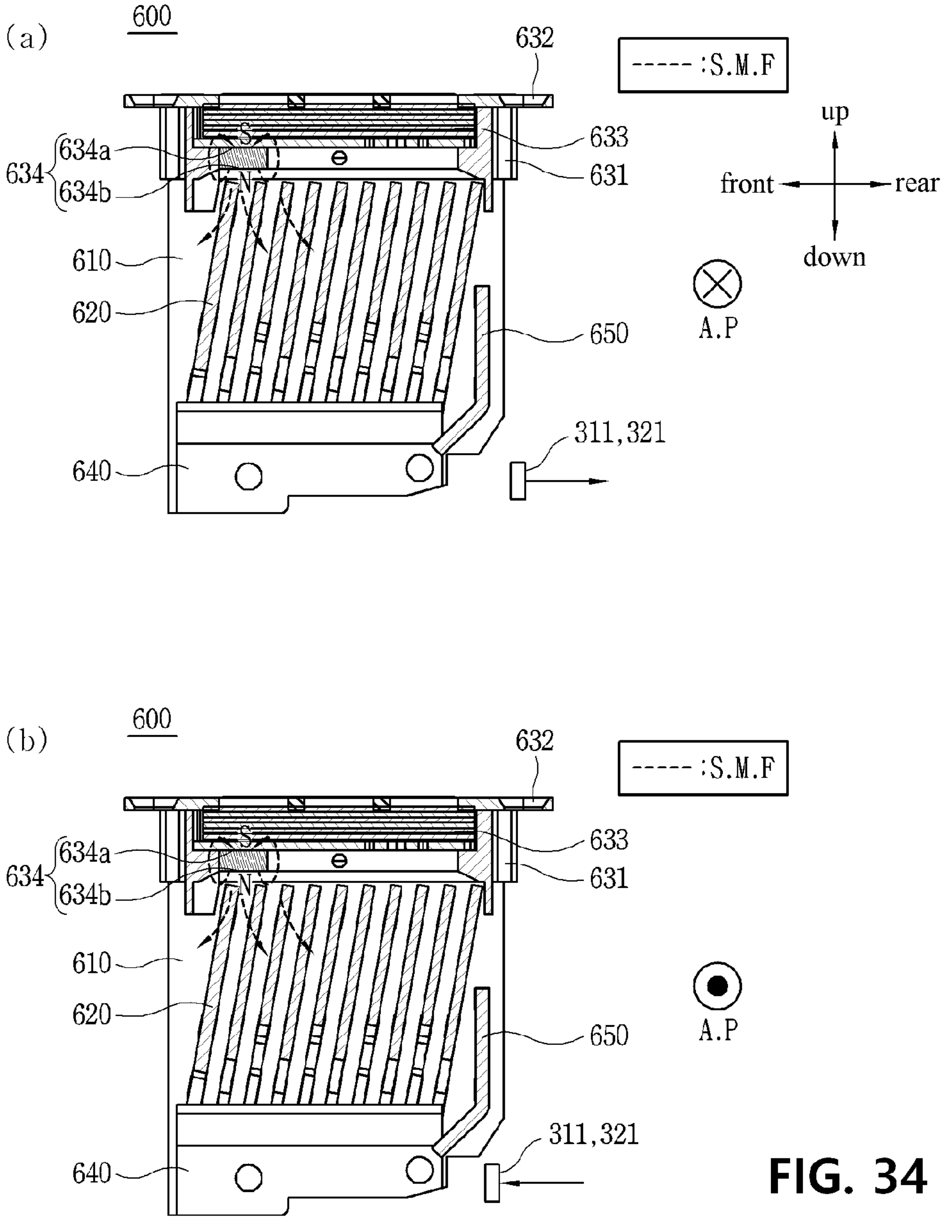
FIG. 34 is a cross-sectional view illustrating another example of a magnetic field formed in the arc extinguishing unit according to the embodiment of FIG. 10 and an arc path formed accordingly.

In (a) of FIG. 34, the current energized in each contact 311, 321 is directed away from the arc extinguishing unit 600, that is, in the direction in which the current in which the current flowing in the air circuit breaker 10 is transmitted to an external power source or load through the fixed contact stand 310 (refer to the solid arrow in (a) of FIG. 34).

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction entering the paper, that is, in the direction toward the left side of the grid 620.

Although not illustrated, in this embodiment, it will be understood that the arc path (A.P) is formed to face the grid cover 630 positioned above the grid 620 as in the embodiment illustrated in (a) of FIG. 33.

In (b) of FIG. 34, the current energized in each contact 311, 321 is directed toward the arc extinguishing unit 600, that is, the direction in which the current flowing in an external power source or load is transmitted to the air circuit breaker 10 through each contact 311, 321 (refer to the solid arrow in (b) of FIG. 34).

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction coming out of the paper, that is, in the direction toward the right side of the grid 620.

Although not illustrated, in this embodiment, it will be understood that the arc path (A.P) is formed to face the grid cover 630 positioned above the grid 620 as in the embodiment illustrated in (b) of FIG. 33.

As described above, the end of the grid 620 in the left-right direction may be formed in a peak shape. Accordingly, the arc may flow along the arc path (A.P) of the generated arc and enter the end of the grid 620.

Accordingly, the generated arc can be rapidly moved and extinguished along the arc path (A.P) of the generated arc and discharged to the outside.

Figure 35:
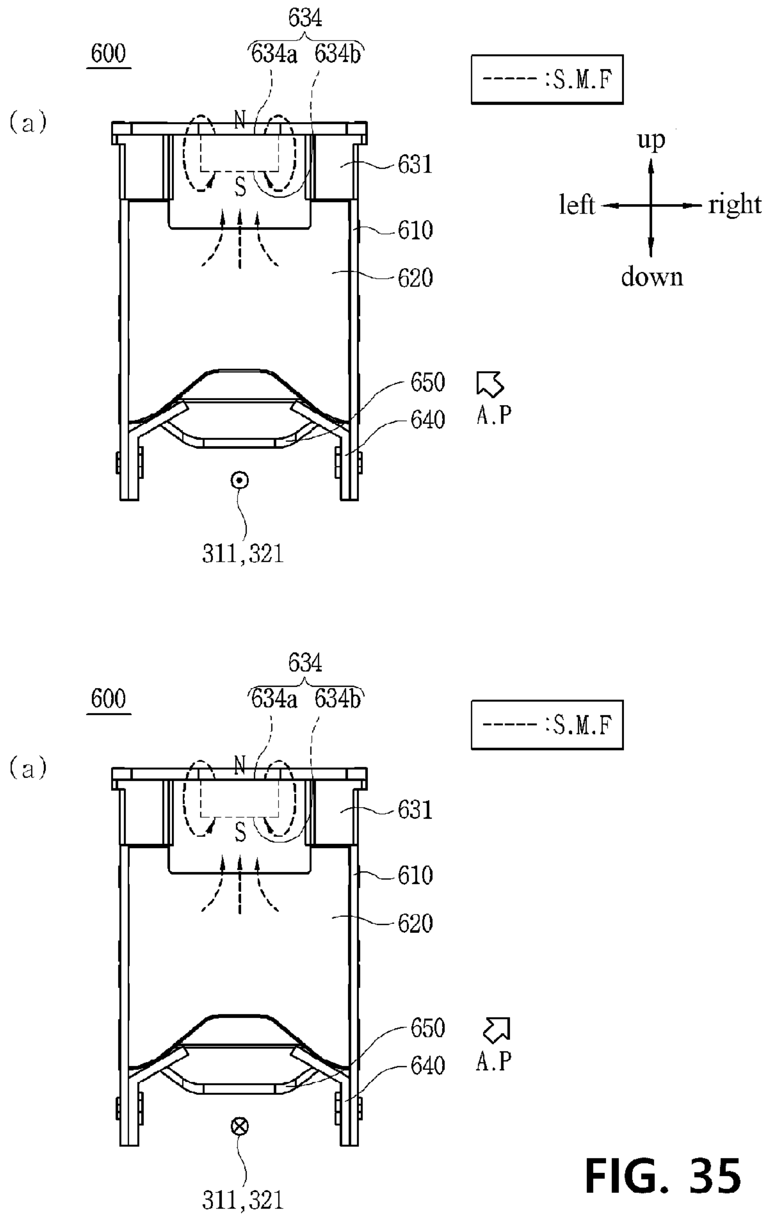
FIG. 35 is a front view illustrating an example of a magnetic field formed in the arc extinguishing unit according to the embodiment of FIG. 10 and an arc path formed accordingly.

With reference to FIG. 35, the front of the arc extinguishing unit 600 according to an embodiment of the present disclosure is illustrated. In addition, with reference to FIG. 36, a side cross-section of the arc extinguishing unit 600 according to an embodiment of the present disclosure is illustrated.

As described above, the arc extinguishing unit 600 according to the present embodiment includes the extinguishing magnet 634 accommodated in the cover body 631.

The first surface 634*a* of the extinguishing magnet 634, that is, one side surface opposite to the grid 620 is magnetized to the N pole. Accordingly, the second surface 634*b* of the extinguishing magnet 634, that is, the other surface facing the grid 620 is magnetized to the S pole.

The extinguishing magnet 634 forms a sub magnetic field (S.M.F), which is a magnetic field formed by itself. The sub magnetic field (S.M.F) formed by the extinguishing magnet 634 is directed in the direction away from the grid 620, that is, the direction from the lower side to the upper side in the illustrated embodiment.

In (a) of FIG. 35, the current energized in each contact 311, 321 is directed in the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in one corner of the grid 620, in the direction toward the upper left side in the illustrated embodiment.

In (b) of FIG. 35, the current energized in each contact 311, 321 is directed in the direction entering the paper, that is, the direction in which the current flowing to an external power source or load is transmitted to the air circuit breaker 10 through each contact 311, 321.

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction toward the other side edge of the grid 620, which in the illustrated embodiment is the direction toward the upper right side.

Figure 36:
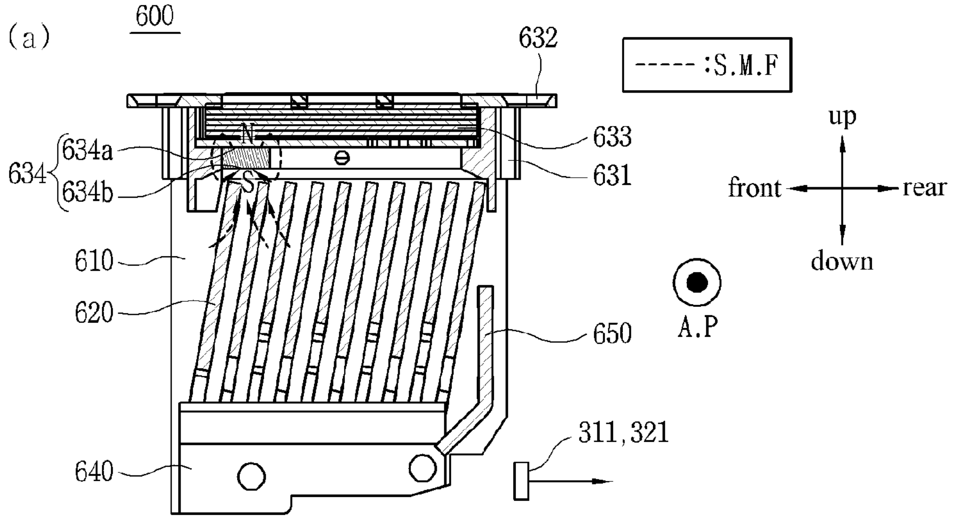
FIG. 36 is a cross-sectional view illustrating another example of a magnetic field formed in the arc extinguishing unit according to the embodiment of FIG. 10 and an arc path formed thereby.
Figure 36:
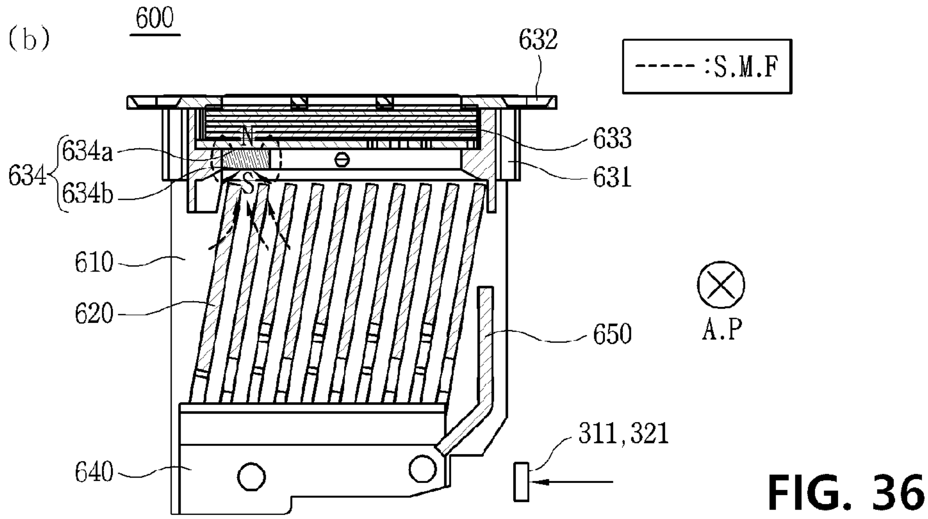

In (a) of FIG. 36, the current energized in each contact 311, 321 is directed in the direction away from the arc extinguishing unit 600, that is, the direction in which the current flowing in the air circuit breaker 10 is transmitted to an external source or load through the fixed contact stand 310 (refer to the solid arrow in (a) of FIG. 36).

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction coming out of the paper, that is, the direction toward the right side of the grid 620.

Although not shown, in this embodiment, it will be understood that the arc path (A.P) is formed to face the grid cover 630 positioned above the grid 620 as in the embodiment illustrated in (a) of FIG. 35.

In (b) of FIG. 36, the current energized in each contact 311, 321 is directed in the direction toward the arc extinguishing unit 600, that is, the direction in which the current flowing in an external power source or load is transmitted to the air circuit breaker 10 through each contact 311, 321 (refer to the solid arrow in (b) of FIG. 36).

Accordingly, if Ampere's left hand rule is applied at a position where each contact 311, 321 is in contact, the arc path (A.P) can be predicted. That is, the electromagnetic force formed by the sub magnetic field (S.M.F) and the current energized in each contact 311, 321 is formed in the direction entering the paper, that is, the direction toward the left side of the grid 620.

Although not illustrated, in this embodiment, it will be understood that the arc path (A.P) is formed to face the grid cover 630 positioned above the grid 620 as in the embodiment illustrated in (b) of FIG. 33.

As described above, the end of grid 620 in the left-right direction may be formed in a peak shape. Accordingly, the arc may flow along the arc path (A.P) of the generated arc and enter the end of the grid 620.

In addition, the arc path (A.P) is formed to face the grid cover 630 positioned above the grid 620. The grid cover 630 is provided with the vent 632*a* of the upper frame 632 communicating with the outside, the mesh part 633, and the through-hole 636*a* of the blocking plate 636.

Accordingly, the generated arc can be rapidly moved and extinguished along the arc path (A.P) of the generated arc and discharged to the outside.

In this embodiment, even if the polarity of the extinguishing magnet 634 is changed, the arc path (A.P) of the generated arc is formed to face the width direction of the grid 620, which in the illustrated embodiment is the left-right direction. In addition, the arc path (A.P) of the generated arc is formed to face the grid cover 630 positioned to be opposite to each contact 311, 321.

Furthermore, even when the direction of the current energized in each contact 311, 321 is changed, the arc path (A.P) is formed to face the end of the grid 620 and the grid cover 630.

Therefore, even if the polarity of the extinguishing magnet 634 and the direction of the current to be energized are changed, the generated arc can be quickly moved and extinguished along the arc path (A.P).

(3) Description of the Process of Forming the Arc Path (A.P) by the CT Magnet Unit 500 According to an Embodiment of the Present Disclosure and the Arc Extinguishing Unit 600 According to an Embodiment With reference to FIGS. 37 to 40, the process of forming the arc path (A.P) by the CT magnet unit 500 according to an embodiment of the present disclosure and the arc extinguishing unit 600 according to an embodiment will be described in detail.

As described above, the CT magnet unit 500 according to an embodiment of the present disclosure includes the CT magnet 530.

The CT magnet 530 is accommodated in the space part 520 of the case 510 to form a sub magnetic field (S.M.F). In addition, the CT magnet 530 may form a main magnetic field (M.M.F) together with the extinguishing magnet 634 of the arc extinguishing unit 600.

In addition, as described above, the arc extinguishing unit 600 according to an embodiment of the present disclosure includes the extinguishing magnet 634.

The extinguishing magnet 634 is accommodated in the grid cover 630 to form a sub magnetic field (S.M.F). In addition, the extinguishing magnet 634 may form a main magnetic field (M.M.F) together with the CT magnet 530 of the CT magnet unit 500.

In this case, the surfaces on which the CT magnet 530 and the extinguishing magnet 634 face each other, that is, the first surface 531 of the CT magnet 530 and the second surface 634*b* of the extinguishing magnet 634, can be magnetized to have different polarities.

Figure 37:
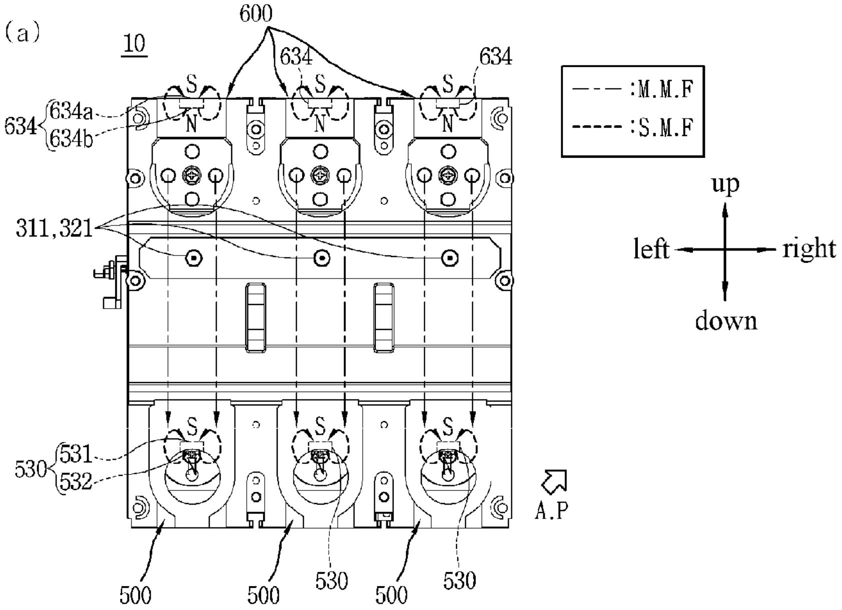
FIG. 37 is a cross-sectional view illustrating an example of a magnetic field formed in the air circuit breaker including the current transformer case of FIG. 8 and the arc extinguishing unit according to the embodiment of FIG. 10 and an arc path formed accordingly.
Figure 37:
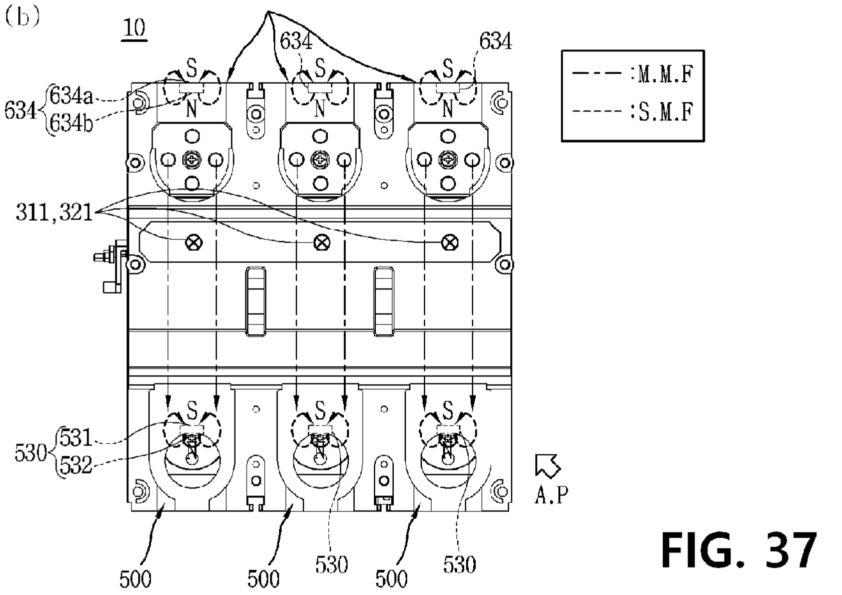

With reference to FIG. 37, the front side of the air circuit breaker 10 including the CT magnet unit 500 according to an embodiment of the present disclosure and the arc extinguishing unit 600 according to an embodiment is illustrated. In addition, with reference to FIG. 38, the right side of the air circuit breaker 10 including the CT magnet unit 500 according to an embodiment of the present disclosure and the arc extinguishing unit 600 according to an embodiment is illustrated.

The first surface 531 of the CT magnet 530, that is, one side surface facing each contact 311, 321 or the arc extinguishing unit 600 is magnetized to the S pole. Accordingly, the second surface 532 of the CT magnet 530, that is, the surface of the other side opposite to each contact 311, 321 or the arc extinguishing unit 600 is magnetized to the N pole. The CT magnet 530 forms a sub magnetic field (S.M.F), which is a magnetic field formed by itself.

In addition, the first surface 634*a* of the extinguishing magnet 634, that is, one side surface opposite to each contact 311, 321 or the CT magnet unit 500 is magnetized to the S pole. Accordingly, the second surface 634*b* of the extinguishing magnet 634, that is, the other surface facing each contact 311, 321 or the CT magnet unit 500 is magnetized to the N pole. The extinguishing magnet 634 forms a sub magnetic field (S.M.F), which is a magnetic field formed by itself.

Furthermore, a main magnetic field (M.M.F) is formed between the CT magnet 530 and the extinguishing magnet 634. Specifically, the main magnetic field (M.M.F) is formed in the direction from the second surface 634*b* of the extinguishing magnet 634 to the first surface 531 of the CT magnet 530, which in the illustrated embodiment is the direction from the upper side to lower side.

In (a) of FIG. 37, the current energized in each contact 311, 321 is directed the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in one edge of the grid 620, which in the illustrated embodiment is the direction toward the upper right side.

In (b) of FIG. 37, the current energized in each contact 311, 321 is directed in the direction entering the paper, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in one edge of the grid 620, which in the illustrated embodiment is the direction toward the upper left side.

Figure 38:
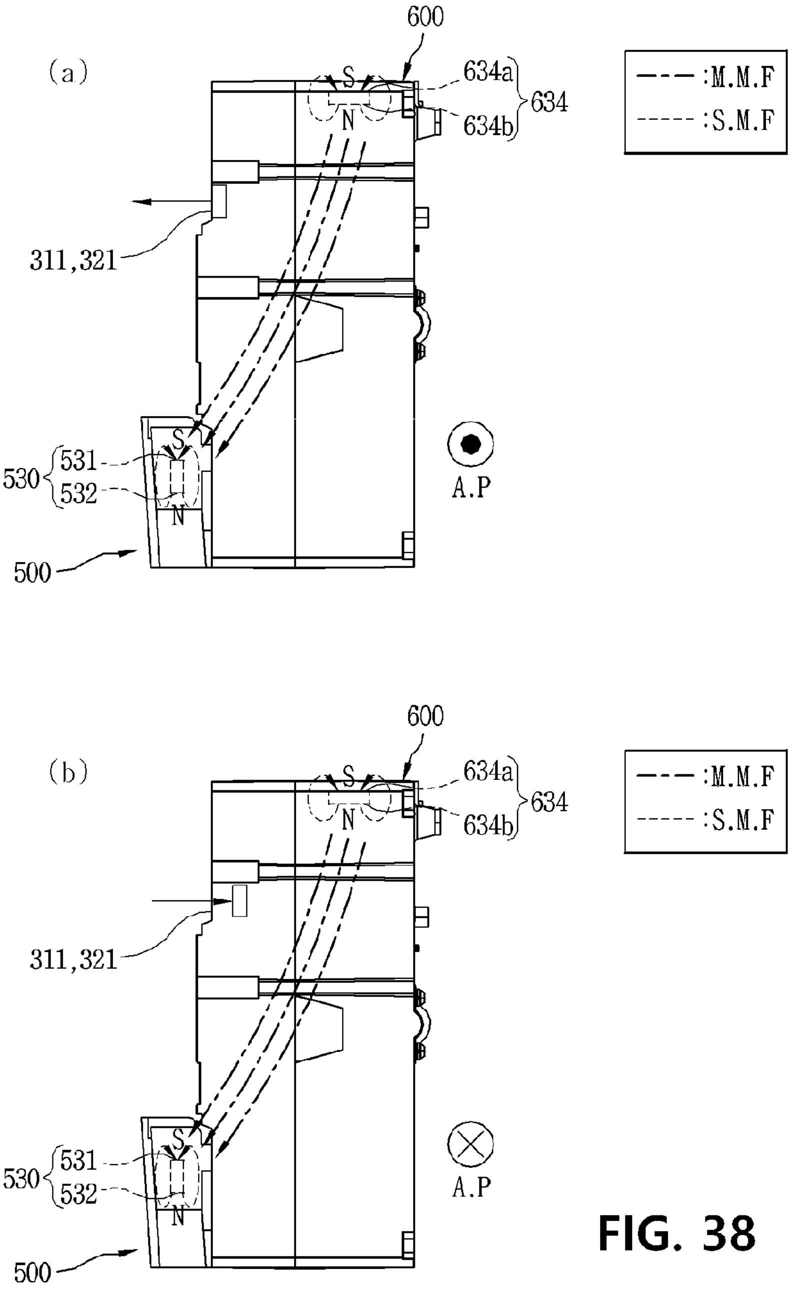
FIG. 38 is a front view illustrating another example of a magnetic field formed in the air circuit breaker including the current transformer case of FIG. 8 and the arc extinguishing unit according to the embodiment of FIG. 10 and an arc path formed accordingly.

In (a) of FIG. 38, the current energized in each contact 311, 321 is directed in the direction away from the arc extinguishing unit 600, that is, the direction in which the current flowing in the air circuit breaker 10 is transmitted to an external power source or load through each contact 311, 321 (refer to the solid arrow in (a) of FIG. 38).

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in the direction coming out of the paper, that is, the direction toward the right side of the grid 620.

Although not illustrated, in this embodiment, it will be understood that the arc path (A.P) is formed to face the grid cover 630 positioned above the grid 620 as in the embodiment illustrated in (a) of FIG. 37(*a*).

In (b) of FIG. 38, the current energized in each contact 311, 321 is directed in the direction toward the arc extinguishing unit 600, that is, the direction in which the current flowing in an external power source or load is transmitted to the air circuit breaker 10 through each contact 311, 321 (refer to the solid arrow of (b) of FIG. 38).

Accordingly, if Ampere's left hand rule is applied at a position where each of the contact stands 311 and 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in the direction entering the paper, that is, the direction toward the left side of the grid 620.

Although not illustrated, in this embodiment, it will be understood that the arc path (A.P) is formed to face the grid cover 630 positioned above the grid 620 as in the embodiment illustrated in (b) of FIG. 37.

As described above, the end of grid 620 in the left-right direction may be formed in a peak shape. Accordingly, the arc may flow along the arc path (A.P) of the generated arc and enter the end of the grid 620.

In addition, the arc path (A.P) is formed to face the grid cover 630 positioned above the grid 620. The grid cover 630 is provided with the vent 632*a* of the upper frame 632 communicating with the outside, the mesh part 633, and the through-hole 636*a* of the blocking plate 636.

Accordingly, the generated arc can be rapidly moved and extinguished along the arc path (A.P) of the generated arc and discharged to the outside.

Figure 39:
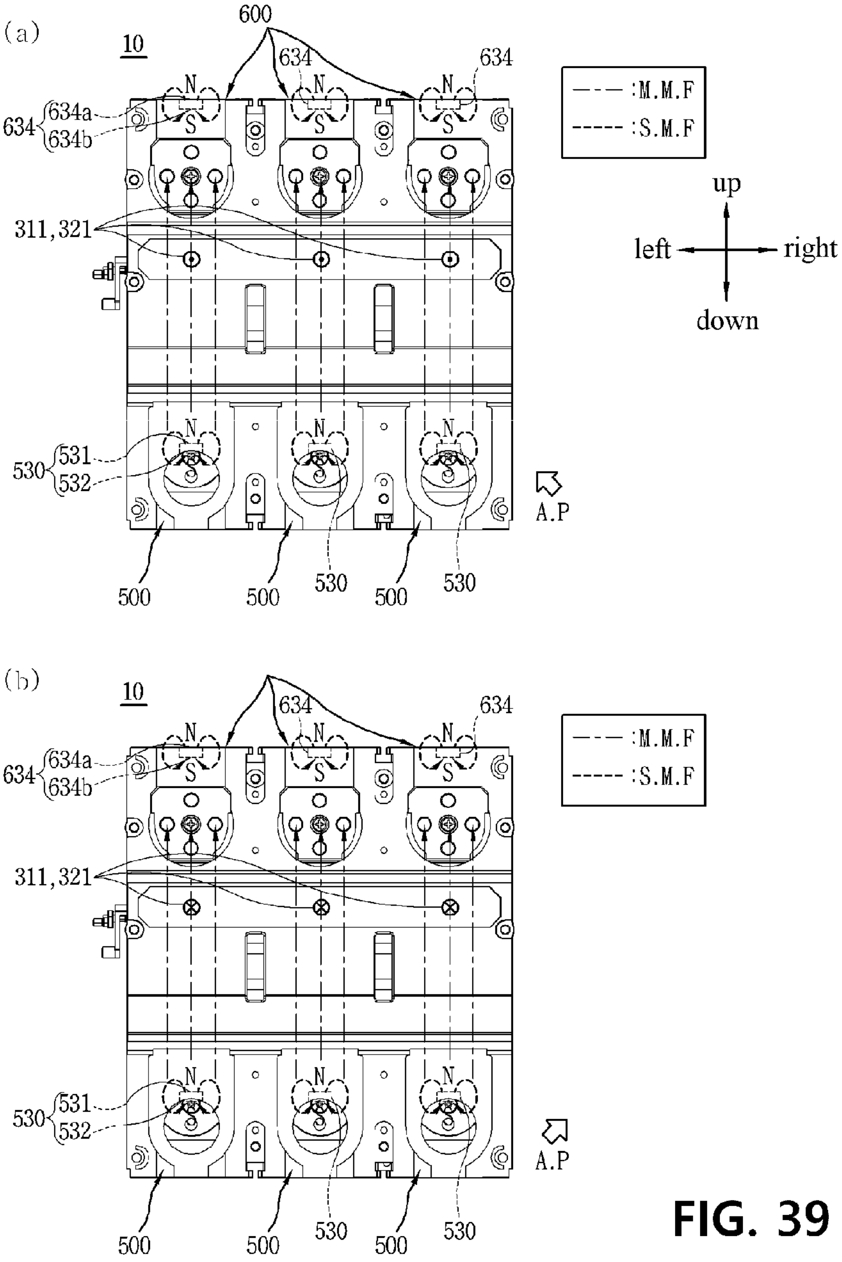
FIG. 39 is a front view illustrating an example of a magnetic field formed in the air circuit breaker including the current transformer case of FIG. 8 and the arc extinguishing unit according to the embodiment of FIG. 10 and an arc path formed accordingly.

With reference to FIG. 39, the front side of the air circuit breaker 10 including the CT magnet unit 500 according to an embodiment of the present disclosure and the arc extinguishing unit 600 according to an embodiment is illustrated. In addition, with reference to FIG. 40, a side view of the air circuit breaker 10 including the CT magnet unit 500 according to an embodiment of the present disclosure and the arc extinguishing unit 600 according to an embodiment is illustrated.

The first surface 531 of the CT magnet 530, that is, one side surface facing each contact 311, 321 or the arc extinguishing unit 600 is magnetized to the N pole. Accordingly, the second surface 532 of the CT magnet 530, that is, the surface of the other side opposite to each contact 311, 321 or the arc extinguishing unit 600 is magnetized to the S pole. The CT magnet 530 forms a sub magnetic field (S.M.F), which is a magnetic field formed by itself.

In addition, the first surface 634*a* of the extinguishing magnet 634, that is, one side surface opposite to each contact 311, 321 or the CT magnet unit 500 is magnetized to the N pole. Accordingly, the second surface 634*b* of the extinguishing magnet 634, that is, the surface of the other side facing each contact 311, 321 or the CT magnet unit 500 is magnetized to the S pole. The extinguishing magnet 634 forms a sub magnetic field (S.M.F), which is a magnetic field formed by itself.

Furthermore, a main magnetic field (M.M.F) is formed between the CT magnet 530 and the extinguishing magnet 634. Specifically, the main magnetic field (M.M.F) is formed in the direction from the first surface 531 of the CT magnet 530 to the second surface 634*b* of the extinguishing magnet 634, which in the illustrated embodiment is the direction from the lower side to the upper side.

In (a) of FIG. 39, the current energized in each contact 311, 321 is directed in the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in one edge of the grid 620, which in the illustrated embodiment is the direction toward the upper left side.

In (b) of FIG. 39, the current energized in each contact 311, 321 is directed in the direction entering the paper, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in one edge of the grid 620, which in the illustrated embodiment is the direction toward the upper right side.

Figure 40:
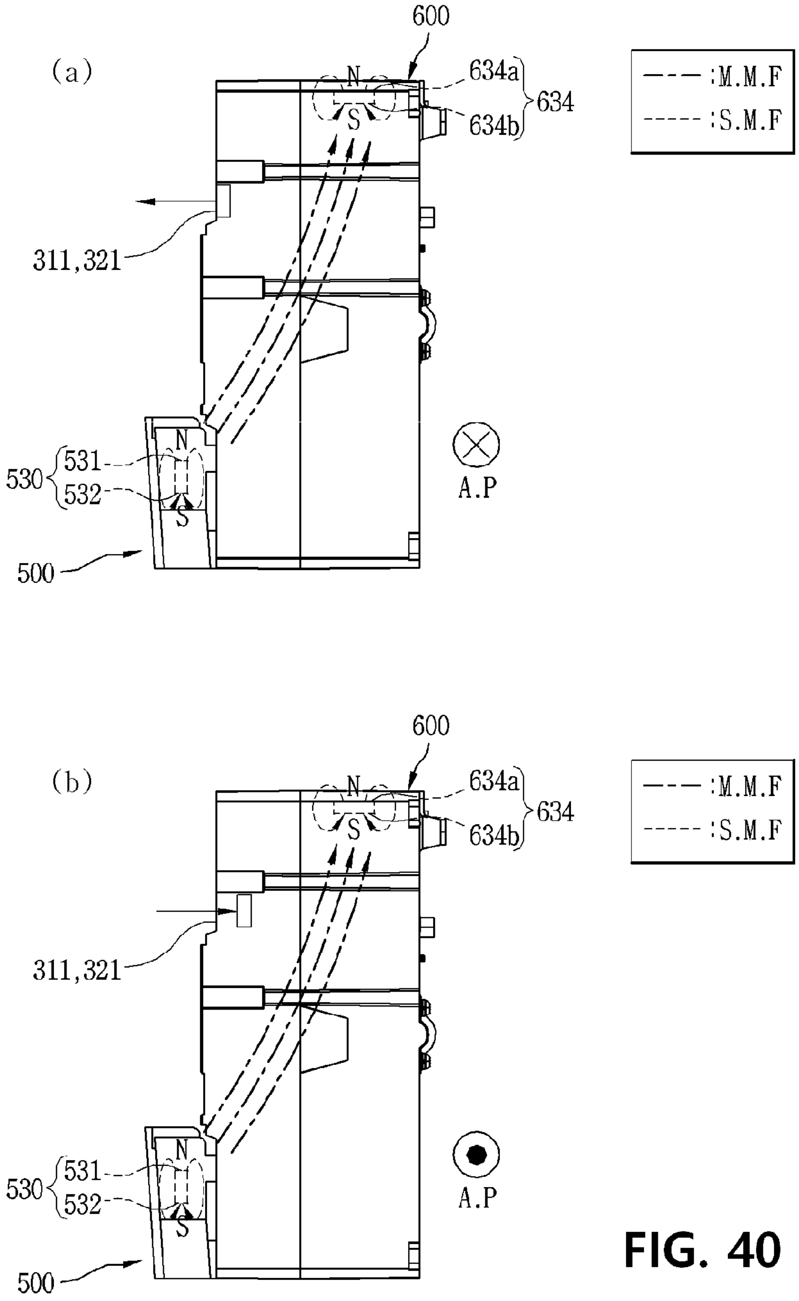
FIG. 40 is a cross-sectional view illustrating an example of a magnetic field formed in the air circuit breaker including the current transformer case of FIG. 8 and the arc extinguishing unit according to the embodiment of FIG. 10 and an arc path formed accordingly.

In (b) of FIG. 40, the current energized in each contact 311, 321 is directed in the direction away from the arc extinguishing unit 600, that is, the direction in which the current flowing in the air circuit breaker 10 is transmitted to an external power source or load through each contact 311, 321 (refer to the solid arrow in (a) of FIG. 40).

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is directed in the direction entering the paper, that is, the direction toward the left side of the grid 620.

Although not illustrated, in this embodiment, it will be understood that the arc path (A.P) is formed to face the grid cover 630 positioned above the grid 620 as in the embodiment illustrated in (a) of FIG. 39.

In (b) of FIG. 40, the current energized in each contact 311, 321 is directed in the direction toward the arc extinguishing unit 600, that is, the direction in which the current flowing in an external power source or load is transmitted to the air circuit breaker 10 through each contact 311, 321 (refer to the solid arrow in (b) of FIG. 40).

Accordingly, if Ampere's left hand rule is applied at a position where each contact 311, 321 is in contact, the arc path (A.P) can be predicted.

That is, the electromagnetic force formed by the main magnetic field (M.M.F) formed between the CT magnet 530 and the extinguishing magnet 634 and the current energized in each contact 311, 321 is formed in the direction coming out of the paper, that is, the direction toward the right side of the grid 620.

Although not illustrated, in this embodiment, it will be understood that the arc path (A.P) is formed to face the grid cover 630 positioned above the grid 620 as in the embodiment illustrated in (b) of FIG. 39.

As described above, the end of the grid 620 in the left-right direction may be formed in a peak shape. Accordingly, the arc may flow along the arc path (A.P) of the generated arc and enter the end of the grid 620.

In addition, the arc path (A.P) is formed to face the grid cover 630 positioned above the grid 620. The grid cover 630 is provided with the vent 632*a* of the upper frame 632 communicating with the outside, the mesh part 633, and the through-hole 636*a* of the blocking plate 636.

Accordingly, the generated arc can be rapidly moved and extinguished along the arc path (A.P) of the generated arc and discharged to the outside.

In this embodiment, even if the polarities of the CT magnet 530 and the extinguishing magnet 634 are changed, the arc path (A.P) of the generated arc is formed to face the width direction of the grid 620, which in the illustrated embodiment is the left-right direction. In addition, the arc path (A.P) of the generated arc is formed to face the grid cover 630 positioned to be opposite to each contact 311, 321.

Furthermore, even when the direction of the current energized in each contact 311, 321 is changed, the arc path (A.P) is formed to face the end of the grid 620 and the grid cover 630.

Therefore, even if the polarity of the extinguishing magnet 634 and the direction of the current to be energized are changed, the generated arc can be quickly moved and extinguished along the arc path (A.P) of the generated arc.

In addition, the CT magnet 530 and the extinguishing magnet 634 form a sub magnetic field (S.M.F), respectively. Each sub magnetic field (S.M.F) is formed in the same direction as the main magnetic field (M.M.F) formed between the CT magnet 530 and the extinguishing magnet 634.

Accordingly, the strength of the magnetic field forming the arc path (A.P) may be strengthened. As a result, since the strength of the electromagnetic force is also strengthened, the generated arc can be rapidly moved and extinguished along the arc path (A.P) toward the arc extinguishing unit 600.

(4) Description of the Process in which the Arc Path (A.P) is Formed by the Arc Extinguishing Unit 700 According to Another Embodiment of the Present Disclosure A process in which the arc path (A.P) is formed by the arc extinguishing unit 700 according to another embodiment of the present disclosure will be described in detail with reference to FIGS. 41 to 44.

As described above, the arc extinguishing unit 700 according to the present embodiment includes the extinguishing magnet 770. The extinguishing magnet 770 includes the first extinguishing magnet 771 provided in the first accommodating part 761, the second extinguishing magnet 772 provided in the second accommodating part 762, and the third extinguishing magnet 773 provided in the third accommodating part 763.

Each extinguishing magnet 771, 772, 773 forms a sub magnetic field (S.M.F). In addition, a main magnetic field (M.M.F) may be formed between the respective extinguishing magnets 771, 772, 773.

In this case, the surface on which the second extinguishing magnet 772 and the third extinguishing magnet 773 face each other, that is, the second surface 772*b* of the second extinguishing magnet 772 and the second surface 773*b* of the third extinguishing magnet 773 can be magnetized with the same polarity.

In addition, one surface of the first extinguishing magnet 771 facing the grid 720, that is, the first surface 771*a* of the first extinguishing magnet 771 may be magnetized to the same polarity as the second surface 772*b* of the second extinguishing magnet 772 and the second surface 773*b* of the third extinguishing magnet 773.

Figure 41:
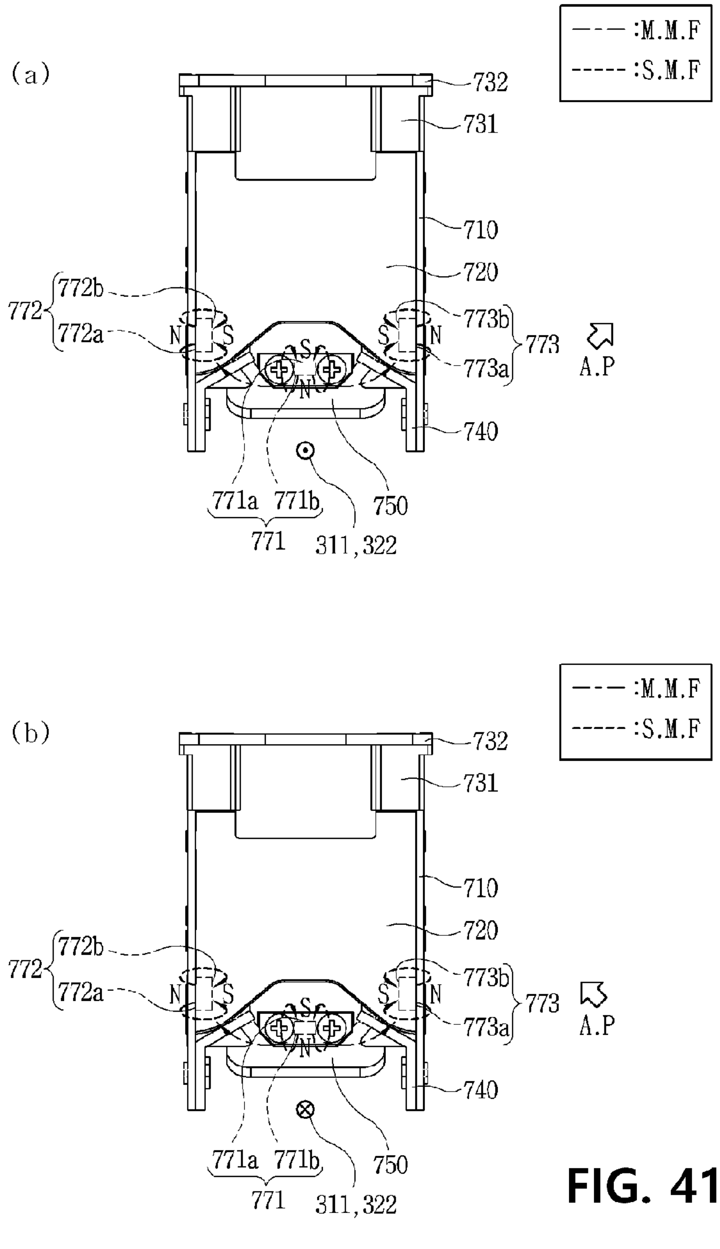
FIG. 41 is a front view illustrating an example of a magnetic field formed in the arc extinguishing unit according to the embodiment of FIG. 19 and an arc path formed accordingly.

With reference to FIG. 41, the front of the arc extinguishing unit 700 according to another embodiment of the present disclosure is illustrated. Also, with reference to FIG. 42, the bottom of the arc extinguishing unit 700 according to another embodiment of the present disclosure is illustrated.

The first surface 771*a* of the first extinguishing magnet 771, that is, one side surface of the first extinguishing magnet 771 facing the grid 720 is magnetized to the S pole. Accordingly, the second surface 771*b* of the first extinguishing magnet 771, that is, the other surface of the first extinguishing magnet 771 opposite to the grid 720 is magnetized to the N pole. The first extinguishing magnet 771 forms a sub magnetic field (S.M.F), which is a magnetic field formed between the first surface 771*a* and the second surface 771*b*.

The first surface 772*a* of the second extinguishing magnet 772, that is, one side surface of the second extinguishing magnet 772 opposite to the first extinguishing magnet 771 is magnetized to the N pole. Accordingly, the second surface 772*b* of the second extinguishing magnet 772, that is, the other surface of the second extinguishing magnet 772 facing the first extinguishing magnet 771 is magnetized to the S pole. The second extinguishing magnet 772 forms a sub magnetic field (S.M.F), which is a magnetic field formed between the first surface 772*a* and the second surface 772*b*.

The first surface 773*a* of the third extinguishing magnet 773, that is, one side surface of the third extinguishing magnet 773 opposite to the first extinguishing magnet 771 is magnetized to the N pole. Accordingly, the second surface 773*b* of the third extinguishing magnet 773, that is, the other surface of the third extinguishing magnet 773 facing the first extinguishing magnet 771 is magnetized to the S pole. The third extinguishing magnet 773 forms a sub magnetic field (S.M.F), which is a magnetic field formed between the first surface 773*a* and the second surface 773*b*.

In addition, a main magnetic field (M.M.F) is formed between the first extinguishing magnet 771 and the second extinguishing magnet 772. Specifically, a main magnetic field (M.M.F) is formed in the direction from the second surface 771*b* of the first extinguishing magnet 771 to the second surface 772*b* of the second extinguishing magnet 772, which in the illustrated embodiment is the direction toward the left side in the first extinguishing magnet 771.

A main magnetic field (M.M.F) is also formed between the first extinguishing magnet 771 and the third extinguishing magnet 773. Specifically, a main magnetic field (M.M.F) is formed in the direction from the second surface 771*b* of the first extinguishing magnet 771 to the second surface 773*b* of the third extinguishing magnet 773, which in the illustrated embodiment is the direction toward the right side in the first extinguishing magnet 771.

In (a) of FIG. 41, the current energized in each contact 311, 321 is directed in the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F), and the current energized in each contact 311, 321 is formed in one edge of the grid 720, which in the illustrated embodiment is the direction toward the upper right side. Accordingly, the arc path (A.P) is also formed toward the upper right side.

In (b) of FIG. 41, the current energized in each contact 311, 321 is directed in the direction entering the paper, that is, the direction in which the current flowing to an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F), and the current energized in each contact 311, 321 is formed in the other side edge of the grid 720, which in the illustrated embodiment is the direction toward the upper left side. Accordingly, the arc path (A.P) is also formed toward the upper left side.

Figure 42:
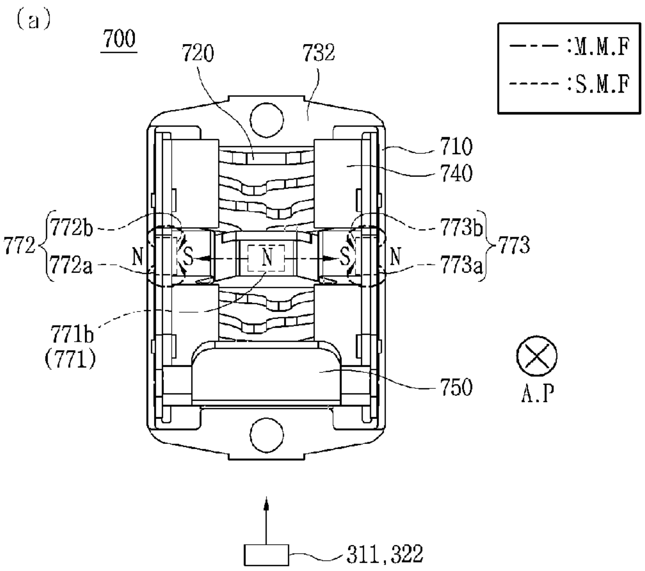
FIG. 42 is a bottom view illustrating an example of a magnetic field formed in the arc extinguishing unit according to the embodiment of FIG. 19 and an arc path formed accordingly.
Figure 42:
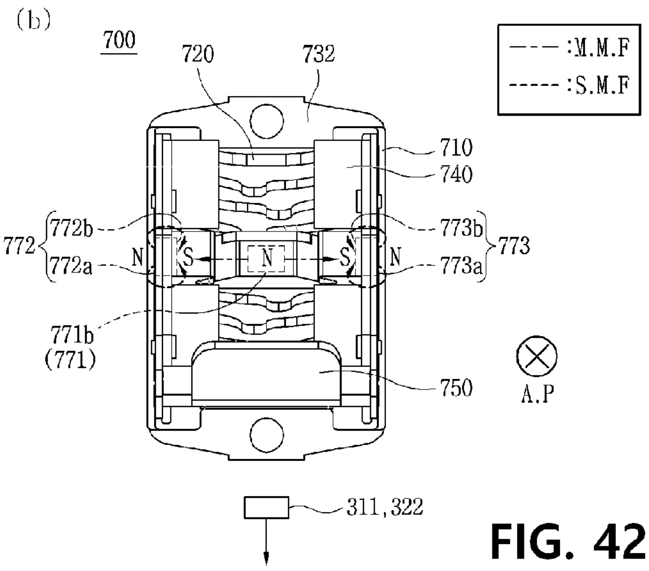

In (a) of FIG. 42, the current energized in each contact 311, 321 is directed in the direction toward the arc extinguishing unit 700, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F) and the current energized in each contact 311, 321 is formed in the direction entering the paper, that is, the direction toward the grid 720.

Although not illustrated, in this embodiment, it will be understood that the arc path (A.P) is formed to face the right side of the grid 720 as in the embodiment illustrated in (a) of FIG. 41.

In (b) of FIG. 42, the current energized in each contact 311, 321 is directed in the direction toward the arc extinguishing unit 700, that is, the direction in which the current flowing in the air circuit breaker 10 is transmitted to an external power source or load through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F) and the current energized in each contact 311, 321 is formed in the direction entering the paper, that is, the direction toward the grid 720.

Although not illustrated, in the present embodiment, it will be understood that the arc path (A.P) is formed to face the left side of the grid 720 as in the embodiment illustrated in (a) of FIG. 41.

As described above, the end of the grid 720 in the left-right direction may be formed in a peak shape. Accordingly, the arc may flow along the arc path (A.P) of the generated arc and enter the end of the grid 720.

Also, the arc path (A.P) is formed to face the grid cover 730 positioned above the grid 720. The grid cover 730 is provided with the vent 732*a* of the upper frame 732 communicating with the outside and the through-hole 734*a* of the mesh part 733.

Accordingly, the generated arc can be rapidly moved and extinguished along the arc path (A.P) of the generated arc and discharged to the outside.

Figure 43:
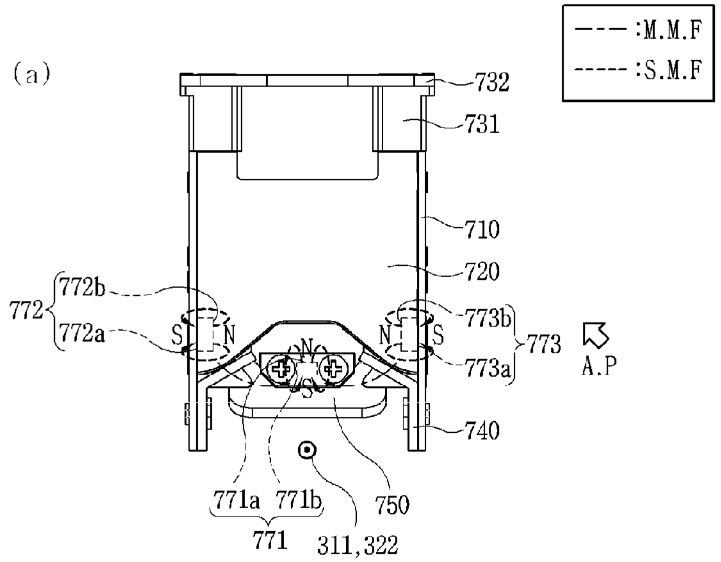
FIG. 43 is a front view illustrating another example of a magnetic field formed in the arc extinguishing unit according to the embodiment of FIG. 19 and an arc path formed accordingly.
Figure 43:
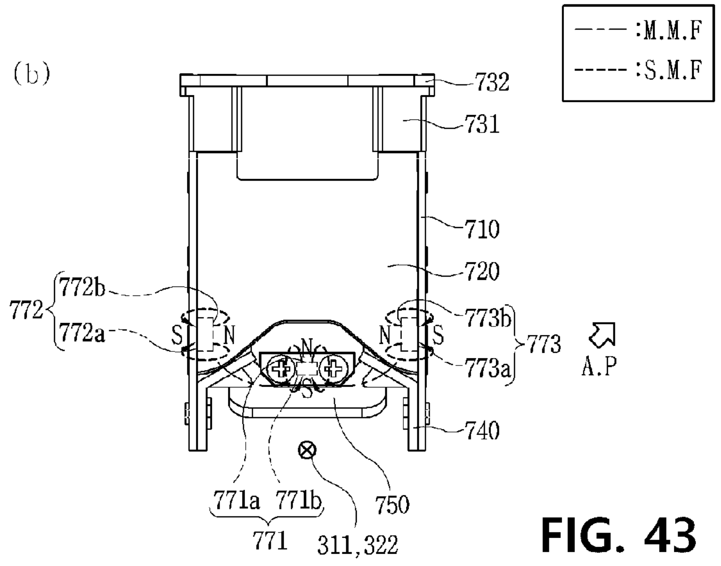

With reference to FIG. 43, the front of the arc extinguishing unit 700 according to another embodiment of the present disclosure is illustrated. Also, with reference to FIG. 44, the bottom of the arc extinguishing unit 700 according to another embodiment of the present disclosure is illustrated.

The first surface 771*a* of the first extinguishing magnet 771, that is, one side surface of the first extinguishing magnet 771 facing the grid 720 is magnetized to the N pole. Accordingly, the second surface 771*b* of the first extinguishing magnet 771, that is, the other surface of the first extinguishing magnet 771 opposite to the grid 720 is magnetized to the S pole. The first extinguishing magnet 771 forms a sub magnetic field (S.M.F), which is a magnetic field formed between the first surface 771*a* and the second surface 771*b*.

The first surface 772*a* of the second extinguishing magnet 772, that is, one side surface of the second extinguishing magnet 772 opposite to the first extinguishing magnet 771 is magnetized to the S pole. Accordingly, the second surface 772*b* of the second extinguishing magnet 772, that is, the other surface of the second extinguishing magnet 772 facing the first extinguishing magnet 771 is magnetized to the N pole. The second extinguishing magnet 772 forms a sub magnetic field (S.M.F), which is a magnetic field formed between the first surface 772*a* and the second surface 772*b*.

The first surface 773*a* of the third extinguishing magnet 773, that is, one side surface of the third extinguishing magnet 773 opposite to the first extinguishing magnet 771 is magnetized to the S pole. Accordingly, the second surface 773*b* of the third extinguishing magnet 773, that is, the other surface of the third extinguishing magnet 773 facing the first extinguishing magnet 771 is magnetized to the N pole. The third extinguishing magnet 773 forms a sub magnetic field (S.M.F), which is a magnetic field formed between the first surface 773*a* and the second surface 773*b*.

In addition, a main magnetic field (M.M.F) is formed between the first extinguishing magnet 771 and the second extinguishing magnet 772. Specifically, a main magnetic field (M.M.F) is formed in the direction from the second surface 772*b* of the second extinguishing magnet 772 to the second surface 771*b* of the first extinguishing magnet 771, which in the illustrated embodiment is the direction toward the right side in the second extinguishing magnet 772.

A main magnetic field (M.M.F) is also formed between the first extinguishing magnet 771 and the third extinguishing magnet 773. Specifically, a main magnetic field (M.M.F) is formed in the direction from the second surface 773*b* of the third extinguishing magnet 773 to the second surface 771*b* of the first extinguishing magnet 771, which in the illustrated embodiment is the direction toward the left side in the third extinguishing magnet 773.

In (a) of FIG. 43, the current energized in each contact 311, 321 is directed in the direction coming out of the paper, that is, the direction in which the current flowing in the air circuit breaker 10 is transmitted to an external power source or load through the fixed contact stand 310.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F), and the current energized in each contact 311, 321 is formed in one edge of the grid 720, which in the illustrated embodiment is the directed toward the upper left side. Accordingly, the arc path (A.P) is also formed toward the upper left side.

In (b) of FIG. 43, the current energized in each contact 311, 321 is directed in the direction entering the paper, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F), and the current energized in each contact 311, 321 is formed in the other side edge of the grid 720, which in the illustrated embodiment is the direction toward the upper right side. Accordingly, the arc path (A.P) is also formed toward the upper right side.

Figure 44:
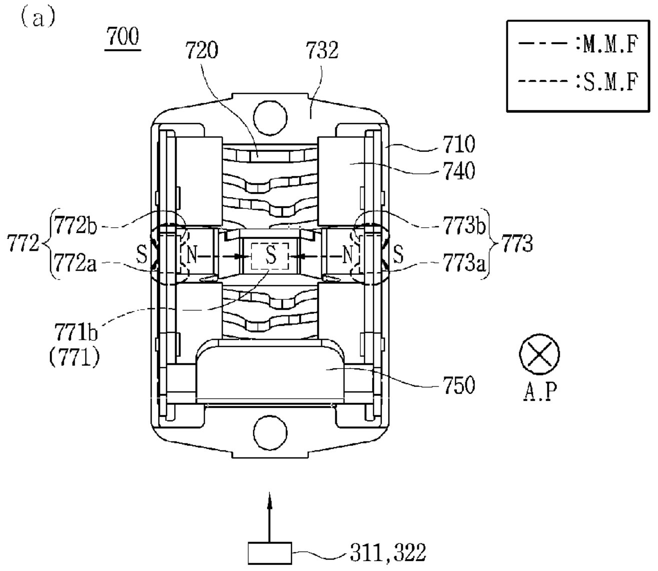
FIG. 44 is a bottom view illustrating another example of a magnetic field formed in the arc extinguishing unit according to the embodiment of FIG. 19 and an arc path formed accordingly.
Figure 44:
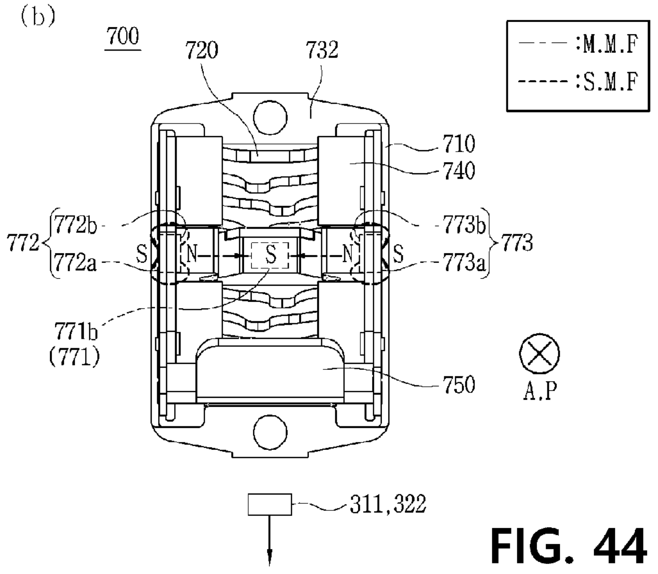

In (a) of FIG. 44, the current energized in each contact 311, 321 is directed in the direction toward the arc extinguishing unit 700, that is, the direction in which the current flowing in an external power source or load is transmitted to the air circuit breaker 10 through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F) and the current energized in each contact 311, 321 is formed in the direction entering the paper, that is, the direction toward the grid 720.

Although not illustrated, in this embodiment, it will be understood that the arc path (A.P) is formed to face the left side of the grid 720 as in the embodiment illustrated in (a) of FIG. 43.

In (b) of FIG. 44, the current energized in each contact 311, 321 is directed in the direction toward the arc extinguishing unit 700, that is, the direction in which the current flowing in the air circuit breaker 10 is transmitted to an external power source or load through each contact 311, 321.

Accordingly, if Ampere's left hand rule is applied at a position where each contact 311, 321 is in contact, the arc path (A.P) can be predicted.

That is, the electromagnetic force formed by the main magnetic field (M.M.F), the sub magnetic field (S.M.F) and the current energized in each contact 311, 321 is formed in the direction entering the paper, that is, the direction toward the grid 720.

Although not illustrated, in this embodiment, it will be understood that the arc path (A.P) is formed to face the right side of the grid 720 as in the embodiment illustrated in (a) of FIG. 43.

As described above, the end of the grid 720 in the left-right direction may be formed in a peak shape. Accordingly, the arc may flow along the arc path (A.P) of the generated arc and enter the end of the grid 720.

Also, the arc path (A.P) is formed to face the grid cover 730 positioned above the grid 720. The grid cover 730 is provided with the vent 732*a* of the upper frame 732 communicating with the outside and the through-hole 734*a* of the mesh part 733.

Accordingly, the generated arc may be rapidly moved and extinguished along the arc path (A.P) of the generated arc and discharged to the outside.

In this embodiment, even if the polarity of each extinguishing magnet 771, 772, 773 is changed, the arc path (A.P) of the generated arc is formed to face the width direction of the grid 720, which in the illustrated embodiment is the left-right direction. In addition, the arc path (A.P) of the generated arc is formed to face the grid cover 730 positioned to be opposite to each contact 311, 321.

Furthermore, even when the direction of the current energized in each contact 311, 321 is changed, the arc path (A.P) is formed to face the end of the grid 720 and the grid cover 730.

Accordingly, even if the polarity of each extinguishing magnet 771, 772, 773 and the direction of the energized current are changed, the generated arc may be rapidly moved and extinguished along the arc path (A.P) of the generated arc.

In addition, each extinguishing magnet 771, 772, 773 forms a sub magnetic field (S.M.F), respectively. Each sub magnetic field (S.M.F) is formed in the same direction as the main magnetic field (M.M.F) formed between the respective extinguishing magnets 771, 772, 773.

Accordingly, the strength of the magnetic field forming the arc path (A.P) may be strengthened. As a result, since the strength of the electromagnetic force is also strengthened, the generated arc can be rapidly moved and extinguished along the arc path (A.P) toward the arc extinguishing unit 700.

Although the above has been described with reference to the preferred embodiment of the present disclosure, those of ordinary skill in the art will understand that the present disclosure can be variously modified and changed within the scope without departing from the spirit and scope of the present disclosure described in the claims below.

The present disclosure relates to an arc extinguishing unit and an air circuit breaker including the same, and it is possible to provide an arc extinguishing unit capable of effectively extinguishing the arc generated by blocking the current and an air circuit breaker including the same, so there is industrial applicability.

The invention claimed is:

1. An arc extinguishing unit comprising:

a plurality of support plates that are spaced apart from each other and is disposed to face each other;

a grid that is positioned between the plurality of support plates and is coupled to the plurality of support plates;

a grid cover that is positioned on one a first side of the grid to cover the grid;

a magnet case that is positioned between the plurality of support plates at a second side of the grid opposite to the first side of the grid, extending in one direction between the plurality of support plates, and each end of the magnet case is coupled to a respective support plate of the plurality of support plates; and an extinguishing magnet that is accommodated in the magnet case, wherein the extinguishing magnet forms a magnetic field between the plurality of support plates, and wherein the grid is one of a plurality of grids that are provided and spaced apart from each other and disposed side by side in the one direction, wherein an end of any one or more of the plurality of grids on the second side of the plurality of grids is coupled to the magnet case.

2. The arc extinguishing unit according to claim 1, wherein the magnet case includes:

a first accommodating part that is positioned on the second side of the grid;

a second accommodating part that is coupled to a first one of the plurality of support plates; and a third accommodating part that is coupled to a second one of the plurality of support plates.

3. The arc extinguishing unit according to claim 2, wherein the first accommodating part is positioned between the second accommodating part and the third accommodating part.

4. The arc extinguishing unit according to claim 2, wherein a shortest distance between the first accommodating part and the grid cover is longer than a shortest distance between the second accommodating part and the grid cover or a shortest distance between the third accommodating part and the grid cover.

5. The arc extinguishing unit according to claim 2, wherein a shortest distance between the second accommodating part and the grid cover is equal to a shortest distance between the third accommodating part and the grid cover.

6. The arc extinguishing unit according to claim 2, wherein the extinguishing magnet includes:

a first extinguishing magnet that is accommodated in the first accommodating part;

a second extinguishing magnet that is accommodated in the second accommodating part; and a third extinguishing magnet that is accommodated in the third accommodating part.

7. The arc extinguishing unit according to claim 6, wherein each side of the second extinguishing magnet and the third extinguishing magnet facing each other is magnetized with a first polarity, wherein one side of the first extinguishing magnet facing the grid is magnetized with the first polarity.

8. The arc extinguishing unit according to claim 6, wherein the first accommodating part includes:

a first accommodating groove that is formed by recessing and accommodates the first extinguishing magnet; and a cover that is provided in the first accommodating part to cover the first accommodating groove.

9. The arc extinguishing unit according to claim 6, wherein the second accommodating part is formed by recessing in one side facing the any one of the plurality of the support plates, and includes a second accommodating groove that accommodates the second extinguishing magnet, the any one of the plurality of support plates is coupled to the second accommodating part so as to cover the second accommodating groove.

10. The arc extinguishing unit according to claim 6, wherein the third accommodating part is formed by recessing in one side facing the second one of the plurality of support plates, and includes a third accommodating groove that accommodates the third extinguishing magnet, wherein the second one of the plurality of support plates is coupled to the third accommodating part so as to cover the third accommodating groove.

11. The arc extinguishing unit according to claim 2, wherein the second accommodating part is positioned between the first one of the plurality of support plates and the grid, wherein the third accommodating part is positioned between the second one of the plurality of support plates and the grid.

12. The arc extinguishing unit according to claim 1, wherein the magnet case includes a grid coupling part that is formed by recessing in one side facing the grid, and extends between the plurality of support plates, wherein the second ends of the any one or more of the plurality of grids facing the magnet case are inserted and coupled to the grid coupling part.

13. The arc extinguishing unit according to claim 12, wherein both ends of the grid coupling part in the extension direction are through-formed in a direction opposite to the grid, the second end of the one or more grids is through-coupled to the both ends of the grid coupling part.

14. The arc extinguishing unit according to claim 12, wherein widths of the one or more grids are smaller than widths of the other grids among the plurality of grids.

15. The arc extinguishing unit according to claim 12, wherein lengths of the one or more grids are shorter than lengths of the other grids among the plurality of grids.

16. An air circuit breaker comprising:

a fixed contact;

a movable contact that moves in a first direction toward the fixed contact or a second direction away from the fixed contact; and an arc extinguishing unit that is positioned adjacent to the fixed contact and the movable contact to extinguish an arc generated by the fixed contact and the movable contact being spaced apart, wherein the arc extinguishing unit includes:

a pair of support plates that are spaced apart from each other and is disposed to face each other;

a grid that is positioned between the pair of support plates, and each end of the grid is respectively coupled to one support plate of the pair of support plates;

a magnet case that is positioned between the pair of support plates on a first side of the grid, extending between the pair of support plates, and each end of the magnet case is respectively coupled to one support plate of the pair of support plates; and a plurality of extinguishing magnets that are accommodated in the magnet case and disposed to be spaced apart from each other, wherein the plurality of extinguishing magnets forms a magnetic field between the pair of support plates;

wherein the magnet case includes a grid coupling part that is recessed in one side facing the grid and extends between the pair of support plates, and wherein a first end of the first side of the grid that faces the magnet case is inserted and coupled to the grid coupling part.

17. The air circuit breaker according to claim 16, wherein the magnet case includes:

a first accommodating part that is positioned on the first side of the grid;

a second accommodating part that extends from a first side of the first accommodating part and is coupled to a first one of the pair of support plates; and a third accommodating part that extends from a second side of the first accommodating part and is coupled to a second one of the pair of the supporting plates.

18. The air circuit breaker according to claim 17, wherein the second accommodating part and the third accommodating part are disposed to face each other with the first accommodating part interposed therebetween.

19. The air circuit breaker according to claim 17, wherein a shortest distance between the first accommodating part and the fixed contact is shorter than a shortest distance between the second accommodating part and the fixed contact or a shortest distance between the third accommodating part and the fixed contact.

20. The air circuit breaker according to claim 17, wherein the extinguishing magnet includes:

a first extinguishing magnet that is accommodated in the first accommodating part;

a second extinguishing magnet that is accommodated in the second accommodating part; and a third extinguishing magnet that is accommodated in the third accommodating part;

wherein each side of the second extinguishing magnet and the third extinguishing magnet facing each other is magnetized with a first polarity, wherein one side of the first extinguishing magnet facing the grid is magnetized with the first polarity.

21. The air circuit breaker according to claim 17, wherein the magnet case includes a plurality of arc inlets that include an arc inlet that is inclinedly recessed with respect to the first accommodating part on one side opposite to the grid, a first one of the plurality of arc inlets is positioned between the first accommodating part and the second accommodating part, a second one of the plurality of arc inlets is positioned between the first accommodating part and the third accommodating part.

22. The air circuit breaker according to claim 16, wherein each end of the grid coupling part in an extending direction is through-formed in a direction facing the grid and a direction opposite to the grid, one end of the one side of the grid inserted and coupled to the grid coupling part is through-coupled to the each end of the grid coupling part.

23. The air circuit breaker according to claim 16, wherein a plurality of grids is provided, wherein the grids of the plurality of grids are is spaced apart from each other and is are stacked to face each other, any one or more grids of the plurality of grids is coupled to the magnet case, an area of a side of the any one or more grids of the plurality of grids facing an adjacent grid is narrower than sides of remaining grids among the plurality of grids.

24. An air circuit breaker, comprising:

a first support plate;

a second support plate, spaced apart from and disposed to face the first support plate;

a first grid that is positioned between and coupled to the first support plate and the second support plate;

a second grid that is positioned between and coupled to the first support plate and the second support plate and disposed to be spaced apart from the first grid;

a grid cover that is positioned on a first side of the first grid and the second grid to cover the first grid and the second grid;

a magnet case that is positioned between the first support plate and the second support plate on a second side of the first grid and the second grid opposite to the first side, wherein the magnet case extends between the first support plate and the second support plate, wherein each end of the magnet case is coupled to a respective support plate of the first support plate and the second support plate and wherein each side of the magnet case is coupled to a respective grid of the first grid and the second grid on the second side of the first grid and the second grid; and an extinguishing magnet that is accommodated in the magnet case, wherein the extinguishing magnet forms a magnetic field between the first support plate and the second support plate.

* * * * *